(12) United States Patent
Wang et al.

(10) Patent No.: US 12,497,446 B2
(45) Date of Patent: Dec. 16, 2025

(54) TETRANECTIN-TARGETING MONOCLONAL ANTIBODIES TO FIGHT AGAINST LETHAL SEPSIS AND OTHER PATHOLOGIES

(71) Applicant: The Feinstein Institutes For Medical Research, New York, NY (US)

(72) Inventors: Haichao Wang, Edison, NJ (US); Weiqiang Chen, Garden City, NY (US); Jian Hua Li, New York, NY (US); Kevin J. Tracey, Old Greenwich, CT (US)

(73) Assignee: The Feinstein Institutes For Medical Research, Manhasset, NY (US)

( * ) Notice: Subject to any disclaimer, the term of this patent is extended or adjusted under 35 U.S.C. 154(b) by 978 days.

(21) Appl. No.: 17/634,430

(22) PCT Filed: Aug. 12, 2020

(86) PCT No.: PCT/US2020/045905
§ 371 (c)(1),
(2) Date: Feb. 10, 2022

(87) PCT Pub. No.: WO2021/030423
PCT Pub. Date: Feb. 18, 2021

(65) Prior Publication Data
US 2022/0281962 A1 Sep. 8, 2022

Related U.S. Application Data

(60) Provisional application No. 62/885,890, filed on Aug. 13, 2019.

(51) Int. Cl.
| | | |
|---|---|---|
| *A61K 39/395* | (2006.01) | |
| *A61K 39/00* | (2006.01) | |
| *A61P 19/02* | (2006.01) | |
| *A61P 29/02* | (2006.01) | |
| *A61P 39/00* | (2006.01) | |
| *C07K 16/00* | (2006.01) | |
| *C07K 16/18* | (2006.01) | |
| *C07K 16/46* | (2006.01) | |

(52) U.S. Cl.
CPC ............ *C07K 16/18* (2013.01); *A61P 19/02* (2018.01); *A61P 29/02* (2018.01); *A61P 39/00* (2018.01); *A61K 2039/505* (2013.01); *C07K 2317/24* (2013.01); *C07K 2317/76* (2013.01); *C07K 2317/92* (2013.01)

(58) Field of Classification Search
None
See application file for complete search history.

(56) References Cited

U.S. PATENT DOCUMENTS

| | | |
|---|---|---|
| 8,153,134 B2 | 4/2012 | Bigler et al. |
| 2006/0075522 A1 | 4/2006 | Cleveland et al. |
| 2007/0072797 A1 | 3/2007 | Robinson et al. |
| 2013/0330335 A1 | 12/2013 | Bremel et al. |
| 2023/0287090 A1* | 9/2023 | Wang .................. C07K 16/1018 |

FOREIGN PATENT DOCUMENTS

| | | | | |
|---|---|---|---|---|
| WO | WO-2016138160 A1 * | 9/2016 | ............ | A61K 39/12 |
| WO | 2018223118 A1 | 12/2018 | | |
| WO | WO-2022051223 A1 * | 3/2022 | ........... | C07K 14/005 |

OTHER PUBLICATIONS

Barnes et al. Structures of Human Antibodies Bound to SARS-CoV-2 Spike Reveal Common Epitopes and Recurrent Features of Antibodies. Cell 182, 828-842, Aug. 20, 2020. (Year: 2020).*
Chen et al. Identification of tetranectin-targeting monoclonal antibodies to treat potentially lethal sepsis. Chen et al., Sci. Transl. Med. 12, eaaz3833 (2020). (Year: 2020).*
Li et al. Time to Develop Therapeutic Antibodies Against Harmless Proteins Colluding with Sepsis Mediators?. ImmunoTargets and Therapy 2020:9 157-166. (Year: 2020).*
Crunkhorn S. Antibody intervention rescues mice from sepsis. Sci. Transl Med. 12, eaaz3833 (2020). (Year: 2020).*
Wang et al. Pathogenic epitope-specific monoclonal antibody-based immunoassay for accurate diagnosis and monitoring of tetranectin in sepsis. International Immunopharmacology 143 (2024) 113473. (Year: 2024).*
Brown et al. Tolerance of single, but not multiple, amino acid replacements in antibody VH CDR 2: a means of minimizing B cell wastage from somatic hypermutation? J. Immuno. May 1996, 3285-91. (Year: 1996).*
Vajdos et al. Comprehensive functional maps of the antigen-binding site of an anti-ErbB2 antibody obtained with shotgun scanning mutagenesis. J. Mol. Biol. Jul. 5, 2002, 320(2):415-28. (Year: 2002).*
International Search Report and Written Opinion dated Jan. 26, 2021 from PCT International Application No. PCT/US2020/045905.
Høgdall et al., "Monoclonal Antibodies Against Human Tetranectin Epitope Characterization and Use In Immunohistochemistry," Clinica Chimica Acta, vol. 258, No. 2, Feb. 17, 1997, pp. 159-177.
Chen et al., "Identification of Tetranectin-Targeting Monoclonal Antibodies to Treat Potentially Lethal Sepsis," Science Translational Medicine, vol. 12, No. 539, article eaaz3833, Apr. 15, 2020, 14 pages plus cover sheet.
Meyer et al., "A Simplified Workflow for Monoclonal Antibody Sequencing," PLoS One, https://doi.org/10.1371/journal.pone.0218717, Jun. 24, 2019, 19 pages.

* cited by examiner

*Primary Examiner* — Maher M Haddad
(74) *Attorney, Agent, or Firm* — Amster, Rothstein & Ebenstein LLP

(57) ABSTRACT

Provided are anti-tetranectin domain-specific antibodies and fragments thereof, as well as methods of use employing such antibodies and/or fragments.

13 Claims, 22 Drawing Sheets

Specification includes a Sequence Listing.

Open SPR

A

| Peptide # | Sequence | Position |
|---|---|---|
| P1 | LQTVCLKGT | 46-54 |
| P2 | KVHMKCFLAFTQTKTF | 55-70 |
| P3 | HEASEDCISRGG | 71-83 |
| P4 | GGTLGTPQTG | 81-90 |
| P5 | TPQTGSENDALYEYLRQSVGNEAE | 86-109 |
| P6 | GNEAEIWLGLNDMAAEGT | 105-122 |
| P7 | GTWVDMTGARIAYKNWETEITAQP | 121-144 |
| P8 | ITAQPDGGKTENC | 140-152 |
| P9 | NCAVLSGAANGKWFDKR | 151-167 |
| P10 | AANGKWFDKRCRDQLPYICQFGIV | 158-181 |

SEQUENCE LISTING

```
<160> NUMBER OF SEQ ID NOS: 51

<210> SEQ ID NO 1
<211> LENGTH: 9
<212> TYPE: PRT
<213> ORGANISM: Human

<400> SEQUENCE: 1

Leu Gln Thr Val Cys Leu Lys Gly Thr
1               5

<210> SEQ ID NO 2
<211> LENGTH: 16
<212> TYPE: PRT
<213> ORGANISM: Human

<400> SEQUENCE: 2

Lys Val His Met Lys Cys Phe Leu Ala Phe Thr Gln Thr Lys Thr Phe
1               5                   10                  15

<210> SEQ ID NO 3
<211> LENGTH: 12
<212> TYPE: PRT
<213> ORGANISM: HUMAN

<400> SEQUENCE: 3

His Glu Ala Ser Glu Asp Cys Ile Ser Arg Gly Gly
1               5                   10

<210> SEQ ID NO 4
<211> LENGTH: 10
<212> TYPE: PRT
<213> ORGANISM: Human

<400> SEQUENCE: 4

Gly Gly Thr Leu Gly Thr Pro Gln Thr Gly
1               5                   10

<210> SEQ ID NO 5
```

```
<211> LENGTH: 24
<212> TYPE: PRT
<213> ORGANISM: HUMAN

<400> SEQUENCE: 5

Thr Pro Gln Thr Gly Ser Glu Asn Asp Ala Leu Tyr Glu Tyr Leu Arg
1               5                   10                  15

Gln Ser Val Gly Asn Glu Ala Glu
            20

<210> SEQ ID NO 6
<211> LENGTH: 18
<212> TYPE: PRT
<213> ORGANISM: HUMAN

<400> SEQUENCE: 6

Gly Asn Glu Ala Glu Ile Trp Leu Gly Leu Asn Asp Met Ala Ala Glu
1               5                   10                  15

Gly Thr

<210> SEQ ID NO 7
<211> LENGTH: 24
<212> TYPE: PRT
<213> ORGANISM: HUMAN

<400> SEQUENCE: 7

Gly Thr Trp Val Asp Met Thr Gly Ala Arg Ile Ala Tyr Lys Asn Trp
1               5                   10                  15

Glu Thr Glu Ile Thr Ala Gln Pro
            20

<210> SEQ ID NO 8
<211> LENGTH: 13
<212> TYPE: PRT
<213> ORGANISM: HUMAN

<400> SEQUENCE: 8

Ile Thr Ala Gln Pro Asp Gly Gly Lys Thr Glu Asn Cys
1               5                   10

<210> SEQ ID NO 9
<211> LENGTH: 17
<212> TYPE: PRT
<213> ORGANISM: HUMAN

<400> SEQUENCE: 9

Asn Cys Ala Val Leu Ser Gly Ala Ala Asn Gly Lys Trp Phe Asp Lys
1               5                   10                  15

Arg

<210> SEQ ID NO 10
<211> LENGTH: 24
<212> TYPE: PRT
<213> ORGANISM: HUMAN

<400> SEQUENCE: 10

Ala Ala Asn Gly Lys Trp Phe Asp Lys Arg Cys Arg Asp Gln Leu Pro
1               5                   10                  15

Tyr Ile Cys Gln Phe Gly Ile Val
            20

<210> SEQ ID NO 11
```

```
<211> LENGTH: 28
<212> TYPE: PRT
<213> ORGANISM: HUMAN

<400> SEQUENCE: 11

Ser Thr Pro Gln Thr Gly Ser Glu Asn Asp Ala Leu Tyr Glu Tyr Leu
1               5                   10                  15

Arg Gln Ser Val Gly Asn Glu Ala Glu Ile Trp Leu
            20                  25

<210> SEQ ID NO 12
<211> LENGTH: 10
<212> TYPE: PRT
<213> ORGANISM: HUMAN

<400> SEQUENCE: 12

Ser Thr Pro Gln Thr Gly Ser Glu Asn Asp
1               5                   10

<210> SEQ ID NO 13
<211> LENGTH: 10
<212> TYPE: PRT
<213> ORGANISM: HUMAN

<400> SEQUENCE: 13

Pro Gln Thr Gly Ser Glu Asn Asp Ala Leu
1               5                   10

<210> SEQ ID NO 14
<211> LENGTH: 10
<212> TYPE: PRT
<213> ORGANISM: HUMAN

<400> SEQUENCE: 14

Thr Gly Ser Glu Asn Asp Ala Leu Tyr Glu
1               5                   10

<210> SEQ ID NO 15
<211> LENGTH: 10
<212> TYPE: PRT
<213> ORGANISM: HUMAN

<400> SEQUENCE: 15

Ser Glu Asn Asp Ala Leu Tyr Glu Tyr Leu
1               5                   10

<210> SEQ ID NO 16
<211> LENGTH: 10
<212> TYPE: PRT
<213> ORGANISM: HUMAN

<400> SEQUENCE: 16

Ala Leu Tyr Glu Tyr Leu Arg Gln Ser Val
1               5                   10

<210> SEQ ID NO 17
<211> LENGTH: 10
<212> TYPE: PRT
<213> ORGANISM: HUMAN

<400> SEQUENCE: 17

Tyr Glu Tyr Leu Arg Gln Ser Val Gly Asn
1               5                   10
```

```
<210> SEQ ID NO 18
<211> LENGTH: 11
<212> TYPE: PRT
<213> ORGANISM: HUMAN

<400> SEQUENCE: 18

Tyr Leu Arg Gln Ser Val Gly Asn Glu Ala Glu
1               5                   10

<210> SEQ ID NO 19
<211> LENGTH: 10
<212> TYPE: PRT
<213> ORGANISM: HUMAN

<400> SEQUENCE: 19

Arg Gln Ser Val Gly Asn Glu Ala Glu Ile
1               5                   10

<210> SEQ ID NO 20
<211> LENGTH: 10
<212> TYPE: PRT
<213> ORGANISM: HUMAN

<400> SEQUENCE: 20

Ser Val Gly Asn Glu Ala Glu Ile Trp Leu
1               5                   10

<210> SEQ ID NO 21
<211> LENGTH: 5
<212> TYPE: PRT
<213> ORGANISM: MOUSE

<400> SEQUENCE: 21

Thr Asp Tyr Met Ser
1               5

<210> SEQ ID NO 22
<211> LENGTH: 17
<212> TYPE: PRT
<213> ORGANISM: MOUSE

<400> SEQUENCE: 22

Ala Ile Asn Ser Asn Gly Gly Thr Thr Tyr Tyr Pro Asp Thr Val Lys
1               5                   10                  15

Gly

<210> SEQ ID NO 23
<211> LENGTH: 8
<212> TYPE: PRT
<213> ORGANISM: MOUSE

<400> SEQUENCE: 23

Gln Val Lys Asn Gly Leu Asp Tyr
1               5

<210> SEQ ID NO 24
<211> LENGTH: 11
<212> TYPE: PRT
<213> ORGANISM: MOUSE

<400> SEQUENCE: 24

Arg Ala Ser Gln Asp Ile Ser Asn Tyr Leu Asn
1               5                   10
```

```
<210> SEQ ID NO 25
<211> LENGTH: 7
<212> TYPE: PRT
<213> ORGANISM: MOUSE

<400> SEQUENCE: 25

Lys Thr Ser Arg Leu His Ser
1               5

<210> SEQ ID NO 26
<211> LENGTH: 9
<212> TYPE: PRT
<213> ORGANISM: MOUSE

<400> SEQUENCE: 26

Gln Gln Gly Asn Thr Leu Pro Pro Thr
1               5

<210> SEQ ID NO 27
<211> LENGTH: 5
<212> TYPE: PRT
<213> ORGANISM: MOUSE

<400> SEQUENCE: 27

Ser Tyr Tyr Met Ser
1               5

<210> SEQ ID NO 28
<211> LENGTH: 17
<212> TYPE: PRT
<213> ORGANISM: MOUSE

<400> SEQUENCE: 28

Ala Ile Asn Ser Asn Gly Gly Arg Thr Tyr Tyr Pro Asp Thr Val Lys
1               5                   10                  15

Gly

<210> SEQ ID NO 29
<211> LENGTH: 8
<212> TYPE: PRT
<213> ORGANISM: MOUSE

<400> SEQUENCE: 29

Gln Gly Lys Asn Gly Leu Asp Tyr
1               5

<210> SEQ ID NO 30
<211> LENGTH: 11
<212> TYPE: PRT
<213> ORGANISM: MOUSE

<400> SEQUENCE: 30

Arg Ala Ser Gln Asp Ile Ser Asn His Leu Asn
1               5                   10

<210> SEQ ID NO 31
<211> LENGTH: 7
<212> TYPE: PRT
<213> ORGANISM: MOUSE

<400> SEQUENCE: 31

Tyr Thr Ser Arg Leu His Ser
1               5
```

```
<210> SEQ ID NO 32
<211> LENGTH: 9
<212> TYPE: PRT
<213> ORGANISM: MOUSE

<400> SEQUENCE: 32

Gln Gln Gly Lys Thr Leu Pro Pro Thr
1               5

<210> SEQ ID NO 33
<211> LENGTH: 5
<212> TYPE: PRT
<213> ORGANISM: MOUSE

<400> SEQUENCE: 33

Ser Ser Tyr Met Ser
1               5

<210> SEQ ID NO 34
<211> LENGTH: 17
<212> TYPE: PRT
<213> ORGANISM: MOUSE

<400> SEQUENCE: 34

Ala Ile Asn Asn Asn Gly Gly Thr Thr Tyr Tyr Pro Asp Thr Val Lys
1               5                   10                  15

Gly

<210> SEQ ID NO 35
<211> LENGTH: 8
<212> TYPE: PRT
<213> ORGANISM: MOUSE

<400> SEQUENCE: 35

Gln Gly Lys Asn Gly Leu Asp Tyr
1               5

<210> SEQ ID NO 36
<211> LENGTH: 11
<212> TYPE: PRT
<213> ORGANISM: MOUSE

<400> SEQUENCE: 36

Arg Ala Ser Gln Asp Ile Gly Asn Leu Leu Asn
1               5                   10

<210> SEQ ID NO 37
<211> LENGTH: 7
<212> TYPE: PRT
<213> ORGANISM: MOUSE

<400> SEQUENCE: 37

Tyr Thr Ser Arg Leu His Ser
1               5

<210> SEQ ID NO 38
<211> LENGTH: 9
<212> TYPE: PRT
<213> ORGANISM: MOUSE

<400> SEQUENCE: 38

Gln Gln Ala Asn Thr Leu Pro Pro Thr
1               5
```

-continued

```
<210> SEQ ID NO 39
<211> LENGTH: 5
<212> TYPE: PRT
<213> ORGANISM: MOUSE

<400> SEQUENCE: 39

Ser Asp Tyr Met Ser
1               5

<210> SEQ ID NO 40
<211> LENGTH: 17
<212> TYPE: PRT
<213> ORGANISM: MOUSE

<400> SEQUENCE: 40

Ala Ile Asn Ser Asn Gly Gly Thr Thr Tyr Tyr Pro Asp Thr Val Lys
1               5                   10                  15

Gly

<210> SEQ ID NO 41
<211> LENGTH: 8
<212> TYPE: PRT
<213> ORGANISM: MOUSE

<400> SEQUENCE: 41

Gln Gly Lys Asn Gly Met Asp Tyr
1               5

<210> SEQ ID NO 42
<211> LENGTH: 11
<212> TYPE: PRT
<213> ORGANISM: MOUSE

<400> SEQUENCE: 42

Arg Ala Ser Gln Asp Ile Ser Asn His Leu Asn
1               5                   10

<210> SEQ ID NO 43
<211> LENGTH: 7
<212> TYPE: PRT
<213> ORGANISM: MOUSE

<400> SEQUENCE: 43

Tyr Thr Ser Arg Leu His Ser
1               5

<210> SEQ ID NO 44
<211> LENGTH: 9
<212> TYPE: PRT
<213> ORGANISM: MOUSE

<400> SEQUENCE: 44

Gln Gln Gly Lys Thr Leu Pro Pro Thr
1               5

<210> SEQ ID NO 45
<211> LENGTH: 5
<212> TYPE: PRT
<213> ORGANISM: MOUSE
<220> FEATURE:
<221> NAME/KEY: MISC
<222> LOCATION: (1)..(1)
<223> OTHER INFORMATION: X = T OR S
<220> FEATURE:
<221> NAME/KEY: MISC
<222> LOCATION: (2)..(2)
```

```
<223> OTHER INFORMATION: X = S OR Y OR D

<400> SEQUENCE: 45

Xaa Xaa Tyr Met Ser
1               5

<210> SEQ ID NO 46
<211> LENGTH: 17
<212> TYPE: PRT
<213> ORGANISM: MOUSE
<220> FEATURE:
<221> NAME/KEY: MISC
<222> LOCATION: (4)..(4)
<223> OTHER INFORMATION: X = R OR T
<220> FEATURE:
<221> NAME/KEY: MISC
<222> LOCATION: (8)..(8)
<223> OTHER INFORMATION: X = S OR N

<400> SEQUENCE: 46

Ala Ile Asn Xaa Asn Gly Gly Xaa Thr Tyr Tyr Pro Asp Thr Val Lys
1               5                   10                  15

Gly

<210> SEQ ID NO 47
<211> LENGTH: 8
<212> TYPE: PRT
<213> ORGANISM: MOUSE
<220> FEATURE:
<221> NAME/KEY: MISC
<222> LOCATION: (2)..(2)
<223> OTHER INFORMATION: X = V OR G
<220> FEATURE:
<221> NAME/KEY: MISC
<222> LOCATION: (6)..(6)
<223> OTHER INFORMATION: X = L OR M

<400> SEQUENCE: 47

Gln Xaa Lys Asn Gly Xaa Asp Tyr
1               5

<210> SEQ ID NO 48
<211> LENGTH: 11
<212> TYPE: PRT
<213> ORGANISM: MOUSE
<220> FEATURE:
<221> NAME/KEY: MISC
<222> LOCATION: (7)..(7)
<223> OTHER INFORMATION: X = S OR G
<220> FEATURE:
<221> NAME/KEY: MISC
<222> LOCATION: (9)..(9)
<223> OTHER INFORMATION: X = Y OR H OR L

<400> SEQUENCE: 48

Arg Ala Ser Gln Asp Ile Xaa Asn Xaa Leu Asn
1               5                   10

<210> SEQ ID NO 49
<211> LENGTH: 7
<212> TYPE: PRT
<213> ORGANISM: MOUSE
<220> FEATURE:
<221> NAME/KEY: MISC
<222> LOCATION: (1)..(1)
<223> OTHER INFORMATION: X = K OR Y

<400> SEQUENCE: 49

Xaa Thr Ser Arg Leu His Ser
```

```
<210> SEQ ID NO 50
<211> LENGTH: 9
<212> TYPE: PRT
<213> ORGANISM: MOUSE
<220> FEATURE:
<221> NAME/KEY: MISC
<222> LOCATION: (3)..(3)
<223> OTHER INFORMATION: X = G OR A
<220> FEATURE:
<221> NAME/KEY: MISC
<222> LOCATION: (4)..(4)
<223> OTHER INFORMATION: X = N OR K

<400> SEQUENCE: 50

Gln Gln Xaa Xaa Thr Leu Pro Pro Thr
1               5

<210> SEQ ID NO 51
<211> LENGTH: 10
<212> TYPE: PRT
<213> ORGANISM: HUMAN

<400> SEQUENCE: 51

Asn Asp Ala Leu Tyr Glu Tyr Leu Arg Gln
1               5                   10
```

TETRANECTIN-TARGETING MONOCLONAL ANTIBODIES TO FIGHT AGAINST LETHAL SEPSIS AND OTHER PATHOLOGIES

CROSS-REFERENCE TO RELATED APPLICATIONS

This application is a U.S. national stage entry under 35 U.S.C. § 371 of PCT International Patent Application No. PCT/US2020/045905, filed Aug. 12, 2020, which claims benefit of U.S. Provisional Application No. 62/885,890, filed Aug. 13, 2019, the contents of which are hereby incorporated by reference.

STATEMENT OF GOVERNMENT SUPPORT

This invention was made with government support under grant numbers GM063075 and AT005076 awarded by the National Institutes of Health. The government has certain rights in the invention.

BACKGROUND OF THE INVENTION

Sepsis is a life-threatening organ dysfunction caused by a dysregulated host response to infection [1] that annually claims hundred thousand victims in the U.S. alone. Its complex pathogenesis is partly attributable to both dysregulated inflammatory responses and resultant immunosuppression [2,3]. Two decades ago, it was reported that the high mobility group box-1 (HMGB1) protein is released by activated macrophages/monocytes, and functions as a late mediator of lethal endotoxemia [4] and sepsis [5,6]. When initially secreted by innate immune cells at relatively low levels, HMGB1 might still be proinflammatory during an early stage of sepsis [4]. However, when it is passively released by the liver [7] and other somatic cells at overwhelmingly higher levels, HMGB1 could induce immune tolerance [8,9], macrophage pyroptosis [7,10], and immunosuppression [11], thereby impairing the host's ability to eradicate microbial infections [12,13]. It was previously unknown what other endogenous proteins could affect extracellular HMGB1 functions and could be pharmacologically modulated for treating sepsis.

In 1986, tetranectin (TN) was first characterized as an oligomeric plasminogen-binding protein [14] with an overall 76% amino acid sequence identity (87% similarity) between human and rodents [15]. It is expressed most abundantly in the lung [16,17], and its circulating levels in healthy humans range from moderate (~8 μg/ml) in infants to high (10-12 μg/ml) in adults [18]. Structurally, TN has several distinct domains respectively responsible for its extracellular secretion (residue 1-21, leader signal sequence), heparin binding (residue 22-37) [19], oligomerization (residue 47-72, the α-helical domain), as well as the carbohydrate recognition (residue 73-202) of oligosaccharides in plasminogen [20,21], apolipoprotein A1 [22], hepatocyte growth factor (HGF), and tissue-type plasminogen activator (t-PA) [23]. However, the specific roles of TN in physiology and pathology remains poorly understood. Recent evidence revealed that enforced expression or genetic depletion of TN led to abnormal production of bone material [24], excessive curvature of the thoracic spine—spinal deformity [25], deficient motor function (such as limb rigidity) [26], or impaired wound healing [27,28], implying the importance of maintaining physiological TN levels in health.

SUMMARY OF THE INVENTION

An antibody or antigen-binding fragment thereof is provided comprising
a) a heavy chain comprising one or more of:

```
                                            (SEQ ID NO: 21)
        TDYMS
                                            (SEQ ID NO: 22)
        AINSNGGTTYYPDTVKG
                                            (SEQ ID NO: 23)
        QVKNGLDY
``` and/or a light chain comprising one or more of:

```
                                            (SEQ ID NO: 24)
        RASQDISNYLN
                                            (SEQ ID NO: 25)
        KTSRLHS
                                            (SEQ ID NO: 26)
        QQGNTLPPT
``` or
b) a heavy chain comprising one or more of:

```
                                            (SEQ ID NO: 27)
        SYYMS
                                            (SEQ ID NO: 28)
        AINSNGGRTYYPDTVKG
                                            (SEQ ID NO: 29)
        QGKNGLDY
``` and/or a light chain comprising one or more of:

```
                                            (SEQ ID NO: 30)
        RASQDISNHLN
                                            (SEQ ID NO: 31)
        YTSRLHS
                                            (SEQ ID NO: 32)
        QQGKTLPPT
``` or
c) a heavy chain comprising one or more of:

```
                                            (SEQ ID NO: 33)
        SSYMS
                                            (SEQ ID NO: 34)
        AINNNGGTTYYPDTVKG
                                            (SEQ ID NO: 35)
        QGKNGLDY
``` and/or a light chain comprising one or more of:

```
                                            (SEQ ID NO: 36)
        RASQDIGNLLN
                                            (SEQ ID NO: 37)
        YTSRLHS
                                            (SEQ ID NO: 38)
        QQANTLPPT
``` or d) a heavy chain comprising one or more of:

SDYMS (SEQ ID NO: 39)

AINSNGGTTYYPDTVKG (SEQ ID NO: 40)

QGKNGMDY (SEQ ID NO: 41)

and/or a light chain comprising one or more of:

RASQDISNHLN (SEQ ID NO: 42)

YTSRLHS (SEQ ID NO: 43)

QQGKTLPPT. (SEQ ID NO: 44)

Also provided is an antibody, or antigen-binding fragment thereof, which binds to a sequence NDALYEYLRQ (SEQ ID NO:51) of a human tetranectin.

Also provided is an antibody, or an antigen-binding fragment thereof, which comprises a heavy chain comprising one or more of:

TDYMS (SEQ ID NO: 21)

AINSNGGTTYYPDTVKG (SEQ ID NO: 22)

QVKNGLDY (SEQ ID NO: 23)

and/or a light chain comprising one or more of:

RASQDISNYLN (SEQ ID NO: 24)

KTSRLHS (SEQ ID NO: 25)

QQGNTLPPT. (SEQ ID NO: 26)

Also provided is an antibody, or an antigen-binding fragment thereof, which comprises a heavy chain comprising one or more of:

SYYMS (SEQ ID NO: 27)

AINSNGGRTYYPDTVKG (SEQ ID NO: 28)

QGKNGLDY (SEQ ID NO: 29)

and/or a light chain comprising one or more of:

RASQDISNHLN (SEQ ID NO: 30)

YTSRLHS (SEQ ID NO: 31)

QQGKTLPPT. (SEQ ID NO: 32)

Also provided is an antibody, or an antigen-binding fragment thereof, which comprises a heavy chain comprising one or more of:

SSYMS (SEQ ID NO: 33)

AINNNGGTTYYPDTVKG (SEQ ID NO: 34)

QGKNGLDY (SEQ ID NO: 35)

and/or a light chain comprising one or more of:

RASQDIGNLLN (SEQ ID NO: 36)

YTSRLHS (SEQ ID NO: 37)

QQANTLPPT. (SEQ ID NO: 38)

Also provided is an antibody, or an antigen-binding fragment thereof, which comprises a heavy chain comprising one or more of:

SDYMS (SEQ ID NO: 39)

AINSNGGTTYYPDTVKG (SEQ ID NO: 40)

QGKNGMDY (SEQ ID NO: 41)

and/or a light chain comprising one or more of:

RASQDISNHLN (SEQ ID NO: 42)

YTSRLHS (SEQ ID NO: 43)

QQGKTLPPT. (SEQ ID NO: 44)

Also provided is an isolated antibody or antigen-binding fragment thereof which binds to a sequence NDALYEYLRQ (SEQ ID NO:51) of a human tetranectin with an affinity of 3.0 nM $K_D$ or stronger.

Also provided is an isolated antibody or antigen-binding fragment thereof which binds to a sequence NDALYEYLRQ (SEQ ID NO:51) of a human tetranectin with an affinity of 2.0 nM $K_D$ or stronger.

Also provided is a nucleic acid encoding a heavy chain of an antibody which comprises one or more of:

TDYMS (SEQ ID NO: 21)

AINSNGGTTYYPDTVKG (SEQ ID NO: 22)

QVKNGLDY. (SEQ ID NO: 23)

Also provided is a nucleic acid encoding a heavy chain of an antibody which comprises one or more of:

```
                                    (SEQ ID NO: 27)
         SYYMS (SEQ ID NO: 28)
         AINSNGGRTYYPDTVKG (SEQ ID NO: 29)
         QGKNGLDY.
```

Also provided is a nucleic acid encoding a heavy chain of an antibody which comprises one or more of:

```
                                    (SEQ ID NO: 33)
         SSYMS (SEQ ID NO: 34)
         AINNNGGTTYYPDTVKG (SEQ ID NO: 35)
         QGKNGLDY.
```

Also provided is a nucleic acid encoding a heavy chain of an antibody which comprises one or more of:

```
                                    (SEQ ID NO: 39)
         SDYMS (SEQ ID NO: 40)
         AINSNGGTTYYPDTVKG (SEQ ID NO: 41)
         QGKNGMDY
```

Also provided is a nucleic acid encoding a light chain of an antibody which comprises one or more of:

```
                                    (SEQ ID NO: 24)
         RASQDISNYLN (SEQ ID NO: 25)
         KTSRLHS (SEQ ID NO: 26)
         QQGNTLPPT.
```

Also provided is a nucleic acid encoding a light chain of an antibody which comprises one or more of:

```
                                    (SEQ ID NO: 30)
         RASQDISNHLN (SEQ ID NO: 31)
         YTSRLHS (SEQ ID NO: 32)
         QQGKTLPPT.
```

Also provided is a nucleic acid encoding a light chain of an antibody which comprises one or more of:

```
                                    (SEQ ID NO: 36)
         RASQDIGNLLN (SEQ ID NO: 37)
         YTSRLHS (SEQ ID NO: 38)
         QQANTLPPT.
```

Also provided is a nucleic acid encoding a light chain of an antibody which comprises one or more of:

```
                                    (SEQ ID NO: 42)
         RASQDISNHLN (SEQ ID NO: 43)
         YTSRLHS (SEQ ID NO: 44)
         QQGKTLPPT.
```

Also provided is a host cell comprising one or more of the nucleic acids described herein.

Also provided is an antibody or fragment thereof described herein, linked or conjugated to a therapeutic agent, an imaging agent or a detectable marker.

Also provided is a method of treating sepsis in a subject comprising administering an amount of an antibody as described herein, or a human tetranectin-binding fragment thereof, effective to treat sepsis in a subject.

Also provided is a method of treating endotoxemia in a subject comprising administering an amount of an antibody as described herein, or a human tetranectin-binding fragment thereof, effective to treat endotoxemia in a subject.

Also provided is a method of treating rheumatoid arthritis in a subject comprising administering an amount of an antibody as described herein, or a human tetranectin-binding fragment thereof, effective to treat rheumatoid arthritis in a subject.

Also provided is a method of treating pain in a subject comprising administering an amount of an antibody as described herein, or a human tetranectin-binding fragment thereof, effective to treat pain in a subject.

Also provided is a method of treating, or reducing development of, ischemic/reperfusion injury in a subject comprising administering an amount of an antibody as described herein, or a human tetranectin-binding fragment thereof, effective to treat, or reduce development of, ischemic/reperfusion injury in a subject.

Also provided is a method of treating a disease associated with tetranectin depletion in a subject comprising administering an amount of an antibody as described herein, or a human tetranectin-binding fragment thereof, effective to treat tetranectin depletion a subject.

Also provided is a method of inhibiting interaction between a tetranectin and an HMGB1 in a subject comprising administering an amount of an antibody as described herein, or a human tetranectin-binding fragment thereof, effective to inhibit interaction between a tetranectin and an HMGB1 in a subject.

Also provided is a method of inhibiting cellular tetranectin uptake and/or tetranectin depletion in a subject comprising administering an amount of an antibody as described herein, or a human tetranectin-binding fragment thereof, effective to inhibit cellular tetranectin uptake and/or tetranectin depletion in a subject.

Also provided is an isolated anti-human tetranectin antibody or antibody fragment that:

(a) specifically binds to a sequence NDALYEYLRQ in a human tetranectin, the antibody or antibody fragment comprising a heavy chain variable region comprising the CDR sequences set forth in SEQ ID NOs:21-23, SEQ ID NOs:27-29, SEQ ID NOs:33-35 or SEQ ID NOs:39-41; and/or a light chain variable region comprising the CDR sequences set forth in SEQ ID NOs:24-26, SEQ ID NOs:30-32, SEQ ID NOs:36-38, or SEQ ID NOs:42-44; or (b) or cross-competes for specific binding to a sequence NDALYEYLRQ in a human tetranectin with a reference antibody or antibody fragment, said reference antibody or antibody fragment comprising a heavy chain variable region comprising the CDR sequences set forth in SEQ ID NOs: 21-23, SEQ ID NOs:27-29, SEQ ID NOs:33-35 or SEQ ID NOs:39-41; and/or a light chain variable region comprising the CDR sequences set forth in SEQ ID NOs:24-26, SEQ ID NOs:30-32, SEQ ID NOs:36-38, or SEQ ID NOs:42-44.

Also provided is a pharmaceutical composition comprising an effective amount of the antibody or antibody fragment as described herein, and a pharmaceutically acceptable carrier or excipient.

Also provided is a method of interfering with interaction between a tetranectin and an HMBG1 comprising contacting a sample comprising tetranectin and an HMBG1 with the isolated antibody or antibody fragment as described herein, so as to interfere with the interaction between a tetranectin and an HMBG1.

Also provided is use of an effective amount of an antibody or fragment thereof as described herein for the manufacture of a medicament for treating or preventing a disease or condition that is associated with tetranectin depletion in a subject.

Also provided is an antibody or antigen-binding fragment thereof comprising a heavy chain comprising one or more of:

```
                                              (SEQ ID NO: 45)
X₁X₂YMS where X₁ is T or S, and X₂ is S or Y or D (SEQ ID NO: 46)
AINX₁NGGX₂TYYPDTVKG where X₁ is R or T, and X₂ is S or N (SEQ ID NO: 47)
QX₁KNG X₂DY where X₁ is V or G, and X₂ is L or M
``` and/or a light chain comprising one or more of:

```
                                              (SEQ ID NO: 48)
RASQDIX₁NX₂LN
    where X₁ is S or G, and X₂ is Y, H or L (SEQ ID NO: 49)
X₁TSRLHS
    where X₁ is K or Y (SEQ ID NO: 50)
QQX₁X₂TLPPT
    where X₁ is G or A, and X₂ is N or K.
```

DETAILED DESCRIPTION OF THE INVENTION

Figures 1A, 1B, 1C:
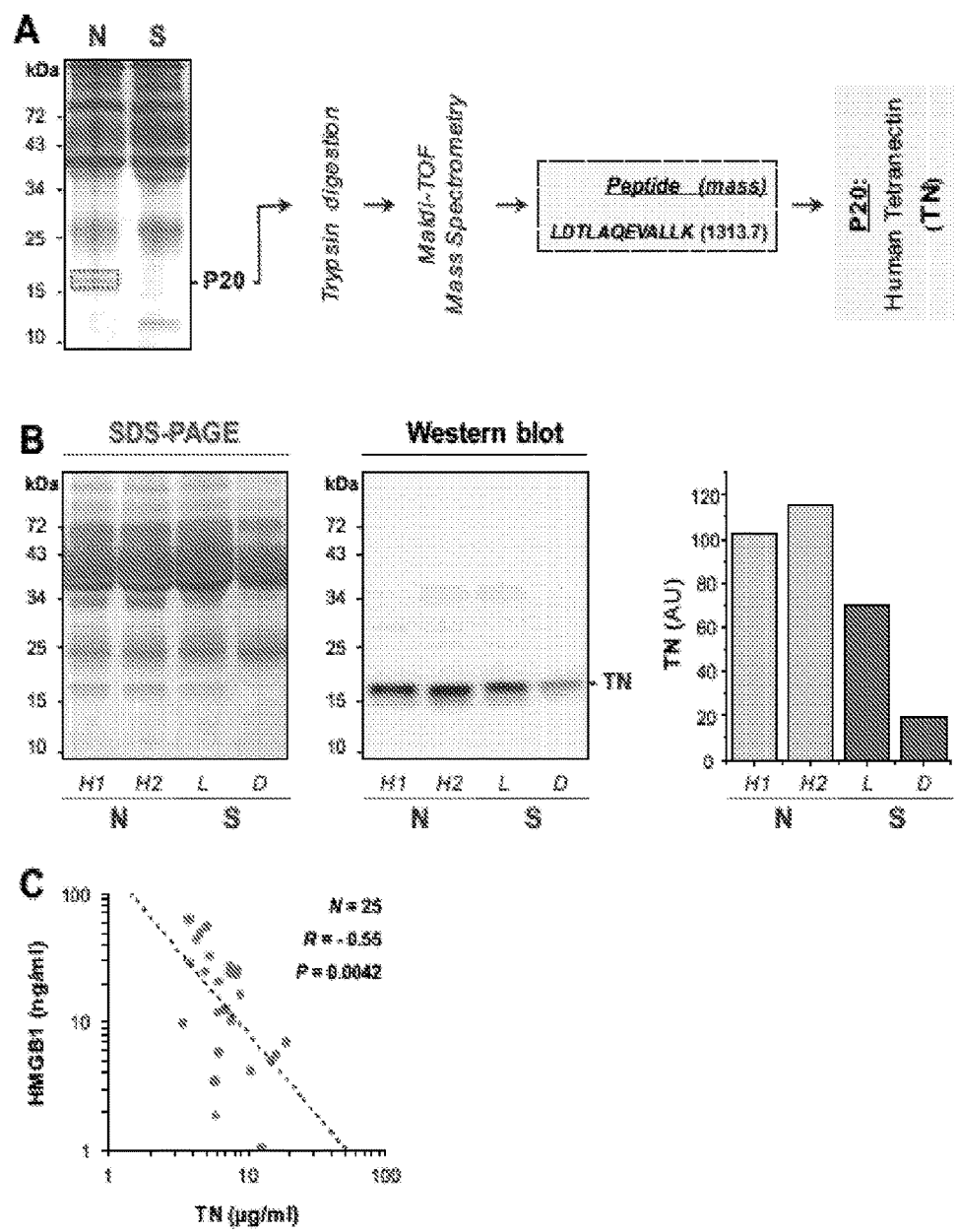
FIG. 1(A)-1(C): Identification of tetranectin (TN) as a serum protein depleted in septic patients. (A) Mass spectrometry analysis of a 20-kDa (P20) protein, which was abundant in normal healthy subjects (N) but depleted in septic patients who died (S) of sepsis soon after blood sampling. (B) Western blotting analysis of serum TN in normal healthy controls (N) and septic patients who either survived (denoted as "L") or died ("D") of sepsis soon after blood sampling. Bar graph indicated the relative TN levels in arbitrary unit (AU) in respective serum samples. (C) Correlation between serum TN and HMGB1 in septic patients. Blood samples were harvested from septic patients recruited to the Northwell Health to measure serum levels of TN and HMGB1 by Western blotting and ELISA, respectively. The Spearman correlation coefficient (r) was determined, and correlation analysis revealed a statistically significant negative correlation between serum TN and HMGB1 levels.

The disclosures of all publications, patents, patent application publications and books referred to herein, are hereby incorporated by reference in their entirety into the subject application to more fully describe the art to which the subject invention pertains.

An antibody or antigen-binding fragment thereof is provided comprising
a) a heavy chain comprising one or more of:

TDYMS (SEQ ID NO: 21)

AINSNGGTTYYPDTVKG (SEQ ID NO: 22)

QVKNGLDY (SEQ ID NO: 23)

and/or a light chain comprising one or more of:

RASQDISNYLN (SEQ ID NO: 24)

KTSRLHS (SEQ ID NO: 25)

QQGNTLPPT (SEQ ID NO: 26)

or
b) a heavy chain comprising one or more of:

SYYMS (SEQ ID NO: 27)

AINSNGGRTYYPDTVKG (SEQ ID NO: 28)

QGKNGLDY (SEQ ID NO: 29)

and/or a light chain comprising one or more of:

RASQDISNHLN (SEQ ID NO: 30)

YTSRLHS (SEQ ID NO: 31)

QQGKTLPPT (SEQ ID NO: 32)

or
c) a heavy chain comprising one or more of:

SSYMS (SEQ ID NO: 33)

AINNNGGTTYYPDTVKG (SEQ ID NO: 34)

QGKNGLDY (SEQ ID NO: 35)

and/or a light chain comprising one or more of:

RASQDIGNLLN (SEQ ID NO: 36)

YTSRLHS (SEQ ID NO: 37)

QQANTLPPT (SEQ ID NO: 38)

or
d) a heavy chain comprising one or more of:

SDYMS (SEQ ID NO: 39)

AINSNGGTTYYPDTVKG (SEQ ID NO: 40)

QGKNGMDY (SEQ ID NO: 41)

and/or a light chain comprising one or more of:

RASQDISNHLN (SEQ ID NO: 42)

YTSRLHS (SEQ ID NO: 43)

QQGKTLPPT. (SEQ ID NO: 44)

Also provided is an antibody, or antigen-binding fragment thereof, which binds to a sequence NDALYEYLRQ (SEQ ID NO:51) of a mammalian tetranectin. In an embodiment, the mammalian tetranectin is a human tetranectin. Human tetranectin is known in the art, e.g. UniProtKB—E9PHK0.

Also provided is an antibody, or an antigen-binding fragment thereof, which comprises a heavy chain comprising one or more of:

TDYMS (SEQ ID NO: 21)

AINSNGGTTYYPDTVKG (SEQ ID NO: 22)

QVKNGLDY (SEQ ID NO: 23)

and/or a light chain comprising one or more of:

RASQDISNYLN (SEQ ID NO: 24)

KTSRLHS (SEQ ID NO: 25)

QQGNTLPPT. (SEQ ID NO: 26)

Also provided is an antibody, or an antigen-binding fragment thereof, which comprises a heavy chain comprising one or more of:

SYYMS (SEQ ID NO: 27)

AINSNGGRTYYPDTVKG (SEQ ID NO: 28)

QGKNGLDY (SEQ ID NO: 29)

and/or a light chain comprising one or more of:

RASQDISNHLN (SEQ ID NO: 30)

YTSRLHS (SEQ ID NO: 31)

QQGKTLPPT. (SEQ ID NO: 32)

Also provided is an antibody, or an antigen-binding fragment thereof, which comprises a heavy chain comprising one or more of:

SSYMS (SEQ ID NO: 33)

AINNNGGTTYYPDTVKG (SEQ ID NO: 34)

QGKNGLDY (SEQ ID NO: 35)

and/or a light chain comprising one or more of:

RASQDIGNLLN (SEQ ID NO: 36)

YTSRLHS (SEQ ID NO: 37)

QQANTLPPT. (SEQ ID NO: 38)

Also provided is an antibody, or an antigen-binding fragment thereof, which comprises a heavy chain comprising one or more of:

SDYMS (SEQ ID NO: 39)

AINSNGGTTYYPDTVKG (SEQ ID NO: 40)

QGKNGMDY (SEQ ID NO: 41)

and/or a light chain comprising one or more of:

RASQDISNHLN (SEQ ID NO: 42)

YTSRLHS (SEQ ID NO: 43)

QQGKTLPPT. (SEQ ID NO: 44)

In embodiments of the antibodies or fragments thereof described herein, framework regions of the light chain and/or the heavy chain are human framework regions. In embodiments of the antibodies or fragments thereof described herein, framework regions of the light chain and/or the heavy chain have 85% or more identity to human framework regions.

Also provided is an isolated antibody or antigen-binding fragment thereof which binds to a sequence NDALYEYLRQ (SEQ ID NO:51) of a human tetranectin with an affinity of 3.0 nM $K_D$ or stronger.

Also provided is an isolated antibody or antigen-binding fragment thereof which binds to a sequence NDALYEYLRQ (SEQ ID NO:51) of a human tetranectin with an affinity of 2.0 nM $K_D$ or stronger. In embodiments, the affinity of the isolated antibody or antigen-binding fragment to sequence NDALYEYLRQ (SEQ ID NO:51) of a tetranectin protein is of 1.0 nM $K_D$ or stronger. In embodiments, the affinity of the isolated antibody or antigen-binding fragment to sequence NDALYEYLRQ (SEQ ID NO:51) of a tetranectin protein is of 0.5 nM $K_D$ or stronger.

In embodiments of the antibodies or fragments thereof described herein, the antibody or antigen-binding fragment thereof has a human sequence Fc region.

In embodiments of the antibodies or fragments thereof described herein, the antibody or antigen-binding fragment thereof is chimeric. In embodiments of the antibodies or fragments thereof described herein, the antibody or antigen-binding fragment thereof is chimeric (mouse-human). In embodiments of the antibodies or fragments thereof described herein, the antibody or antigen-binding fragment thereof is humanized.

In embodiments of the antibodies or fragments thereof described herein, the antibody or fragment thereof is selected from the group consisting of a monoclonal antibody, an scFv, an Fab fragment, an Fab' fragment, an F(ab)' fragment and a bispecific antibody.

In embodiments of the antibodies or fragments thereof described herein, the antibody is a humanized antibody and is an IgG 1(λ) or an IgG2(λ).

In embodiments of the antibodies or fragments thereof described herein, the antibody or fragment inhibits interaction between a tetranectin that it binds and an HMGB1.

In embodiments of the antibodies or fragments thereof described herein, the antibody or fragment inhibits cellular tetranectin uptake and/or tetranectin depletion in a subject when administered to the subject.

Also provided is a nucleic acid encoding a heavy chain of an antibody which comprises one or more of:

TDYMS (SEQ ID NO: 21)

AINSNGGTTYYPDTVKG (SEQ ID NO: 22)

QVKNGLDY. (SEQ ID NO: 23)

Also provided is a nucleic acid encoding a heavy chain of an antibody which comprises one or more of:

SYYMS (SEQ ID NO: 27)

AINSNGGRTYYPDTVKG (SEQ ID NO: 28)

QGKNGLDY. (SEQ ID NO: 29)

Also provided is a nucleic acid encoding a heavy chain of an antibody which comprises one or more of:

SSYMS (SEQ ID NO: 33)

AINNNGGTTYYPDTVKG (SEQ ID NO: 34)

QGKNGLDY. (SEQ ID NO: 35)

Also provided is a nucleic acid encoding a heavy chain of an antibody which comprises one or more of:

SDYMS (SEQ ID NO: 39)

AINSNGGTTYYPDTVKG (SEQ ID NO: 40)

QGKNGMDY (SEQ ID NO: 41)

Also provided is a nucleic acid encoding a light chain of an antibody which comprises one or more of:

RASQDISNYLN (SEQ ID NO: 24)

KTSRLHS (SEQ ID NO: 25)

QQGNTLPPT. (SEQ ID NO: 26)

Also provided is a nucleic acid encoding a light chain of an antibody which comprises one or more of:

RASQDISNHLN (SEQ ID NO: 30)

YTSRLHS (SEQ ID NO: 31)

QQGKTLPPT. (SEQ ID NO: 32)

Also provided is a nucleic acid encoding a light chain of an antibody which comprises one or more of:

RASQDIGNLLN (SEQ ID NO: 36)

YTSRLHS (SEQ ID NO: 37)

QQANTLPPT. (SEQ ID NO: 38)

Also provided is a nucleic acid encoding a light chain of an antibody which comprises one or more of:

RASQDISNHLN (SEQ ID NO: 42)

YTSRLHS (SEQ ID NO: 43)

QQGKTLPPT. (SEQ ID NO: 44)

In embodiments, nucleic acid described herein is a cDNA. In embodiments, nucleic acid described herein is a DNA. In embodiments, nucleic acid described herein is an RNA. In embodiments, nucleic acid described herein is an isolated nucleic acid.

Also provided is a host cell comprising one or more of the nucleic acids described herein. In embodiments, the host cell is a mammalian cell. In embodiments, the host cell is derived from a mammalian cell. In embodiments, the host cell is a CHO, NS0, Sp2/0, HEK293, or PER.C6 cell.

Also provided is an antibody or fragment thereof described herein, linked or conjugated to a therapeutic agent, an imaging agent or a detectable marker. In embodiments, the therapeutic agent is a cytotoxic drug, an anti-inflammatory drug, a radioactive isotope, an immunomodulator, or a second antibody (which does not bind tetranectin).

Also provided is a method of treating sepsis in a subject comprising administering an amount of an antibody as described herein, or a human tetranectin-binding fragment thereof, effective to treat sepsis in a subject.

Also provided is a method of treating endotoxemia in a subject comprising administering an amount of an antibody as described herein, or a human tetranectin-binding fragment thereof, effective to treat endotoxemia in a subject.

Also provided is a method of treating rheumatoid arthritis in a subject comprising administering an amount of an antibody as described herein, or a human tetranectin-binding fragment thereof, effective to treat rheumatoid arthritis in a subject.

Also provided is a method of treating pain in a subject comprising administering an amount of an antibody as described herein, or a human tetranectin-binding fragment thereof, effective to treat pain in a subject. In embodiments, the pain is neuropathic pain.

Also provided is a method of treating, or reducing development of, ischemic/reperfusion injury (i/r injury) in a subject comprising administering an amount of an antibody as described herein, or a human tetranectin-binding fragment thereof, effective to treat, or reduce development of, ischemic/reperfusion injury in a subject. In embodiments, the i/r injury is i/r injury to an organ. In embodiments, the i/r injury is hepatic, intestinal, renal or cardiac.

Also provided is a method of treating a disease associated with tetranectin depletion in a subject comprising administering an amount of an antibody as described herein, or a human tetranectin-binding fragment thereof, effective to treat tetranectin depletion a subject.

Also provided is a method of inhibiting interaction between a tetranectin and an HMGB1 in a subject comprising administering an amount of an antibody as described herein, or a human tetranectin-binding fragment thereof, effective to inhibit interaction between a tetranectin and an HMGB1 in a subject.

Also provided is a method of inhibiting cellular tetranectin uptake and/or tetranectin depletion in a subject comprising administering an amount of an antibody as described herein, or a human tetranectin-binding fragment thereof, effective to inhibit cellular tetranectin uptake and/or tetranectin depletion in a subject.

In embodiments of the methods, sepsis-induced or endotoxemia-induced lung damage is reduced. In embodiments of the methods, sepsis-induced or endotoxemia-induced liver enzyme elevation is reduced. In embodiments of the methods, sepsis-induced or endotoxemia-induced bacterial load is reduced.

In embodiments, the subject is mammalian. In embodiments, the subject is human. In embodiments, the subject is administered the antibody or fragment thereof prophylactically. In embodiments, the subject is administered the antibody or fragment thereof when it is suspected by the treatment administrator that the subject may experience the pathology (e.g. sepsis, endotoxemia, etc.). In embodiments, the subject being administered the antibody or fragment thereof is already experiencing the disease state/has the pathology.

Also provided is an isolated anti-human tetranectin antibody or antibody fragment that:
(a) specifically binds to a sequence NDALYEYLRQ in a human tetranectin, the antibody or antibody fragment comprising a heavy chain variable region comprising the CDR sequences set forth in SEQ ID NOs:21-23, SEQ ID NOs: 27-29, SEQ ID NOs:33-35 or SEQ ID NOs:39-41; and/or a light chain variable region comprising the CDR sequences set forth in SEQ ID NOs:24-26, SEQ ID NOs:30-32, SEQ ID NOs:36-38, or SEQ ID NOs:42-44; or
(b) or cross-competes for specific binding to a sequence NDALYEYLRQ in a human tetranectin with a reference antibody or antibody fragment, said reference antibody or antibody fragment comprising a heavy chain variable region comprising the CDR sequences set forth in SEQ ID NOs: 21-23, SEQ ID NOs:27-29, SEQ ID NOs:33-35 or SEQ ID NOs:39-41; and/or a light chain variable region comprising the CDR sequences set forth in SEQ ID NOs:24-26, SEQ ID NOs:30-32, SEQ ID NOs:36-38, or SEQ ID NOs:42-44.

In embodiments, the isolated antibody or antigen-binding fragment thereof inhibits interaction between a tetranectin that it binds and an HMGB1.

In embodiments, the isolated antibody or antigen-binding fragment thereof inhibits cellular tetranectin uptake and/or tetranectin depletion in a subject when administered to the subject.

In embodiments, the heavy chain variable region comprises an amino acid sequence comprising at least 85% sequence identity to SEQ ID NO:4 or SEQ ID NO:8 or SEQ ID NO:12 or SEQ ID NO:16.

In embodiments, the light chain variable region comprises an amino acid sequence comprising at least 85% sequence identity to SEQ ID NO:6 or SEQ ID NO:10 or SEQ ID NO:14 or SEQ ID NO:18.

Also provided is a pharmaceutical composition comprising an effective amount of the antibody or antibody fragment as described herein, and a pharmaceutically acceptable carrier or excipient.

Also provided is a method of interfering with interaction between a tetranectin and an HMBG1 comprising contacting a sample comprising tetranectin and an HMBG1 with the isolated antibody or antibody fragment as described herein, so as to interfere with the interaction between a tetranectin and an HMBG1.

Also provided is use of an effective amount of an antibody or fragment thereof as described herein for the manufacture of a medicament for treating or preventing a disease or condition that is associated with tetranectin depletion in a subject.

Also provided is an antibody or antigen-binding fragment thereof comprising a heavy chain comprising one or more of:

```
                                              (SEQ ID NO: 45)
X₁X₂YMS
where X₁ is T or S, and X₂ is S or Y or D (SEQ ID NO: 46)
AINX₁NGGX₂TYYPDTVKG
where X₁ is R or T, and X₂ is S or N (SEQ ID NO: 47)
QX₁KNGX₂DY
where X₁ is V or G, and X₂ is L or M
``` and/or a light chain comprising one or more of:

```
                                              (SEQ ID NO: 48)
RASQDIX₁NX₂LN
where X₁ is S or G, and X₂ is Y, H or L (SEQ ID NO: 49)
X₁TSRLHS
where X₁ is K or Y (SEQ ID NO: 50)
QQX₁X₂TLPPT
where X₁ is G or A, and X₂ is N or K.
```

In embodiments, the antibody or antigen-binding fragment thereof comprises:
a heavy chain comprising:

```
                                              (SEQ ID NO: 45)
X₁X₂YMS
where X₁ is T or S, and X₂ is S or Y or D,
and (SEQ ID NO: 46)
AINX₁NGGX₂TYYPDTVKG
where X₁ is R or T, and X₂ is S or N,
and (SEQ ID NO: 47)
QX₁KNGX₂DY
where X₁ is V or G, and X₂ is L or M;
``` and a light chain comprising:

```
                                              (SEQ ID NO: 48)
RASQDIX₁NX₂LN
where X₁ is S or G, and X₂ is Y, H or L,
and (SEQ ID NO: 49)
X₁TSRLHS
where X₁ is K or Y,
and (SEQ ID NO: 50)
QQX₁X₂TLPPT
where X₁ is G or A, and X₂ is N or K.
```

In embodiments of the antibodies and fragments described herein, the framework regions of the light chain and the heavy chain are human framework regions, or have 85% or more identify thereto.

In embodiments of the antibodies and fragments described herein, the framework regions of the light chain and the heavy chain are human framework regions.

In embodiments, the isolated antibody or antigen-binding fragment thereof has a human sequence Fc region.

In embodiments, the isolated antibody or antigen-binding fragment thereof the antibody or fragment thereof is chimeric or humanized.

In embodiments, the isolated antibody or antigen-binding fragment thereof the antibody or fragment thereof is selected from the group consisting of a monoclonal antibody, an scFv, an Fab fragment, an Fab' fragment, and an F(ab)' fragment. It is noted that while an scFv is not strictly a fragment of an antibody, rather it is a fusion protein, herein a fragment of an antibody includes an scFv unless otherwise excluded.

A host cell is provided comprising one or more of the nucleic acids described herein.

An antibody or fragment thereof described herein is provided linked or conjugated to a therapeutic agent.

In embodiments, the therapeutic agent is a cytotoxic drug, a radioactive isotope, an immunomodulator, or a second antibody.

A method of detecting a human tetranectin in a subject is provided comprising administering an amount of an antibody or fragment thereof as described herein, having a detectable marker conjugated thereto, in an amount effective to label a human tetranectin and then detecting the presence of the label in the subject, thereby detecting a tetranectin in a subject. In embodiments, the label is detected by imaging. In embodiments, the cell is a cancer cell.

In embodiments, the anti-tetranectin antibody fragment thereof, comprises (i) a VH framework comprising the framework sequence of human germline IGHV1-2*02, IGHV1-2*04, IGHV1-2*05, IGHV1-18*04, IGHV1-69-2*01, IGHV1-46*01, IGHD5-12*01, IGHD5-24*01, IGHD6-25*01, IGHJ3*01, IGHJ4*01, IGHJ4*03, IGHJ6*01, IGHJ6*02 and/or (ii) a VL framework comprising the framework sequence of human germline IGKV1-13*02, IGKV1-27*01, IGKV3-7*02, IGKV4-1*01, IGKV1D-13*02, IGKV3D-7*01, IGKJ1*01, IGKJ2*01, IGKJ4*01, IGKJ4*02.

In embodiments, the anti-tetranectin antibody or fragment thereof is a monoclonal antibody.

In embodiments, the anti-tetranectin antibody or fragment thereof is a recombinant antibody.

In embodiments, the anti-tetranectin antibody or fragment thereof has a human framework region.

In embodiments, the anti-tetranectin antibody or fragment thereof has a human constant region.

In embodiments, the anti-tetranectin antibody is provided. In embodiments, the fragment of the antibody is provided. In embodiments, the anti-tetranectin antibody fragment is an Fab, F(ab)2 or scFv.

As used herein, the term "antibody" refers to an intact antibody, i.e. with complete Fc and Fv regions. "Fragment" refers to any portion of an antibody, or portions of an antibody linked together, such as, in non-limiting examples, a Fab, F(ab)2, a single-chain Fv (scFv), which is less than the whole antibody but which is an antigen-binding portion and which competes with the intact antibody of which it is a fragment for specific binding. In this case, the antigen is sequence found in human tetranectin, as described elsewhere herein.

Such fragments can be prepared, for example, by cleaving an intact antibody or by recombinant means. See generally, Fundamental Immunology, Ch. 7 (Paul, W., ed., 2nd ed. Raven Press, N.Y. (1989), hereby incorporated by reference in its entirety). Antigen-binding fragments may be produced by recombinant DNA techniques or by enzymatic or chemical cleavage of intact antibodies or by molecular biology techniques. In some embodiments, a fragment is an Fab, Fab', F(ab')2, Fd, Fv, complementarity determining region (CDR) fragment, single-chain antibody (scFv), (a variable domain light chain (VL) and a variable domain heavy chain (VH) linked via a peptide linker. In an embodiment, the scFv comprises a variable domain framework sequence having a sequence identical to a human variable domain FR1, FR2, FR3 or FR4. In an embodiment, the scFv comprises a linker peptide from 5 to 30 amino acid residues long. In an embodiment, the scFv comprises a linker peptide comprising one or more of glycine, serine and threonine residues.

In an embodiment the linker of the scFv is 10-25 amino acids in length. In an embodiment the peptide linker comprises glycine, serine and/or threonine residues. For example, see Bird et al., Science, 242: 423-426 (1988) and Huston et al., Proc. Natl. Acad. Sci. USA, 85:5879-5883 (1988) each of which are hereby incorporated by reference in their entirety), or a polypeptide that contains at least a portion of an antibody that is sufficient to confer specific antigen binding on the polypeptide, including a diabody. From N-terminus to C-terminus, both the mature light and heavy chain variable domains comprise the regions FR1, CDR1, FR2, CDR2, FR3, CDR3 and FR4. The assignment of amino acids to each domain is in accordance with the definitions of Kabat, Sequences of Proteins of Immunological Interest (National Institutes of Health, Bethesda, Md. (1987 and 1991)), Chothia & Lesk, J. Mol. Biol. 196:901-917 (1987), or Chothia et al., Nature 342:878-883 (1989), each of which are hereby incorporated by reference in their entirety). As used herein, the term "polypeptide" encompasses native or artificial proteins, protein fragments and polypeptide analogs of a protein sequence. A polypeptide may be monomeric or polymeric. As used herein, an Fd fragment means an antibody fragment that consists of the VH and CH1 domains; an Fv fragment consists of the V1 and VH domains of a single arm of an antibody; and a dAb fragment (Ward et al., Nature 341:544-546 (1989) hereby incorporated by reference in its entirety) consists of a VH domain. In some embodiments, fragments are at least 5, 6, 8 or 10 amino acids long. In other embodiments, the fragments are at least 14, at least 20, at least 50, or at least 70, 80, 90, 100, 150 or 200 amino acids long.

The term "monoclonal antibody" as used herein refers to an antibody member of a population of substantially homogeneous antibodies, i.e., the individual antibodies comprising the population are identical except for possible mutations, e.g., naturally occurring mutations, that may be present in minor amounts. Thus, the modifier "monoclonal" indicates the character of the antibody as not being a mixture of discrete antibodies. In contrast to polyclonal antibody preparations, which typically include different antibodies directed against different determinants (epitopes), each monoclonal antibody of a monoclonal antibody preparation is directed against a single determinant on an antigen. In addition to their specificity, monoclonal antibody preparations are advantageous in that they are typically uncontaminated by other immunoglobulins. Thus, an identified monoclonal antibody can be produced by non-hybridoma techniques, e.g. by appropriate recombinant means once the sequence thereof is identified.

In an embodiment of the inventions described herein, the antibody is isolated. As used herein, the term "isolated antibody" refers to an antibody that by virtue of its origin or source of derivation has one, two, three or four of the following: (1) is not associated with naturally associated components that accompany it in its native state, (2) is free of other proteins from the same species, (3) is expressed by a cell from a different species, and (4) does not occur in nature absent the hand of man.

In an embodiment the antibody is humanized. "Humanized" forms of non-human (e.g., murine) antibodies are chimeric antibodies that contain minimal sequence derived from non-human immunoglobulin. In one embodiment, a humanized antibody is a human immunoglobulin (recipient antibody) in which residues from a hypervariable region (HVR) (or CDR) of the recipient are replaced by residues from a HVR (or CDR) of a non-human species (donor antibody) such as mouse, rat, rabbit, or nonhuman primate having the desired specificity, affinity, and/or capacity. In an embodiment, the antibody has 1, 2, 3, 4, 5, or all 6 CDR1-3 of both the heavy and light chain of the antibodies described herein. In a preferred embodiment, framework (FR) residues of the murine mAb are replaced with corresponding human immunoglobulin variable domain framework (FR) residues. These may be modified further in embodiments to further refine antibody performance. Furthermore, in a specific embodiment, humanized antibodies may comprise residues that are not found in the recipient antibody or in the donor antibody. In an embodiment, the humanized antibodies do not comprise residues that are not found in the recipient antibody or in the donor antibody. In general, a humanized antibody will comprise substantially all of at least one, and typically two, variable domains, in which all, or in embodiments substantially all, of the hypervariable loops correspond to those of a non-human immunoglobulin, and all, or in embodiments substantially all, of the FRs are those of a human immunoglobulin sequence. The humanized antibody optionally will also comprise at least a portion of an immunoglobulin constant region (Fc), typically that of a human immunoglobulin. See, e.g., Jones et al., Nature 321:522-525 (1986); Riechmann et al., Nature 332:323-329 (1988); Presta, Curr. Op. Struct. Biol. 2:593-596 (1992); Vaswani and Hamilton, Ann. Allergy, Asthma & Immunol. 1:105-115 (1998); Harris, Biochem. Soc. Transactions 23:1035-1038 (1995); Hurle and Gross, Curr. Op. Biotech. 5:428-433 (1994); and U.S. Pat. Nos. 6,982,321 and 7,087,409, the contents of each of which references and patents are hereby incorporated by reference in their entirety. In one embodiment where the humanized antibodies do comprise residues that are not found in the recipient antibody or in the donor antibody, the Fc regions of the antibodies are modified as described in WO 99/58572, the content of which is hereby incorporated by reference in its entirety.

Techniques to humanize a monoclonal antibody are well known and are described in, for example, U.S. Pat. Nos. 4,816,567; 5,807,715; 5,866,692; 6,331,415; 5,530,101; 5,693,761; 5,693,762; 5,585,089; and 6,180,370, the content of each of which is hereby incorporated by reference in its entirety. A number of "humanized" antibody molecules comprising an antigen-binding site derived from a non-human immunoglobulin have been described, including antibodies having rodent or modified rodent V regions and their associated complementarity determining regions (CDRs) fused to human constant domains. See, for example, Winter et al. Nature 349: 293-299 (1991), Lobuglio et al. Proc. Nat. Acad. Sci. USA 86: 4220-4224 (1989), Shaw et al. J. Immunol. 138: 4534-4538 (1987), and Brown et al. Cancer Res. 47: 3577-3583 (1987), the content of each of which is hereby incorporated by reference in its entirety. Other references describe rodent hypervariable regions or CDRs grafted into a human supporting framework region (FR) prior to fusion with an appropriate human antibody constant domain. See, for example, Riechmann et al. Nature 332: 323-327 (1988), Verhoeyen et al. Science 239: 1534-1536 (1988), and Jones et al. Nature 321: 522-525 (1986), the content of each of which is hereby incorporated by reference in its entirety. Another reference describes rodent CDRs supported by recombinantly veneered rodent framework regions—European Patent Publication No. 0519596 (incorporated by reference in its entirety). These "human-ized" molecules are designed to minimize unwanted immunological response toward rodent anti-human antibody molecules which limits the duration and effectiveness of therapeutic applications of those moieties in human recipients. The antibody constant region can be engineered such that it is immunologically inert (e.g., does not trigger complement lysis). See, e.g. PCT Publication No. WO99/58572; UK Patent Application No. 9809951.8. Other methods of humanizing antibodies that may also be utilized are disclosed by Daugherty et al., Nucl. Acids Res. 19: 2471-2476 (1991) and in U.S. Pat. Nos. 6,180,377; 6,054,297; 5,997,867; 5,866,692; 6,210,671; and 6,350,861; and in PCT Publication No. WO 01/27160 (each incorporated by reference in their entirety).

Other forms of humanized antibodies have one or more, or all, CDRs (CDR L1, CDR L2, CDR L3, CDR H1, CDR H2, or CDR H3) which are altered with respect to the original antibody, which are also termed one or more CDRs "derived from" one or more CDRs from the original antibody.

In embodiments, the antibodies or fragments herein can be produced recombinantly, for example antibodies expressed using a recombinant expression vector transfected into a host cell, antibodies isolated from a recombinant, combinatorial human antibody library, antibodies isolated from an animal (e.g., a mouse) that is transgenic for human immunoglobulin genes.

The term "$K_d$", as used herein, is intended to refer to the dissociation constant of an antibody-antigen interaction. One way of determining the $K_d$ or binding affinity of antibodies to the specified antigen is by measuring binding affinity of monofunctional Fab fragments of the antibody. (The affinity constant is the inverted dissociation constant). To obtain monofunctional Fab fragments, an antibody (for example, IgG) can be cleaved with papain or expressed recombinantly. The affinity of a fragment of an antibody antibody can be determined, for example, by surface plasmon resonance (BIAcore3000™ surface plasmon resonance (SPR) system, BIAcore Inc., Piscataway N.J.). CM5 chips can be activated with N-ethyl-N'-(3-dimethylaminopropyl)-carbodiimide hydrochloride (EDC) and N-hydroxysuccinimide (NHS) according to the supplier's instructions. The antigen can be diluted into 10 mM sodium acetate pH 4.0 and injected over the activated chip at a concentration of 0.005 mg/mL. Using variable flow time across the individual chip channels, two ranges of antigen density can be achieved: 100-200 response units (RU) for detailed kinetic studies and 500-600 RU for screening assays. Serial dilutions (0.1-10× estimated $K_d$) of purified Fab samples are injected for 1 min at 100 microliters/min and dissociation times of up to 2 h are allowed. The concentrations of the Fab proteins are determined by ELISA and/or SDS-PAGE electrophoresis using a Fab of known concentration (as determined by amino acid analysis) as a standard. Kinetic association rates ($k_{on}$) and dissociation rates ($k_{off}$) are obtained simultaneously by fitting the data to a 1:1 Langmuir binding model (Karlsson, R. Roos, H. Fagerstam, L. Petersson, B. (1994). Methods Enzymology 6. 99-110, the content of which is hereby incorporated in its entirety) using the BIA evaluation program. Equilibrium dissociation constant ($K_d$) values are calculated as $k_{off}/k_{on}$. This protocol is suitable for use in determining binding affinity of an antibody or fragment to any antigen. Other protocols known in the art may also be used. For example, ELISA.

An epitope that "specifically binds" to an antibody or a polypeptide is a term well understood in the art, and methods to determine such specific or preferential binding are also well known in the art. A molecular entity is said to exhibit "specific binding" or "preferential binding" if it reacts or associates more frequently, more rapidly, with greater duration and/or with greater affinity with a particular cell or substance than it does with alternative cells or substances. An antibody "specifically binds" or "preferentially binds" to a target if it binds with greater affinity, avidity, more readily, and/or with greater duration than it binds to other substances. For example, an antibody that specifically or preferentially binds to a given sequence in tetranectin is an antibody that binds this epitope with greater affinity, avidity, more readily, and/or with greater duration than it binds to other epitopes. It is also understood by reading this definition that, for example, an antibody (or moiety or epitope) that specifically or preferentially binds to a first target may or may not specifically or preferentially bind to a second target. As such, "specific binding" or "preferential binding" does not necessarily require (although it can include) exclusive binding.

Depending on the amino acid sequences of the constant domains of their heavy chains, antibodies (immunoglobulins) can be assigned to different classes. The antibody or fragment can be, e.g., any of an IgG, IgD, IgE, IgA or IgM antibody or fragment thereof, respectively. In an embodiment the antibody is an immunoglobulin G. In an embodiment the antibody fragment is a fragment of an immunoglobulin G. In an embodiment the antibody is an IgG1, IgG2, IgG2a, IgG2b, IgG3 or IgG4. In an embodiment the antibody comprises sequences from a human IgG1, human IgG2, human IgG2a, human IgG2b, human IgG3 or human IgG4. A combination of any of these antibody subtypes can also be used. One consideration in selecting the type of antibody to be used is the desired serum half-life of the antibody. For example, an IgG generally has a serum half-life of 23 days, IgA 6 days, IgM 5 days, IgD 3 days, and IgE 2 days. (Abbas A K, Lichtman A H, Pober J S. Cellular and Molecular Immunology, 4th edition, W.B. Saunders Co., Philadelphia, 2000, hereby incorporated by reference in its entirety).

The "variable region" or "variable domain" of an antibody refers to the amino-terminal domains of the heavy or light chain of the antibody. The variable domain of the heavy chain may be referred to as "VH." The variable domain of the light chain may be referred to as "VL." These domains are generally the most variable parts of an antibody and contain the antigen-binding sites. The term "variable" refers to the fact that certain portions of the variable domains differ extensively in sequence among antibodies and are used in the binding and specificity of each particular antibody for its particular antigen. However, the variability is not evenly distributed throughout the variable domains of antibodies. It is concentrated in three segments called hypervariable regions (HVRs) (or CDRs) both in the light-chain and the heavy-chain variable domains. The more highly conserved portions of variable domains are called the framework regions (FR). The variable domains of native heavy and light chains each comprise four FR regions, largely adopting a beta-sheet configuration, connected by three CDRs, which form loops connecting, and in some cases forming part of, the beta-sheet structure. The CDRs in each chain are held together in close proximity by the FR regions and, with the CDRs from the other chain, contribute to the formation of the antigen-binding site of antibodies (see Kabat et al., Sequences of Proteins of Immunological Interest, Fifth Edition, National Institute of Health, Bethesda, Md. (1991)). The constant domains are not involved directly in the binding of an antibody to an antigen, but exhibit various effector functions, such as participation of the antibody in antibody-dependent cellular toxicity.

The "light chains" of antibodies (immunoglobulins) from any vertebrate species can be assigned to one of two clearly distinct types, called kappa (κ) and lambda (λ), based on the amino acid sequences of their constant domains.

"Framework" or "FR" residues are those variable domain residues other than the HVR residues as herein defined.

The term "hypervariable region" or "HVR" when used herein refers to the regions of an antibody variable domain which are hypervariable in sequence and/or form structurally defined loops. Generally, antibodies comprise six HVRs; three in the VH (H1, H2, H3) and three in the VL (L1, L2, L3). In native antibodies, H3 and L3 display the most diversity of the six HVRs, and H3 in particular is believed to play a unique role in conferring fine specificity to antibodies. See, e.g., Xu et al., Immunity 13:37-45 (2000); Johnson and Wu, in Methods in Molecular Biology 248:1-25 (Lo, ed., Human Press, Totowa, N.J., 2003). Indeed, naturally occurring camelid antibodies consisting of a heavy chain only are functional and stable in the absence of light chain. See, e.g., Hamers-Casterman et al., Nature 363:446-448 (1993); Sheriff et al., Nature Struct. Biol. 3:733-736 (1996). A number of HVR delineations are in use and are encompassed herein. The Kabat Complementarity Determining Regions (CDRs) are based on sequence variability and are the most commonly used (Kabat et al., Sequences of Proteins of Immunological Interest, 5th Ed. Public Health Service, National Institutes of Health, Bethesda, Md. (1991) hereby incorporated by reference in its entirety). There are CDRs 1, 2, and 3 for each of the heavy and light chains. Chothia refers instead to the location of the structural loops (Chothia and Lesk, J. Mol. Biol. 196:901-917 (1987)). The AbM HVRs represent a compromise between the Kabat HVRs and Chothia structural loops and are used by Oxford Molecular's AbM antibody modeling software. The "contact" HVRs are based on an analysis of the available complex crystal structures. HVRs may comprise "extended HVRs" as follows: 24-36 or 24-34 (L1), 46-56 or 50-56 (L2) and 89-97 or 89-96 (L3) in the VL and 26-35 (H1), 50-65 or 49-65 (H2) and 93-102, 94-102, or 95-102 (H3) in the VH. The variable domain residues are numbered according to Kabat et al., supra, for each of these definitions.

The term "Fc region" herein is used to define a C-terminal region of an immunoglobulin heavy chain, including native sequence Fc regions and variant Fc regions. Although the boundaries of the Fc region of an immunoglobulin heavy chain might vary, the human IgG heavy chain Fc region is usually defined to stretch from an amino acid residue at position Cys226, or from Pro230, to the carboxyl-terminus thereof. The C-terminal lysine of the Fc region may be removed, for example, during production or purification of the antibody, or by recombinantly engineering the nucleic acid encoding a heavy chain of the antibody. Accordingly, an intact antibody as used herein may be an antibody with or without the otherwise C-terminal lysine. In an embodiment, the Fc domain has the same sequence or 99% or greater sequence similarity with a human IgG1 Fc domain. In an embodiment, the Fc domain has the same sequence or 99% or greater sequence similarity with a human IgG2 Fc domain. In an embodiment, the Fc domain has the same sequence or 99% or greater sequence similarity with a human IgG3 Fc domain. In an embodiment, the Fc domain has the same sequence or 99% or greater sequence similarity with a human IgG4 Fc domain. In an embodiment, the Fc domain is not mutated. In an embodiment, the Fc domain is mutated at the CH2-CH3 domain interface to increase the affinity of IgG for FcRn at acidic but not neutral pH (DalPAcqua et al, 2006; Yeung et al, 2009). In an embodiment, the Fc domain has the same sequence as a human IgG1 Fc domain.

Compositions or pharmaceutical compositions comprising the antibodies, ScFvs or fragments of antibodies disclosed herein are preferably comprise stabilizers to prevent loss of activity or structural integrity of the protein due to the effects of denaturation, oxidation or aggregation over a period of time during storage and transportation prior to use. The compositions or pharmaceutical compositions can comprise one or more of any combination of salts, surfactants, pH and tonicity agents such as sugars can contribute to overcoming aggregation problems. Where a composition or pharmaceutical composition of the present invention is used as an injection, it is desirable to have a pH value in an approximately neutral pH range, it is also advantageous to minimize surfactant levels to avoid bubbles in the formulation which are detrimental for injection into subjects. In an embodiment, the composition or pharmaceutical composition is in liquid form and stably supports high concentrations of bioactive antibody in solution and is suitable for inhalational or parenteral administration. In an embodiment, the composition or pharmaceutical composition is suitable for intravenous, intramuscular, intraperitoneal, intradermal and/or subcutaneous injection. In an embodiment, the composition or pharmaceutical composition is in liquid form and has minimized risk of bubble formation and anaphylactoid side effects. In an embodiment, the composition or pharmaceutical composition is isotonic. In an embodiment, the composition or pharmaceutical composition has a pH or 6.8 to 7.4.

In an embodiment the ScFvs or fragments of antibodies disclosed herein are lyophilized and/or freeze dried and are reconstituted for use.

Examples of pharmaceutically acceptable carriers include, but are not limited to, phosphate buffered saline solution, sterile water (including water for injection USP), emulsions such as oil/water emulsion, and various types of wetting agents. Preferred diluents for aerosol or parenteral administration are phosphate buffered saline or normal (0.9%) saline, for example 0.9% sodium chloride solution, USP. Compositions comprising such carriers are formulated by well known conventional methods (see, for example, Remington's Pharmaceutical Sciences, 18th edition, A. Gennaro, ed., Mack Publishing Co., Easton, Pa., 1990; and Remington, The Science and Practice of Pharmacy 20th Ed. Mack Publishing, 2000, the content of each of which is hereby incorporated in its entirety). In non-limiting examples, the can comprise one or more of dibasic sodium phosphate, potassium chloride, monobasic potassium phosphate, polysorbate 80 (e.g. 2-[2-[3,5-bis(2-hydroxyethoxy) oxolan-2-yl]-2-(2-hydroxyethoxy)ethoxy]ethyl (E)-octadec-9-enoate), disodium edetate dehydrate, sucrose, monobasic sodium phosphate monohydrate, and dibasic sodium phosphate dihydrate.

The antibodies, or fragments of antibodies, or compositions, or pharmaceutical compositions described herein can also be lyophilized or provided in any suitable forms including, but not limited to, injectable solutions or inhalable solutions, gel forms and tablet forms.

In embodiments, the variable regions disclosed herein are not modified. In embodiments, the invention encompasses modifications to the variable regions disclosed herein. For example, the invention includes antibodies comprising functionally equivalent variable regions and CDRs which do not significantly affect their properties as well as variants which have enhanced or decreased activity and/or affinity. For example, the amino acid sequence may be mutated to obtain an antibody with the desired binding affinity to the herein identified sequence in human tetranectin. Modification of polypeptides is routine practice in the art and need not be described in detail herein. Examples of modified polypeptides include polypeptides with conservative substitutions of amino acid residues, one or more deletions or additions of amino acids which do not significantly deleteriously change the functional activity, or which mature (enhance) the affinity of the polypeptide for its ligand or use of chemical analogs.

Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue or the antibody fused to an epitope tag. Other insertional variants of the antibody molecule include the fusion to the N- or C-terminus of the antibody of an enzyme or a polypeptide which increases the half-life of the antibody in the blood circulation.

Substitution variants have at least one amino acid residue in the antibody molecule removed and a different residue inserted in its place. The sites of greatest interest for substitutional mutagenesis include the hypervariable regions, but framework alterations are also contemplated. Conservative substitutions are shown in Table 1 under the heading of "conservative substitutions." If such substitutions result in a change in biological activity, then more substantial changes, denominated "exemplary substitutions" in Table 1, or as further described below in reference to amino acid classes, may be introduced and the products screened.

TABLE 1

Amino Acid Substitutions

| Original Residue | Conservative Substitutions | Exemplary Substitutions |
|---|---|---|
| Ala (A) | Val | Val; Leu; Ile |
| Arg (R) | Lys | Lys; Gln; Asn |
| Asn (N) | Gln | Gln; His; Asp, Lys; Arg |
| Asp (D) | Glu | Glu; Asn |
| Cys (C) | Ser | Ser; Ala |
| Gln (Q) | Asn | Asn; Glu |
| Glu (E) | Asp | Asp; Gln |
| Gly (G) | Ala | Ala |
| His (H) | Arg | Asn; Gln; Lys; Arg |
| Ile (I) | Leu | Leu; Val; Met; Ala; Phe; Norleucine |
| Leu (L) | Ile | Norleucine; Ile; Val; Met; Ala; Phe |
| Lys (K) | Arg | Arg; Gln; Asn |
| Met (M) | Leu | Leu; Phe; Ile |
| Phe (F) | Tyr | Leu; Val; Ile; Ala; Tyr |
| Pro (P) | Ala | Ala |
| Ser (S) | Thr | Thr |
| Thr (T) | Ser | Ser |
| Trp (W) | Tyr | Tyr; Phe |
| Tyr (Y) | Phe | Trp; Phe; Thr; Ser |
| Val (V) | Leu | Ile; Leu; Met; Phe; Ala; Norleucine |

Substantial modifications in the biological properties of the antibody are accomplished by selecting substitutions that differ significantly in their effect on maintaining (a) the structure of the polypeptide backbone in the area of the substitution, for example, as a β-sheet or helical conformation, (b) the charge or hydrophobicity of the molecule at the target site, or (c) the bulk of the side chain. Naturally occurring residues are divided into groups based on common side-chain properties:
(1) Non-polar: Norleucine, Met, Ala, Val, Leu, Ile;
(2) Polar without charge: Cys, Ser, Thr, Asn, Gln;
(3) Acidic (negatively charged): Asp, Glu;
(4) Basic (positively charged): Lys, Arg;
(5) Residues that influence chain orientation: Gly, Pro; and
(6) Aromatic: Trp, Tyr, Phe, His.

Non-conservative substitutions are made by exchanging a member of one of these classes for another class.

One type of substitution, for example, that may be made is to change one or more cysteines in the antibody, which may be chemically reactive, to another residue, such as, without limitation, alanine or serine. For example, there can be a substitution of a non-canonical cysteine. The substitution can be made in a CDR or framework region of a variable domain or in the constant region of an antibody. In some embodiments, the cysteine is canonical. Any cysteine residue not involved in maintaining the proper conformation of the antibody also may be substituted, generally with serine, to improve the oxidative stability of the molecule and prevent aberrant cross-linking. Conversely, cysteine bond(s) may be added to the antibody to improve its stability, particularly where the antibody is an antibody fragment such as an Fv fragment.

A modification or mutation may also be made in a framework region or constant region to increase the half-life of an antibody. See, e.g., PCT Publication No. WO 00/09560. A mutation in a framework region or constant region can also be made to alter the immunogenicity of the antibody, to provide a site for covalent or non-covalent binding to another molecule, or to alter such properties as complement fixation, FcR binding and antibody-dependent cell-mediated cytotoxicity. According to the invention, a single antibody may have mutations in any one or more of the CDRs or framework regions of the variable domain or in the constant region.

In an embodiment, an antibody described herein is recombinantly produced. In an embodiment, the fusion protein is produced in a eukaryotic expression system.

In an embodiment, the fusion protein produced in the eukaryotic expression system comprises glycosylation at a residue on the Fc portion corresponding to Asn297.

In an embodiment the composition or pharmaceutical composition comprising the antibody, or antigen-binding fragment thereof, described herein is substantially pure with regard to the antibody, or antigen-binding fragment thereof. A composition or pharmaceutical composition comprising the antibody, or antigen-binding fragment thereof, described herein is "substantially pure" with regard to the antibody or fragment when at least 60% to 75% of a sample of the composition or pharmaceutical composition exhibits a single species of the antibody, or antigen-binding fragment thereof. A substantially pure composition or pharmaceutical composition comprising the antibody, or antigen-binding fragment thereof, described herein can comprise, in the portion thereof which is the antibody, or antigen-binding fragment, 60%, 70%, 80% or 90% of the antibody, or antigen-binding fragment, of the single species, more usually about 95%, and preferably over 99%. Purity or homogeneity may be tested by a number of means well known in the art, such as polyacrylamide gel electrophoresis or HPLC.

"And/or" as used herein, for example, with option A and/or option B, encompasses the separate embodiments of (i) option A, (ii) option B, and (iii) option A plus option B.

All combinations of the various elements described herein are within the scope of the invention unless otherwise indicated herein or otherwise clearly contradicted by context.

This invention may be better understood from the Experimental Details, which follow.

EXPERIMENTAL DETAILS

Circulating TN was depleted in the serum of septic patients: to search for other endogenous proteins modulating HMGB1 functions, the dynamic changes of serum HMGB1 and other proteins were characterized in a group of septic patients admitted to the Northwell Health System. In all septic patients with elevated serum HMGB1, the level of a 20-kDa protein (denoted as the "P20") was much lower than that of normal healthy subjects ("N", FIG. 1A). This protein was identified as human tetranectin (TN) by in-gel trypsin digestion and mass spectrometry analysis (FIG. 1A). To verify its identity, we immunoblotted serum samples of normal health controls ("N", FIG. 1B) and septic patients who either survived ("L") or died ("D") of sepsis with a TN-specific rabbit mAb (Cat. # ab108999, Abcam). As expected, this mAb recognized a specific 20-kDa band in the serum of healthy humans (FIG. 1B) and animals, but not in the serum of TN-deficient mice. More importantly, it confirmed a marked reduction of serum TN in septic patients ("L", FIG. 1B), and an almost complete depletion in patients who died of sepsis soon after blood sampling ("D", FIG. 1B). Spearman's analysis of 25 serum samples of septic patients revealed a significantly negative correlation between serum TN and HMGB1 levels (FIG. 1C), suggesting TN as a possible modulator of HMGB1 functions in clinical settings.

Figures 2A, 2B, 2C:
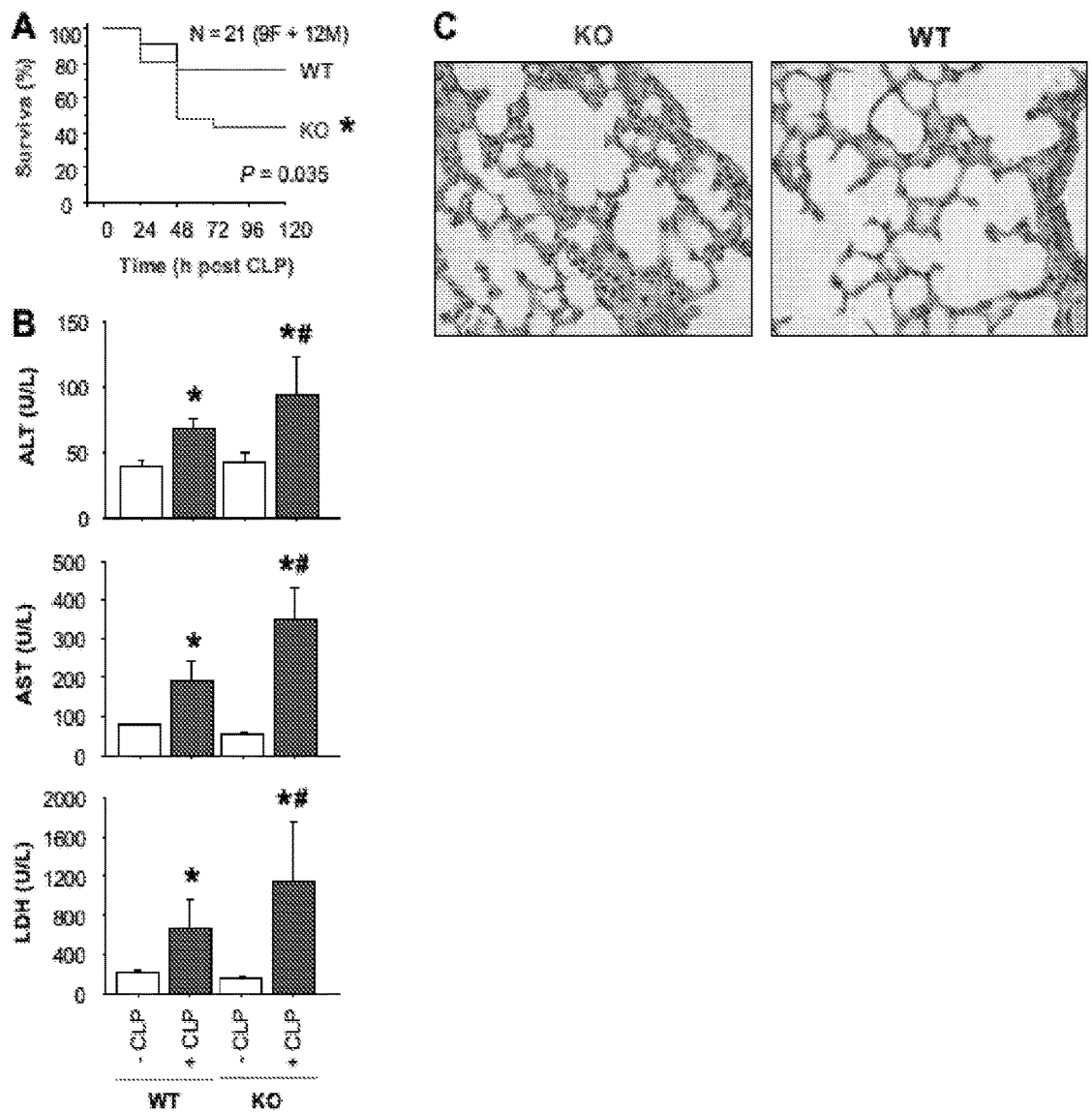
FIG. 2(A)-2(C): Genetic depletion of TN rendered animals more susceptible to lethal sepsis. (A) Genetic knockout of TN significantly increased septic lethality. Age-matched wild-type (WT) or TN KO mice were subjected to lethal sepsis, and animal survival was monitored for more than two weeks. N=21 animals (9 females and 12 males) per group. (B, C) TN depletion significantly worsened sepsis-induced tissue injury. In parallel experiment, blood and various tissues were harvested at 24 h post CLP and assayed for tissue injury by measuring blood levels of tissue enzymes or histology. N=6 animals per group. *, P<0.05 versus sham control (−CLP); #, P<0.05 versus WT CLP group ("+CLP"). TN knockout also exacerbated sepsis-induced expression of proinflammatory cytokines in the lung.

Genetic depletion of TN rendered mice more susceptible to lethal sepsis: to assess the role of TN in sepsis, it was first determined how genetic TN depletion affects the sepsis-induced tissue injury and animal lethality in age-matched animals. The genotypes of wild-type and TN KO mice were confirmed by immunoblotting and genotyping of serum or lung samples. Interestingly, TN KO mice exhibited a significantly higher mortality rate than that of age-matched wild-type littermate controls (FIG. 2A), which was associated with an elevated systemic release of lactate dehydrogenase (LDH), as well as liver [alanine aminotransferase (ALT) and aspartate aminotransferase (AST)] enzymes (FIG. 2B). Histological analysis showed a more rigorous lung inflammation and injury, manifested by the obvious increase in alveolar septal wall thickening, leukocyte infiltration, and alveolar congestion in TN KO mice (FIG. 2C). Consistently, RNA-seq analysis revealed a markedly elevated expression of proinflammatory mediators (e.g., IL-1β, IL-6, LIF, Cox-2) in the lung of TN KO mice, suggesting a possible anti-inflammatory property of lung TN in sepsis.

Figures 3A, 3B, 3C, 3D, 3E, 3F, 3G:
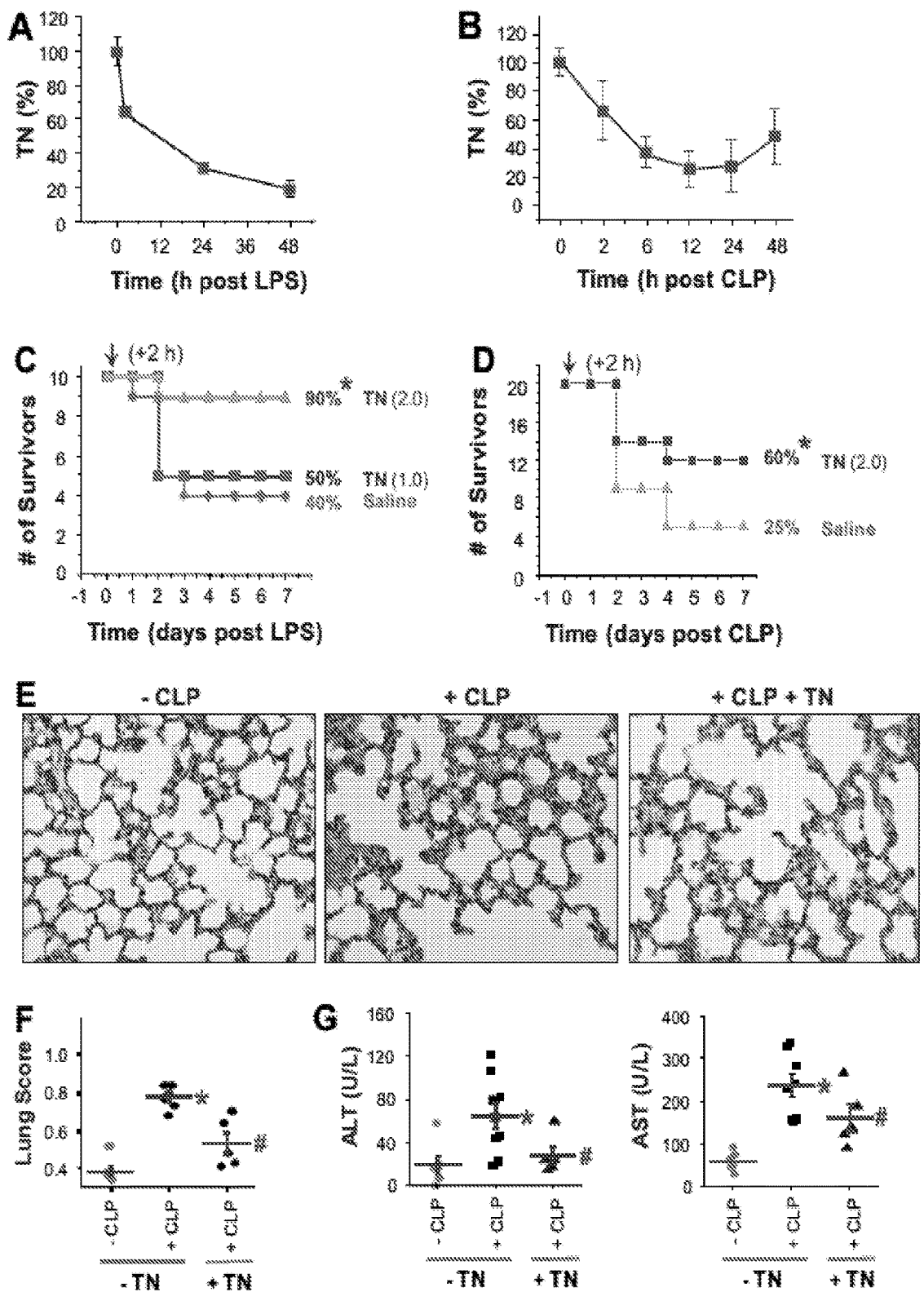
FIG. 3(A)-3(G): Supplementation of exogenous TN conferred protection against lethal endotoxemia and sepsis. (A, B) Time-dependent reduction of circulating TN levels in murine models of lethal endotoxemia and sepsis. Balb/C mice were subjected to lethal endotoxemia (LPS, i.p., 7.5 mg/kg) or CLP sepsis, and blood samples were harvested at various time points post LPS or CLP to measure TN levels by Western blotting analysis. N=5 animals per group. (C, D) Supplementation with recombinant human TN conferred protection against lethal endotoxemia and sepsis. Recombinant human TN was given at indicated doses (1.0 or 2.0 mg/kg, i.p.) at 2 h post the onset of lethal endotoxemia or sepsis. Animal survival was monitored for more than two weeks to ensure long-lasting protection. (E, F) TN reduced sepsis-induced lung inflammation and injury. Recombinant murine TN (0.1 mg/kg) was given at 2 and 24 h post CLP, and animals were sacrificed at 28 h post CLP to harvest lung tissue for histological analysis. (G) TN reduced sepsis-induced release of liver enzymes. At 28 h after CLP, animals were euthanized to harvest blood to measure serum levels of hepatic injury markers such as alanine aminotransferase (ALT) and aspartate aminotransferase (AST) using commercial kits. Note that TN promoted significant protection against sepsis-induced liver injury. N=5 animals per group. *, P<0.05 versus sham control (−CLP); #, P<0.05 versus saline group ("+CLP").

Supplementation of exogenous TN conferred a dose-dependent protection against lethal endotoxemia and sepsis: in healthy animals, TN was most abundantly expressed in the lung, but also detected in the circulation. Assuming a 25-g mouse with an average blood volume of 1.5 ml and a mean circulating TN concentration of 10.0 μg/ml, the physiological blood TN level is estimated to be 0.6 mg/kg body weight. Following experimental endotoxemia (FIG. 3A) and sepsis (FIG. 3B), circulating TN levels were decreased in a time-dependent fashion, with a >80% reduction at 24 h after the onset of these diseases—a time point when some endotoxemic or septic animals started to succumb to death.

Furthermore, the parallel reduction of TN levels in the serum and lung tissue of endotoxemic animals supports lung as a major source of circulating TN [17].

It was then determined how highly purified recombinant human or murine TN proteins expressed in HEK293 kidney cells (ACROBiosystems) or *E. coli* affect the outcome of lethal endotoxemia and sepsis. The supplementation with either eukaryote-derived human TN (FIG. 3C) or prokaryotes-derived murine TN conferred a reproducible and dose-dependent protection against lethal endotoxemia (FIG. 3C) and sepsis (FIG. 3D), revealing a previously under-appreciated beneficial role of TN in lethal systemic inflammation. Consistently, supplementation of exogenous TN led to a marked attenuation of sepsis-induced injury in the lung (FIG. 3E, 3F) and liver (FIG. 3G), further confirming a protective role of TN in lethal sepsis. Notably, although supplementation of septic mice with sub-physiological doses of murine TN (e.g., 0.1 mg/kg) conferred reproducible protection, administration of murine TN at super-physiological doses (e.g., 1.0 mg/kg) was not associated with any protective effect in sepsis, suggesting the possibility that TN exerts divergently dual roles in lethal sepsis.

Figures 4A, 4B:
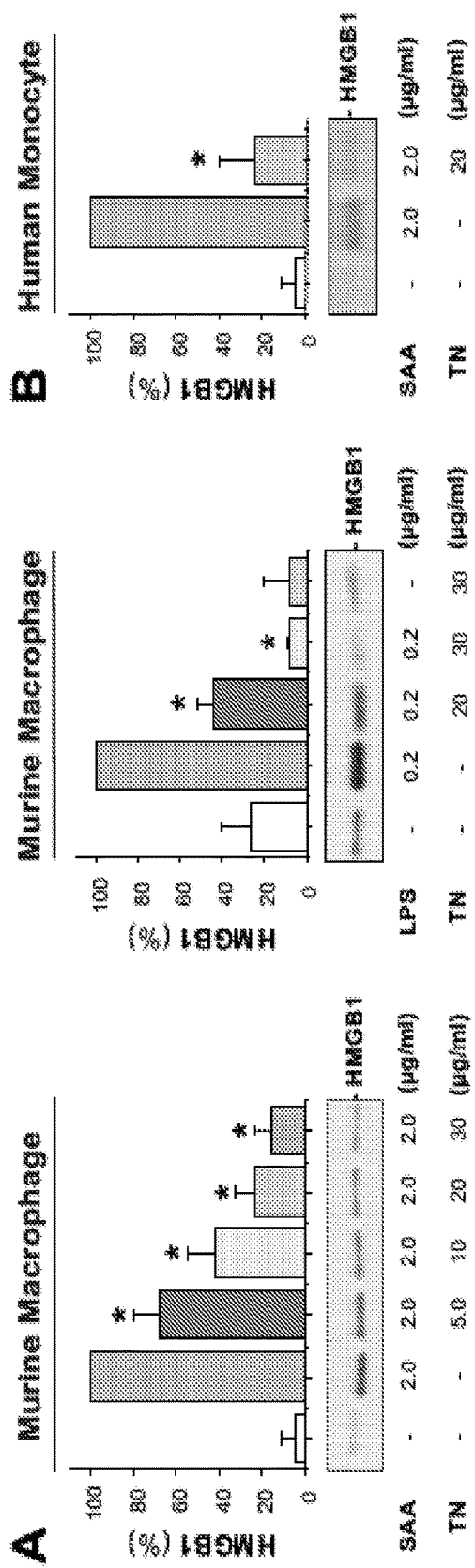
FIG. 4(A)-4(B): TN specifically inhibited the LPS- or SAA-induced HMGB1 release. (A, B) TN inhibited HMGB1 release in primary murine macrophages and human monocytes. Murine peritoneal macrophages or human blood monocytes were cultured in serum-free OPTI-MEM I medium and stimulated for 16 h with LPS or SAA in the absence or presence of TN at the indicated concentrations. The extracellular HMGB1 levels were determined by Western blotting and expressed as % of maximal stimulation in the presence of LPS or SAA alone. N=3 per group. *, P<0.05 versus "+SAA alone" or "+LPS alone". TN did not affect the LPS-, SAA-, and HMGB1-induced release of other cytokines and chemokines in macrophage cultures. TN specifically induced the expression of GRO (CXCL1, KC) and ENA-78 (CXCL5, LIX) in human monocytes. Peripheral blood mononuclear cells were isolated from blood of healthy humans and stimulated with recombinant human TN or murine TN (10 µg/ml) for 16 h, and extracellular levels of cytokines and chemokines were determined by Cytokine Antibody Arrays. Note that TN effectively induced the release of GRO and ENA-78 in human monocyte cultures.

TN selectively inhibited the LPS- and SAA-induced HMGB1 release by capturing and facilitating its endocytosis: to understand the mechanisms underlying the dose-dependently divergent effects of TN supplementation in sepsis, its possible anti- and pro-inflammatory properties were evaluated in vitro. Remarkably, highly purified TN protein expressed either in eukaryotes (HEK293 cells) or prokaryotes (*E. coli*) dose-dependently inhibited the LPS- and SAA-induced HMGB1 release in both murine macrophages (FIG. 4A) and human monocytes (FIG. 4B). This inhibition was specific, because TN did not inhibit the LPS-, SAA-, or HMGB1-induced release of other cytokines (e.g., G-CSF, IL-6, IL-12) and chemokines (e.g., KC, LIX, MIP-1α, MIP-2, and RANTES), even when given at super-physiological concentrations (20 µg/ml). Surprisingly, in primary human monocytes, TN reproducibly and specifically induced the release of GRO (CXCL1 or KC)—a surrogate marker of lethal sepsis [29,30], as well as a beneficial neutrophilic chemokine, ENA-78 (CXCL5, LIX) [31,32].

Figure 5A:
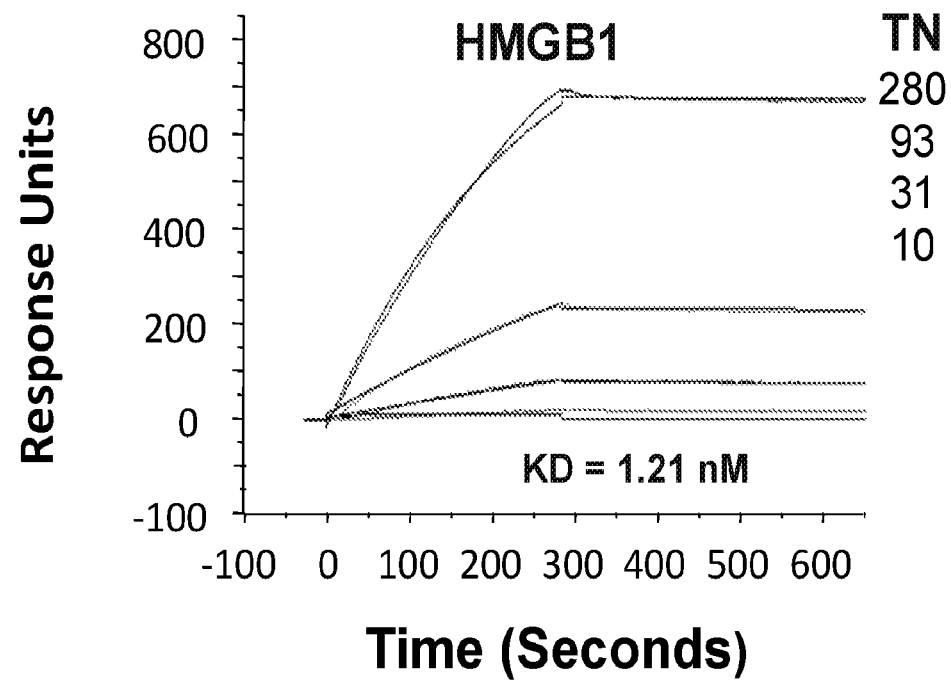
FIG. 5(A)-5(D): TN interacted with HMGB1 to enhance TN/HMGB1 cellular uptake and induce ASC release. (A) Surface Plasmon Resonance Assay of TN/HMGB1 interaction. Highly purified recombinant HMGB1 (Upper Panel) or TN (Lower Panel) protein was immobilized on the sensor chip, and TN or HMGB1 was applied at different concentrations. The response units were recorded over time, and the binding affinity was estimated as the equilibrium dissociation constant $K_D$. (B) TN enhanced HMGB1 cellular uptake by macrophage cultures. Representative overlay images of HMGB1 and nuclei (Upper panels) or HMGB1 and nuclei with phase contrast images (Lower panels) were presented. Scale bars: 10 µm. (C) Immunoblotting analysis of cellular HMGB1 or TN content with a reference to β-actin. N=3. *, $P<0.05$ versus negative controls ("−HMGB1−TN"); #, $P<0.05$ versus positive control ("+HMGB1 alone"); &, $P<0.05$ versus "+HMGB1+TN" group. (D) TN and HMGB1 synergistically enhanced ASC release in macrophage cultures. Thioglycollate-elicited peritoneal macrophages were isolated from Balb/C mice, and stimulated with TN in the absence or presence of HMGB1 at indicated concentrations for 16 h, and cell-conditioned medium was assayed for ASC by Western blotting analysis. SDS-PAGE gel indicated equivalent sampling loading. Bar graph represented average of three independent experiments. *, $P<0.05$ versus negative controls ("−HMGB1−TN"); #, $P<0.05$ versus positive control ("+HMGB1" or "+TN" alone).
Figure 5A:
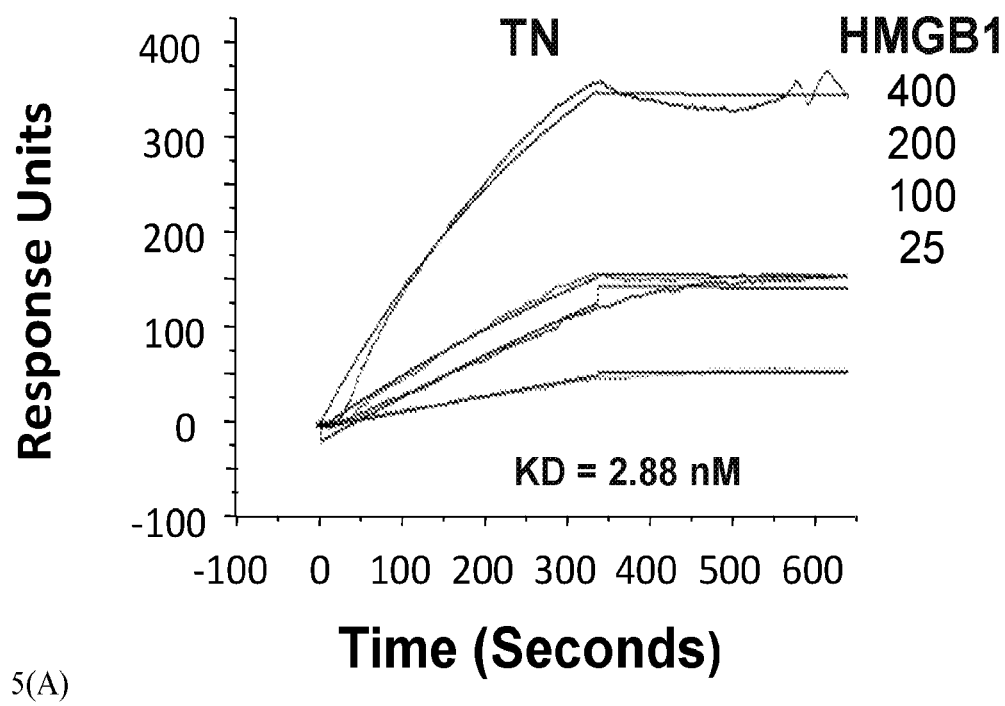
Figure 5B:
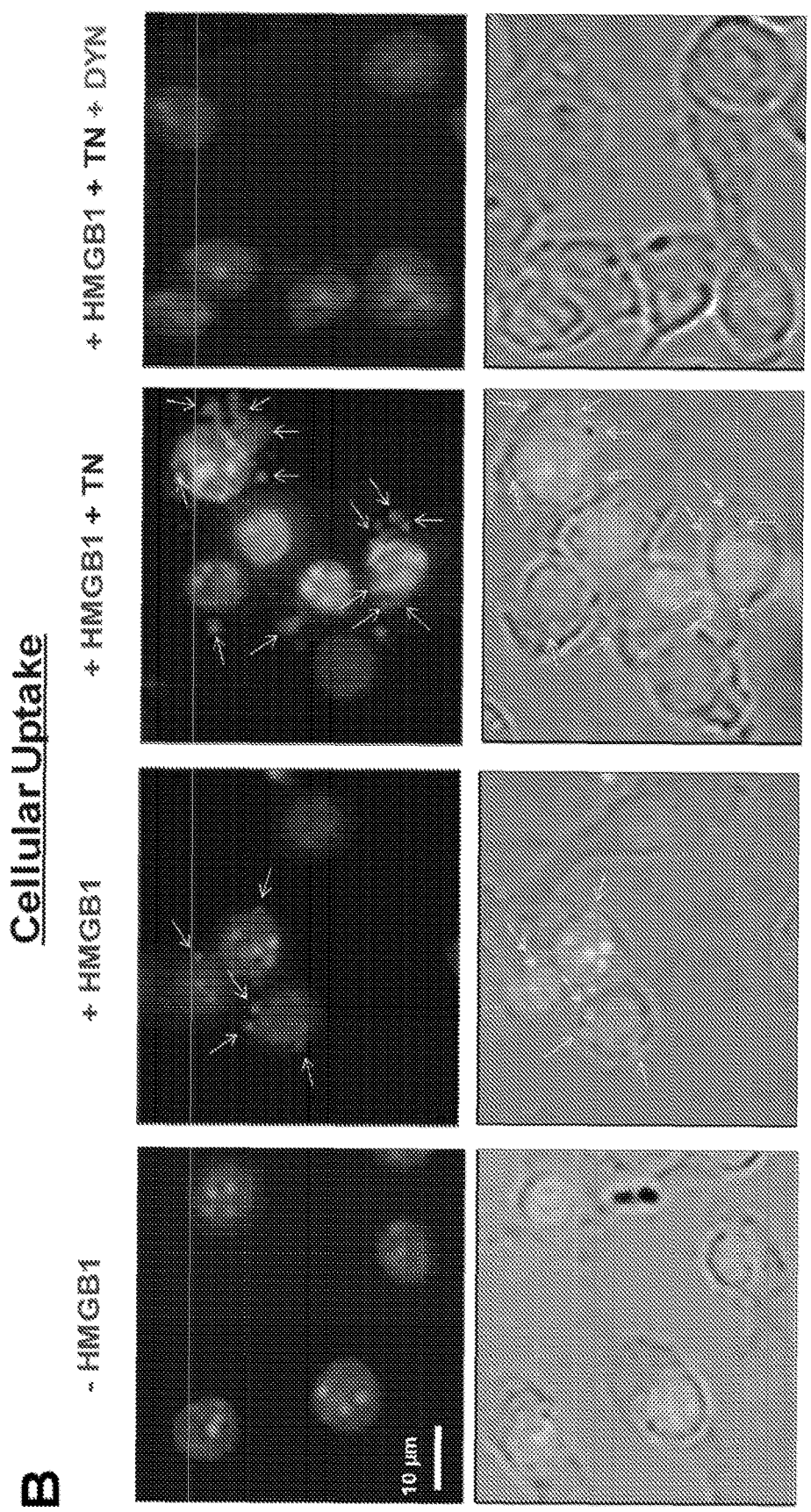
Figures 5C, 5D:
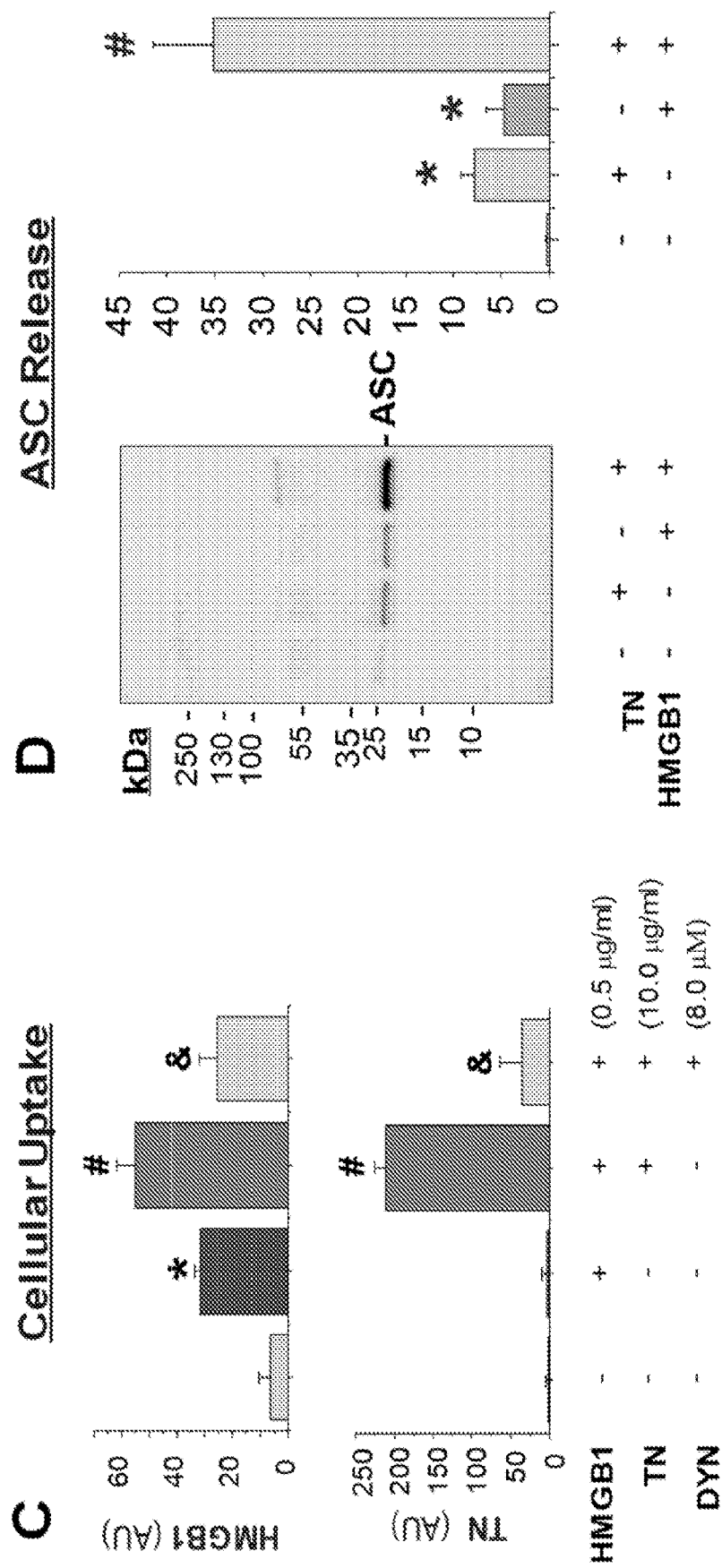

To elucidate the mechanism by which TN selectively inhibited HMGB1 release, the possible TN/HMGB1 interaction was first examined using the Nicoya Lifesciences Open Surface Plasmon Resonance (OpenSPR) technology (FIG. 5A). Regardless whether TN or HMGB1 was conjugated to the Sensor Chip via His-tag or carboxyl groups, there was a dose-dependent SPR response between TN and HMGB1, with an estimated equilibrium disassociation constant (KD) in the range of 1.21-2.88 nM (FIG. 5A), indicating a strong interaction between these two proteins. It was then investigated whether TN and HMGB1 reciprocally enhance each other's cellular uptake in macrophage cultures. Consistent with previous reports [7,10], a basal level of HMGB1 endocytosis was observed in macrophage cultures (FIG. 5B, 5C). However, at physiological concentrations, TN markedly enhanced HMGB1 cellular uptake (FIG. 5B, 5C). This TN-mediated enhancement of cellular HMGB1 uptake was prevented by an endocytosis inhibitor, dynasore (FIG. 5B, 5C), implying that TN enhanced HMGB1 endocytosis. Reciprocally, HMGB1 also enhanced the cellular uptake of TN (FIG. 5C, Right Panel), which was similarly attenuated by dynasore (FIG. 5C, Right Panel), suggesting that TN and HMGB1 might be endocytosed simultaneously as a protein complex.

To test this possibility, HMGB1 and TN were labelled with different fluorescent dyes, and added them simultaneously to macrophage cultures. Most HMGB1-positive cytoplasmic (red) vesicles were co-localized with TN-positive (green) particles at 2 h post co-incubation, indicating that TN and HMGB1 were indeed endocytosed by macrophages simultaneously as protein complexes. Immunoblotting of cellular proteins with HMGB1- or TN-specific antibodies confirmed the TN-mediated enhancement of HMGB1 cellular uptake, as well as the appearance of additional bands with lower molecular weights, which might be reminiscent of possible degradation of endocytosed HMGB1 and TN. Because HMGB1 endocytosis could trigger macrophage pyroptosis [7,10], it was examined whether TN and HMGB1 synergistically promote the release of ASC, an inflammasome adaptor protein recently characterized as a marker for macrophage pyroptosis following LPS/ATP stimulation [33]. Although TN and HMGB1 weakly induced ASC release when added individually (FIG. 5D), the co-addition of both proteins triggered a synergistic enhancement of ASC release (FIG. 5D), suggesting that the TN/HMGB1 interaction might facilitate their endocytosis and pyroptosis of innate immune cells.

Figure 6A:
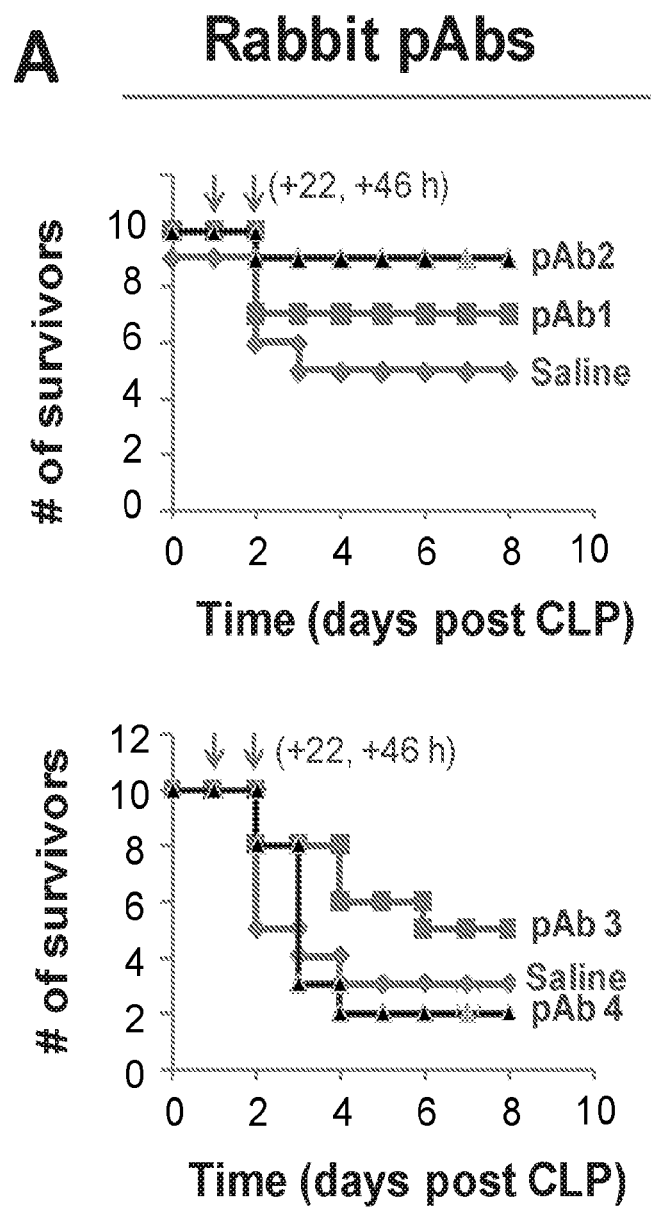
FIG. 6(A)-6(D): Divergent effects of TN domain-specific polyclonal and monoclonal antibodies on septic lethality. (A) Divergent effects of different TN-specific polyclonal antibodies (pAbs) on lethal sepsis. Male Balb/C mice (7-10 weeks, 20-25 g) were subjected to CLP sepsis, and intraperitoneally administered with total IgGs (40 mg/kg) from each TN-immunized rabbit (#1, #2, #3, and #4) at 22 h and 46 h post CLP (marked by arrows), and animal survival was monitored for two weeks. (B) Sequence of ten peptides spanning different regions of human TN for antibody epitope mapping of four different rabbit pAbs. Note that the two protective rabbit antibodies (pAb2 and pAb3) recognized a unique peptide, P5. (C) Tertiary structure of human TN protein (upper panel) and its two peptide domains: P2 and P5 (lower panel). (D) Divergent effect of P5- and P2-reactive mAbs on lethal sepsis. Balb/C mice were subjected to lethal sepsis, and intraperitoneally administered with different mAbs at indicated doses (0.5 or 2.0 mg/kg) and time points (24 h and 48 h post CLP). Animals were monitored for more than two weeks to ensure long-lasting effects.
Figure 6B:
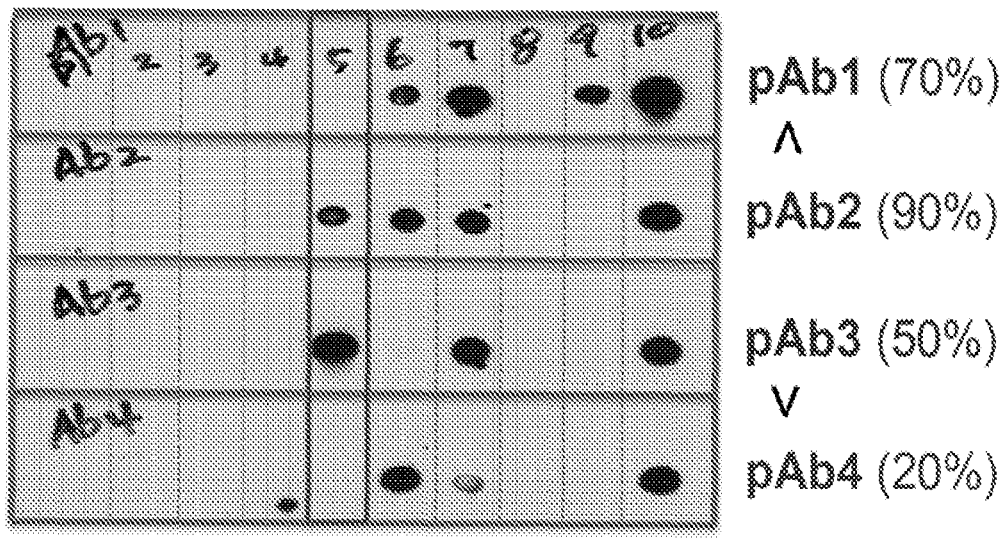
Figure 6C:
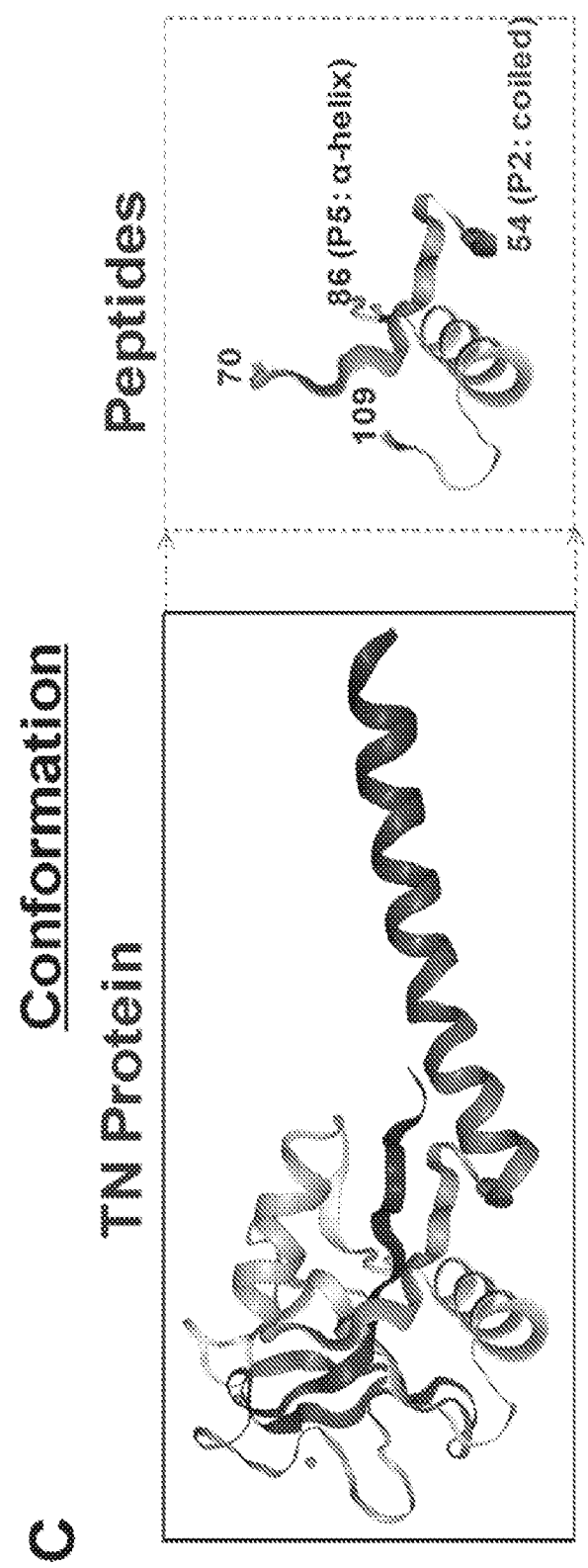

Divergent effects of different TN domain-specific polyclonal antibodies (pAb) on lethal sepsis: to further evaluate the role of TN in lethal sepsis, we generated pAbs against murine TN in rabbits, and examined their effects on septic lethality. Surprisingly, the total IgGs purified from two rabbits (pAb2 and pAb3) reproducibly increased animal survival rates (FIG. 6A and data not shown) in murine model of lethal sepsis, even when the first dose was given at 22 h post CLP. To characterize these pAbs, a library of peptides was used spanning different regions of human TN (FIG. 6B, Left Panel) to determine the epitope profile of these protective pAbs (FIG. 6B, Right Panel). Dot blotting analysis revealed that both protective pAbs (pAb2 and pAb3) recognized a unique peptide, P5 (FIG. 6B), which forms stable α-helical epitopes either by itself in synthetic peptides or being carried by TN proteins (FIG. 6C).

Generation of human TN P5-reactive monoclonal antibodies (mAbs): Balb/C mice were strategically immunized with human TN antigen, and a panel of hybridoma clones generated producing mAbs against P5 (four clones) and P2 (three clones). Immunoblotting analysis of serum samples of several mammalian species confirmed a remarkable specificity of these P2- and P5-specific mAbs. To further define the epitope sequences of P5-reactive mAbs, they were immunoblotted with ten smaller peptides (P5-1 to P5-10, Fig. S9B), and it was found that three of the four P5-binding mAbs reacted with P5-5 peptide (NDALYEYLRQ (SEQ ID NO:51)). The P5-5 epitope sequence (NDALYEYLRQ (SEQ ID NO:51)) shares 60-70% identity (but still 100% similarity) between human and rodents, as the variant residues (E vs D; F vs Y; H vs Q; and A vs L) still exhibit similar biochemical properties. Notably, this epitope sequence (NDALYEYLRQ (SEQ ID NO:51)) is 100% identical between TN proteins in humans and many other mammal species, including baboon, bear, bovine, buffalo, camel, cattle, cougar, elephant, goat, gorilla, hedgehog, horse, lemur, monkey, pig, rabbit, rhinoceros, seal, sheep, and tiger, suggesting that these P5-5-reacting mAbs could recognize TN protein in a wide spectrum of mammalian species.

Figure 6D:
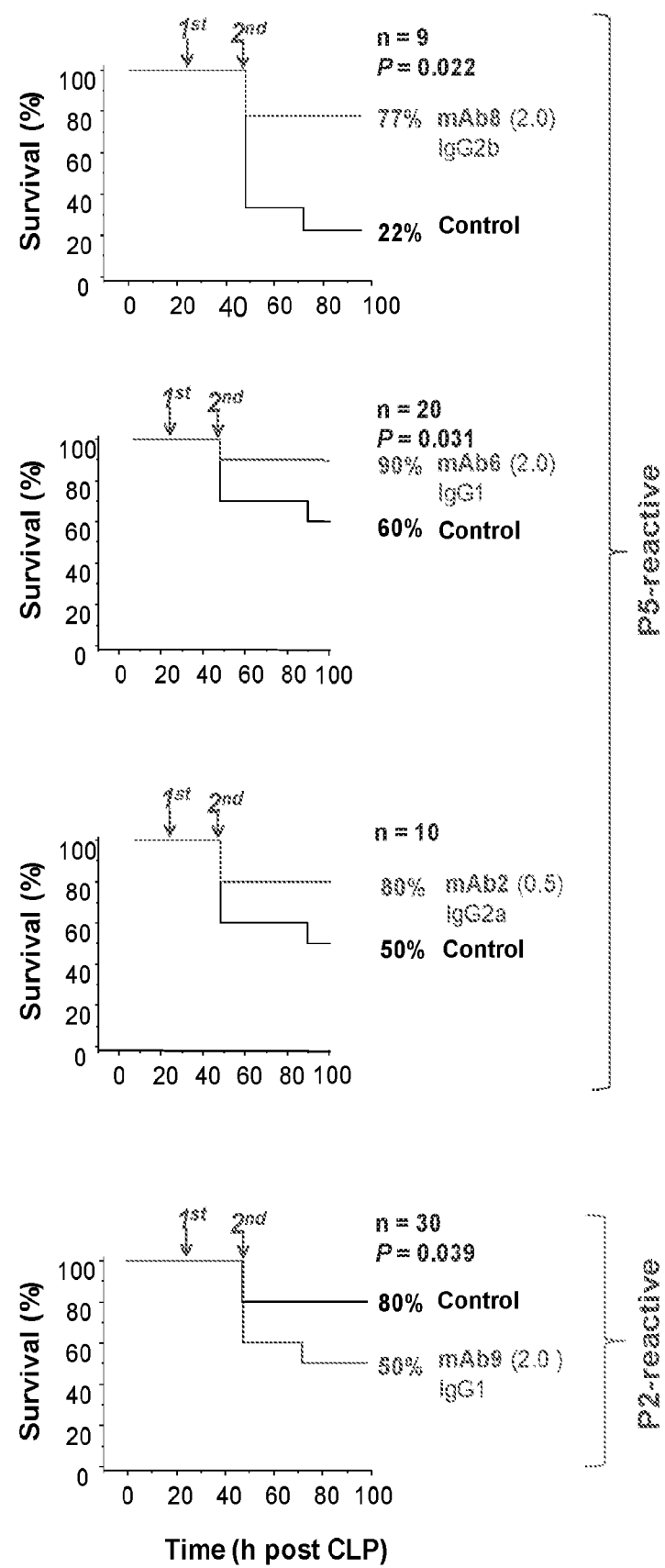

The therapeutic potential of these mAbs was then explored by strategically giving them to septic animals in a delayed fashion—starting at 24 h post CLP. Administration of a P2-specific mAb (mAb9), reproducibly worsened the outcome of lethal sepsis (FIG. 6D), confirming a beneficial role of TN in lethal sepsis. In a sharp contrast, delayed administration of three P5-reacting mAbs that could recognize both human and murine TN [i.e., mAb2 (IgG2a), mAb6 (IgG1), and mAb8 (IgG2b)] similarly and significantly rescued mice from lethal sepsis (FIG. 6D). As expected, a P5-reactive mAb5 (IgG1) incapable of binding murine TN, as well as irrelevant IgG2a or IgG2b isotype controls totally failed to confer any protection against lethal sepsis, confirming that the protective effects of these P5-reactive mAbs were entirely dependent on their murine TN-binding capacities.

Figures 7A, 7B, 7C, 7D:
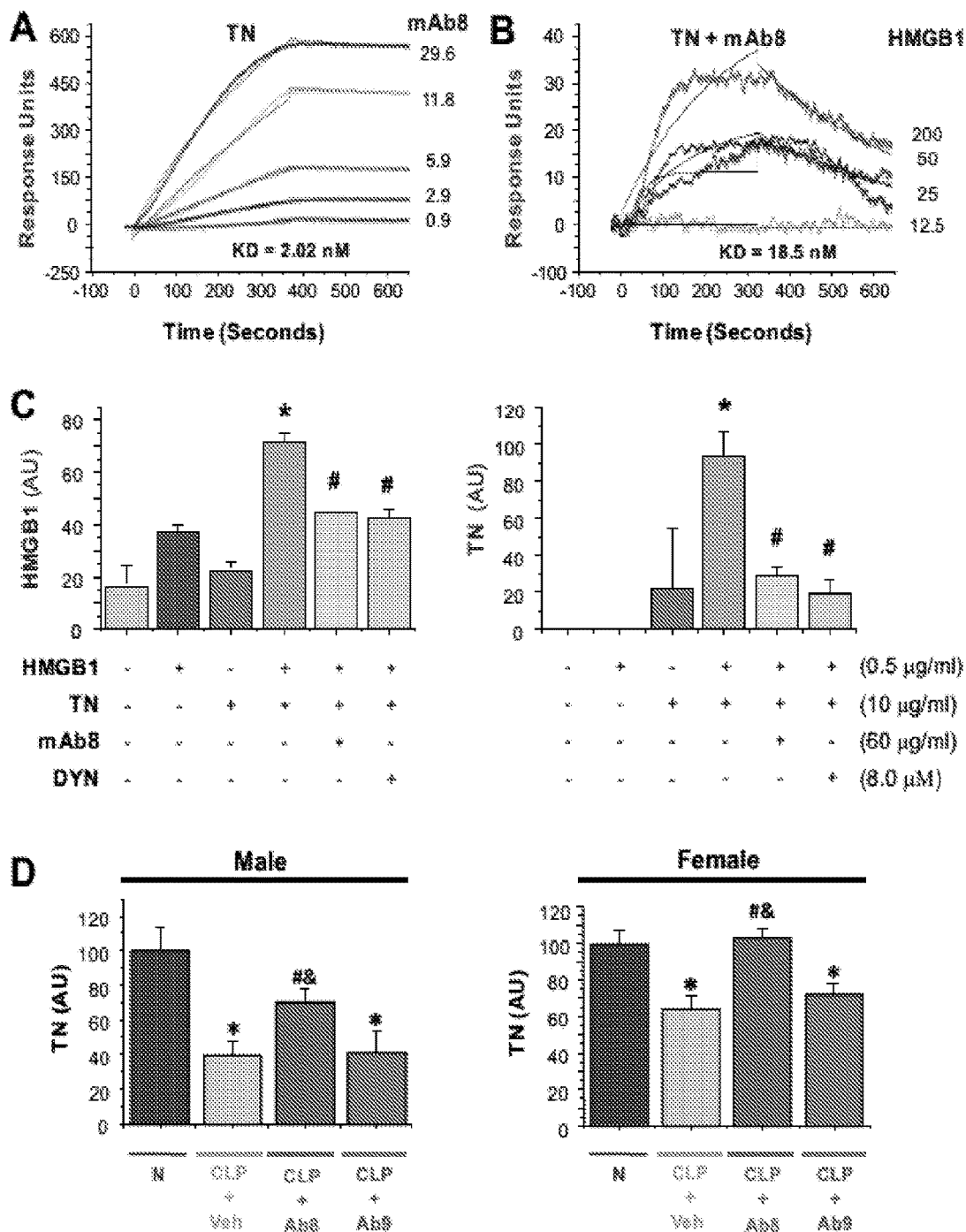
FIG. 7(A)-7(D): Effect of mAb8 on TN/HMGB1 interaction and cellular uptake. (A) Surface Plasmon Resonance Assay of TN/mAb8 interaction. Highly purified recombinant TN was immobilized on the sensor chip, and mAb8 was applied at different concentrations to record the SPR response, and to estimate the $K_D$. (B) Pre-treatment with mAb8 impaired TN/HMGB1 interaction. TN-conjugated sensor chip was first pre-treated with mAb8 at 29.6 nM before subsequent application of HMGB1 at various concentrations. Note the TN-binding responsive signal for HMGB1 (200 nM) was decreased from 150 (without mAb8 pretreatment, FIG. 5A, Lower Panel) to 35 (with mAb8 pre-treatment), indicating that mAb8 disrupted TN-HMGB1 interactions. (C) mAb8 prevented TN-mediated enhancement of HMGB1 uptake in macrophage cultures. Macrophage cultures were incubated with HMGB1 in the absence or presence of TN, mAb8, or dynasore at indicated concentrations for 2 h. Following extensive washings, cellular levels of HMGB1 or TN were determined by Western blotting analysis and expressed as a ratio to β-actin. N=3. *, $P<0.05$ versus positive control ("+HMGB1" or "+TN" alone); #, $P<0.05$ versus "+HMGB1+TN" group. (D) mAb8 markedly prevented sepsis-induced TF depletion in both male and female animals. Male or female Balb/C mice were subjected to lethal sepsis, and intraperitoneally administered with a P5-reacting mAb8 (2.0 mg/kg) or a P2-reacting mAb9 (2.0 mg/kg) at 2 and 24 h post CLP. At 28 h post CLP, animals were euthanized to harvest blood, and serum TN levels were determined by Western blotting analysis.
Figures 8A, 8B:
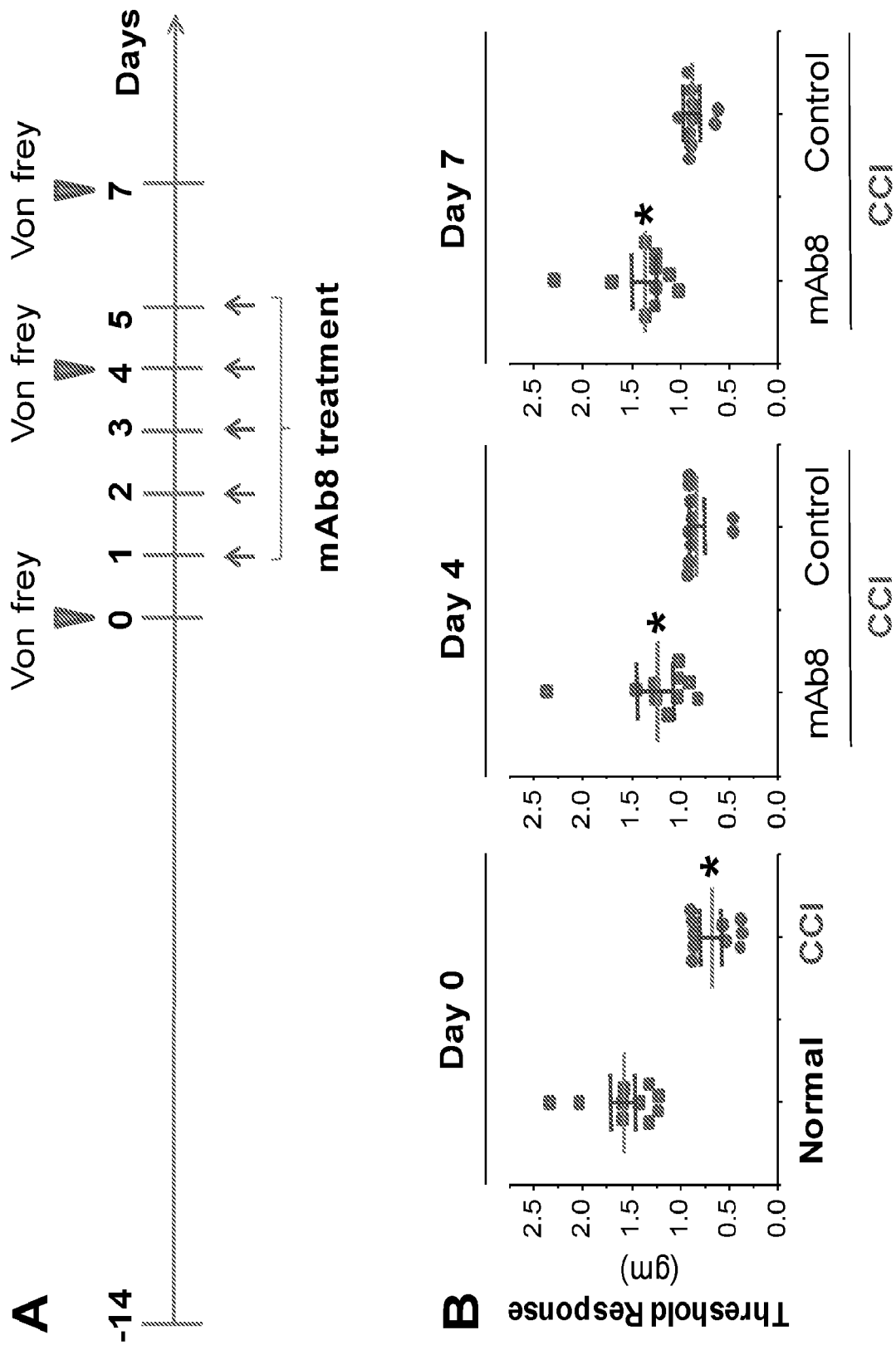
FIG. 8(A)-8(B): TN-specific mAb conferred significant protection against the chronic constriction injury (CCI)-induced mechanical hypersensitivity. Male C57/BL6 mice (10-12 weeks) were subjected to CCI surgery on day −14, and anti-TN mAb8 (1.5 mg/kg) was intraperitoneally administered daily for 5 days (A). Control mice receive same volume of vehicle control (1×PBS). (B) The mechanical hypersensitivity was assessed daily at day 0, 4, and 7 post-onset of mAb treatment, and expressed as Mean+SEM of ten animals per group. Significance between samples was determined by one-way ANOVA followed by the least significant difference test. *, $P<0.05$ versus normal control or vehicle saline control of the CCI group.
Figures 9A, 9B:
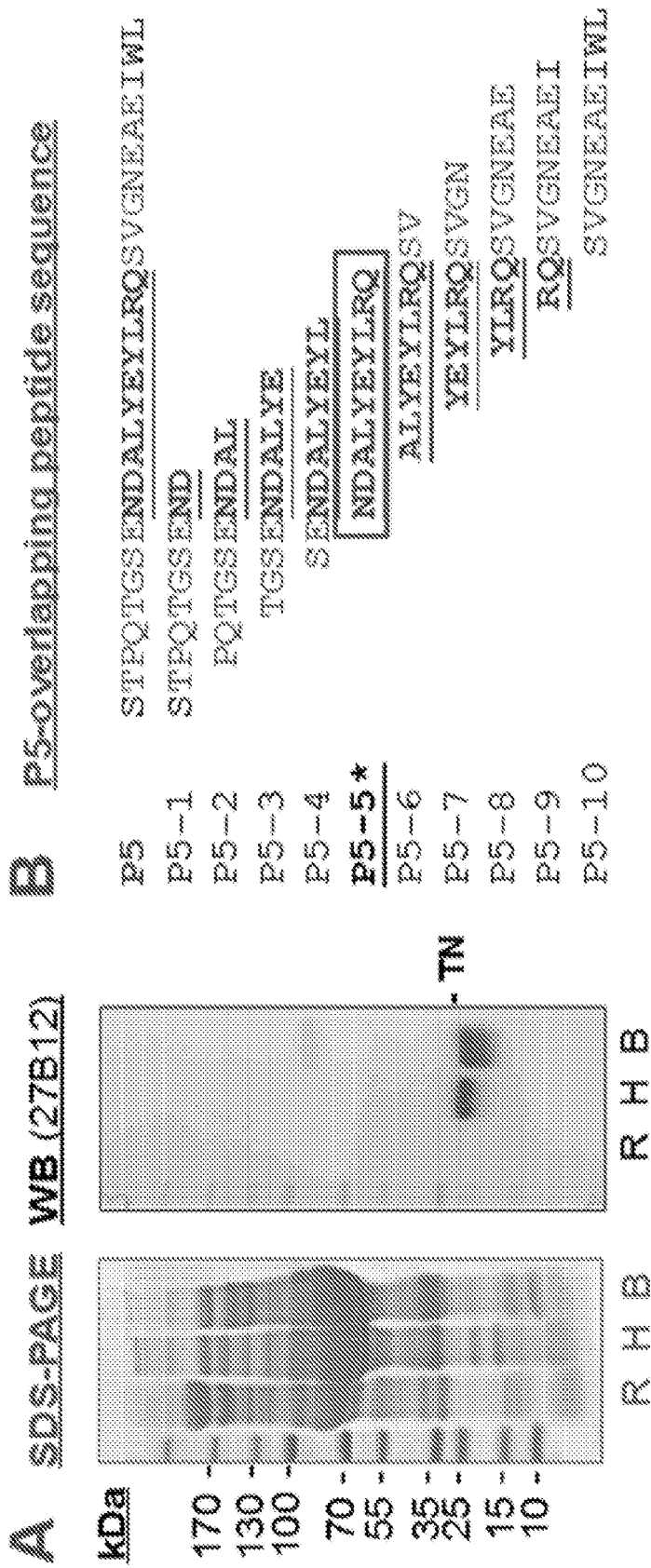
FIG. 9(A)-9(C): Cross-reactivity and epitope mapping of a panel of P5-reacting mAbs. (A) Representative Western blots of serum proteins of rat ("R"), human ("H"), and bovine ("B"). (B) Sequence of ten smaller P5-overlapping peptides used for antibody epitope mapping. (C) Epitope mapping of a panel of three P5-reacting monoclonal antibodies.
Figure 9C:
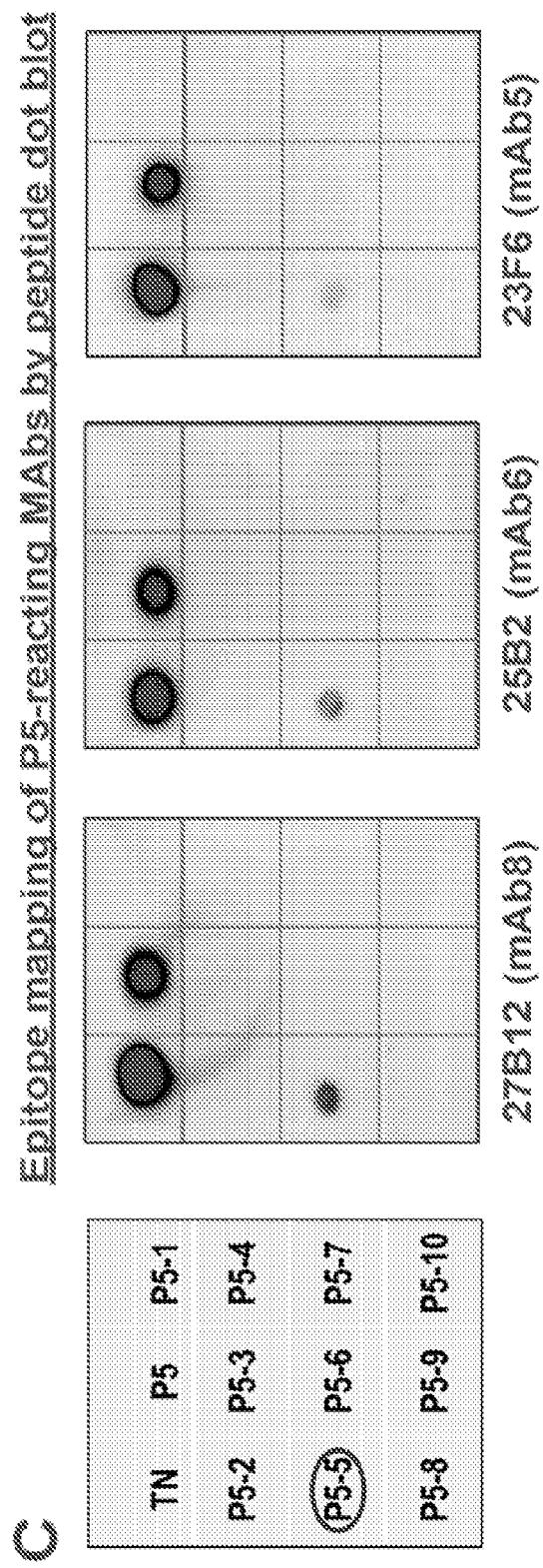

P5-reacting mAbs prevented sepsis-induced TN depletion possibly by interrupting TN/HMGB1 interaction and cellular uptake: to understand how P5-reacting mAbs confer protection against lethal sepsis, their effects were first determined on TN/HMGB1 interaction using the OpenSPR techniques. When TN was conjugated to the sensor chip, mAb8 exhibited a dose-dependent TN binding with an estimated $K_D$ of ~2.02 nM (FIG. 7A). When the TN-conjugated sensor chip was pre-treated with mAb8 (29.6 nM), the SPR response signal for subsequent HMGB1 (200 nM) application was reduced by >85% from ~150 AU (FIG. 5A, Lower Panel) to ~35 AU (FIG. 7B), which was paralleled by an almost 6-fold increase of KD (from 2.88 to 18.5 nM), suggesting that mAb8 effectively interrupted TN/HMGB1 interactions. Furthermore, mAb8 markedly prevented the reciprocal enhancement of cellular uptake of HMGB1 (FIG. 7C, Left Panel) and TN (FIG. 7C, Right Panel), suggesting that the protective mAbs confer protection possibly through inhibiting TN/HMGB1 interaction and endocytosis.

To verify whether these protective mAb could prevent sepsis-induced TN depletion, the P5-reactive mAb8 and the P2-reactive mAb9 were respectively given at 2 and 24 h post CLP, and serum levels of TN and other cytokines/chemokines were measured at 28 h post CLP. Indeed, repetitive administration of mAb8, but not mAb9, significantly suppressed the sepsis-induced TN depletion in both male (FIG. 7D, Left Panel) and female animals (FIG. 7D, Right Panel). Furthermore, the systemic accumulation of KC, a murine homologue of human GRO that was inducible by TN (FIG. 4D), was also markedly inhibited by repetitive administration of mAb8, but not mAb9, in septic animals. mAb8 confers protection against lethal sepsis partly by preventing sepsis-induced TN depletion and TN-induced KC accumulation.

Neuropathic Pain

In a model of the chronic constriction injury (CCI)-induced pain, TN-specific mAb conferred significant protection against the chronic constriction injury (CCI)-induced mechanical hypersensitivity. Male C57/BL6 mice (10-12 weeks) were subjected to CCI surgery on day −14, and anti-TN mAb8 (1.5 mg/kg) was intraperitoneally administered daily for 5 days (Panel A). Control mice receive same volume of vehicle control (1×PBS). The mechanical hypersensitivity was assessed daily at day 0, 4, and 7 post onset of mAb treatment, and expressed as Mean+SEM of ten animals per group. Significance between samples was determined by one-way ANOVA followed by the least significant difference test. *, $P<0.05$ versus normal control or vehicle saline control of the CCI group.

Rheumatoid Arthritis

Rheumatoid arthritis (RA) is characterized by synovial inflammation leading to joint pain, functional limitation, and progressive and irreversible damage to the joints. As a major cause of disability, RA affects 1.5 million individuals in the US alone. The development of biologics targeting specific pathogenic molecules such as TNF has revolutionized the clinical treatment of human arthritis. The panel of mAbs against human TN disclosed herein can prevent TN-HMGB1 interaction and endocytosis of HMGB1/TN complexes by innate immune cells. It is thus important to test the therapeutic efficacy of these mAbs in animal model of collagen antibody induced arthritis (CAIA). CAIA will be induced in male or female Balb/C mice (7-8 weeks) with intraperitoneal (ip) injection of 400 µl (4 mg) monoclonal anti-collagen antibody cocktail on day 0 (α-CII, Chondrex), followed by ip injection of LPS (100 µl; 50 µg)n on day 3. Mice will then be evaluated daily for changes in body weight, arthritis severity score (up to 4 points per joint, maximum=16 points per mouse), and ankle diameters with a digital caliper. To test the efficacy of TN-specific mAbs, mice will be injected subcutaneously with TN-specific mAbs (0.2-2.0 mg/kg) or 0.9% saline for 3 consecutive days starting at either day −2, 0 or 5 to evaluate Ab's effects to prevent the development of and to attenuate early and established inflammatory arthritis. Mice will then be evaluated daily for changes in body weight, arthritis severity score, and ankle diameters from days 0 to 24. The effect of mAbs on the change of arthritis severity score and ankle diameters (joint circumferences) will be assessed. Successful treatment of, or reduction in, arthritis severity score in the TN-specific mAbs versus the control group shows the efficacy of the TN-specific mAbs in treating rheumatoid arthritis.

Hepatic Ischemia/Reperfusion Injury

Male C57BL/6 mice (20-25 g) will be subjected to hepatic ischemia/reperfusion by temporal clamping the hepatic artery and portal vein for 60 minutes, which typically produced ischemia in 70% of the liver. At the beginning of the reperfusion, 0.2 ml saline or mAb solution (0.2-2.0.0 mg/kg BW) will be injected via the internal jugular vein. At 24 h after the onset of ischemia, animals will be euthanized to harvest blood to measure serum levels of hepatic injury markers such as alanine aminotransferase (ALT) and aspartate aminotransferase (AST) using commercial kits. The effect of mAbs on the blood level of hepatic injury markers will be assessed. Successful treatment of, or reduction in, serum levels of hepatic injury markers in the TN-specific mAbs versus the control group shows the efficacy of the TN-specific mAbs in treating hepatic ischemia/reperfusion injury.

Mechanistic Confirmatory Results

Figure 10:
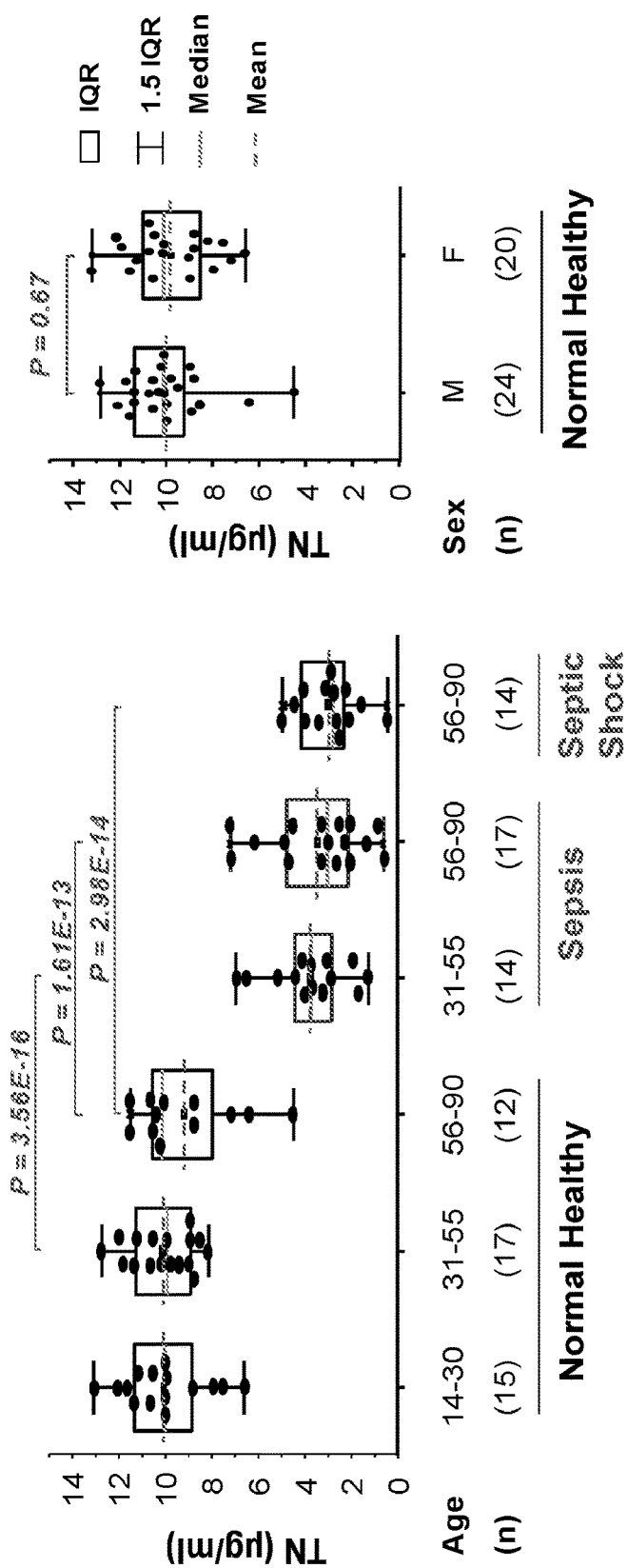
FIG. 10: Box plot representation of plasma TN concentrations in normal healthy controls and patients with sepsis or septic shock. Data represent mean [interquartile range (IQR), 25 to 75%] value of plasma TN concentrations. One-way ANOVA was used to compare the means between different groups, and P values are indicated.

A quantitative analysis of plasma TN levels was conducted in a large cohort of age-matched healthy controls and critically ill patients with sepsis or septic shock (FIG. 10). Compared with age-matched healthy controls, critically ill patients with sepsis or septic shock (based on Sepsis-3 definition) similarly exhibited a significant (>60%) reduction in their plasma TN levels.

Figure 11A:
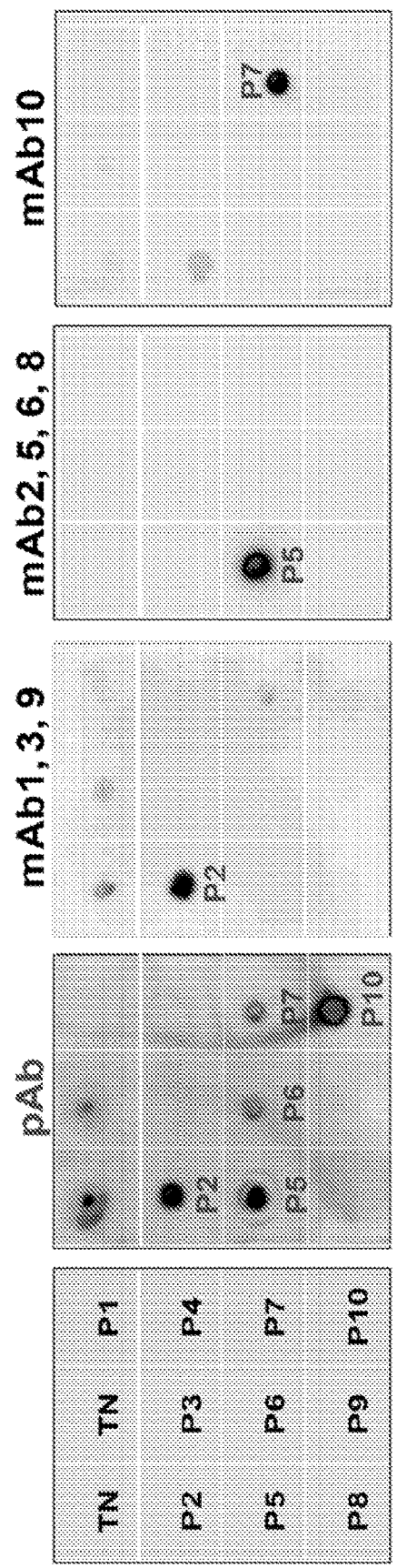
FIG. 11(A)-11(B): Epitope mapping and specificity of representative monoclonal antibodies raised against recombinant human TN. 11(A) Dot blotting analysis of polyclonal antibodies ("pAb") and monoclonal antibodies ("mAbs") using synthetic peptides corresponding to sequences shown in FIG. 6B. Most purified mAbs specifically recognized an epitope on a particular peptide, such as P2, P5, or P7. 11(B) Normal healthy human ("H") and murine ("M") serum proteins were resolved by SDS-PAGE, and Western blotted with the different mAbs. Most mAbs recognized a specific band with the predicted molecular weight of TN in the serum of normal healthy human or mouse.
Figure 11B:
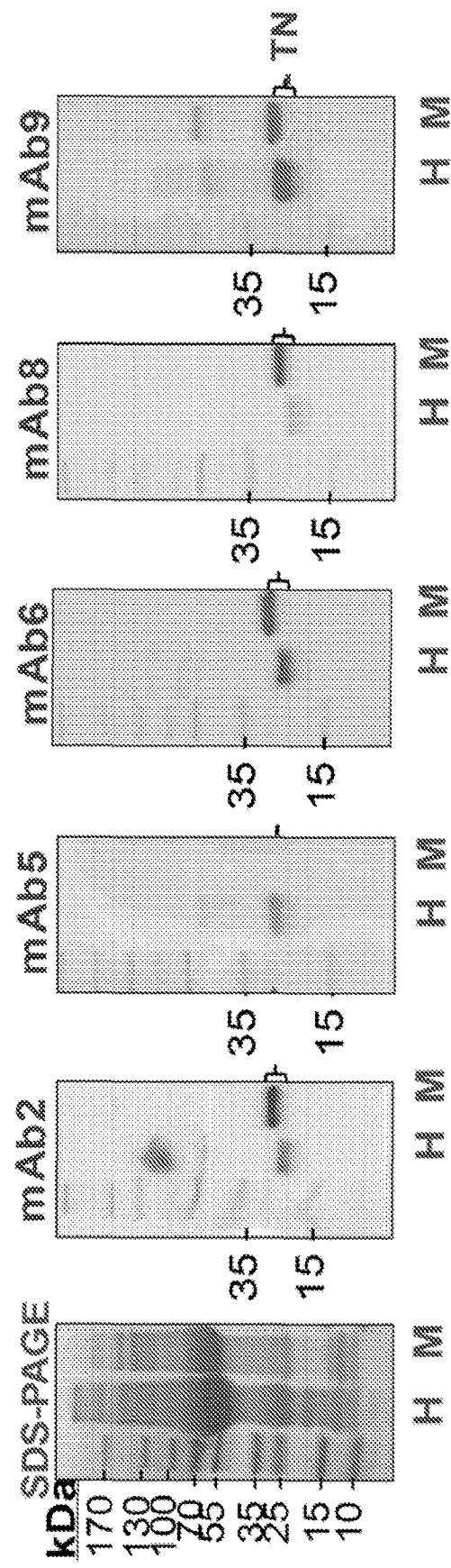

The specific reactivity of the TN monoclonal antibodies disclosed herein was confirmed by performing Western blotting analysis of both human and mice serum samples (FIG. 11(B)). Most of the mAbs specifically recognized a band with the predicted molecular weight of human or murine TN.

Figure 12A:
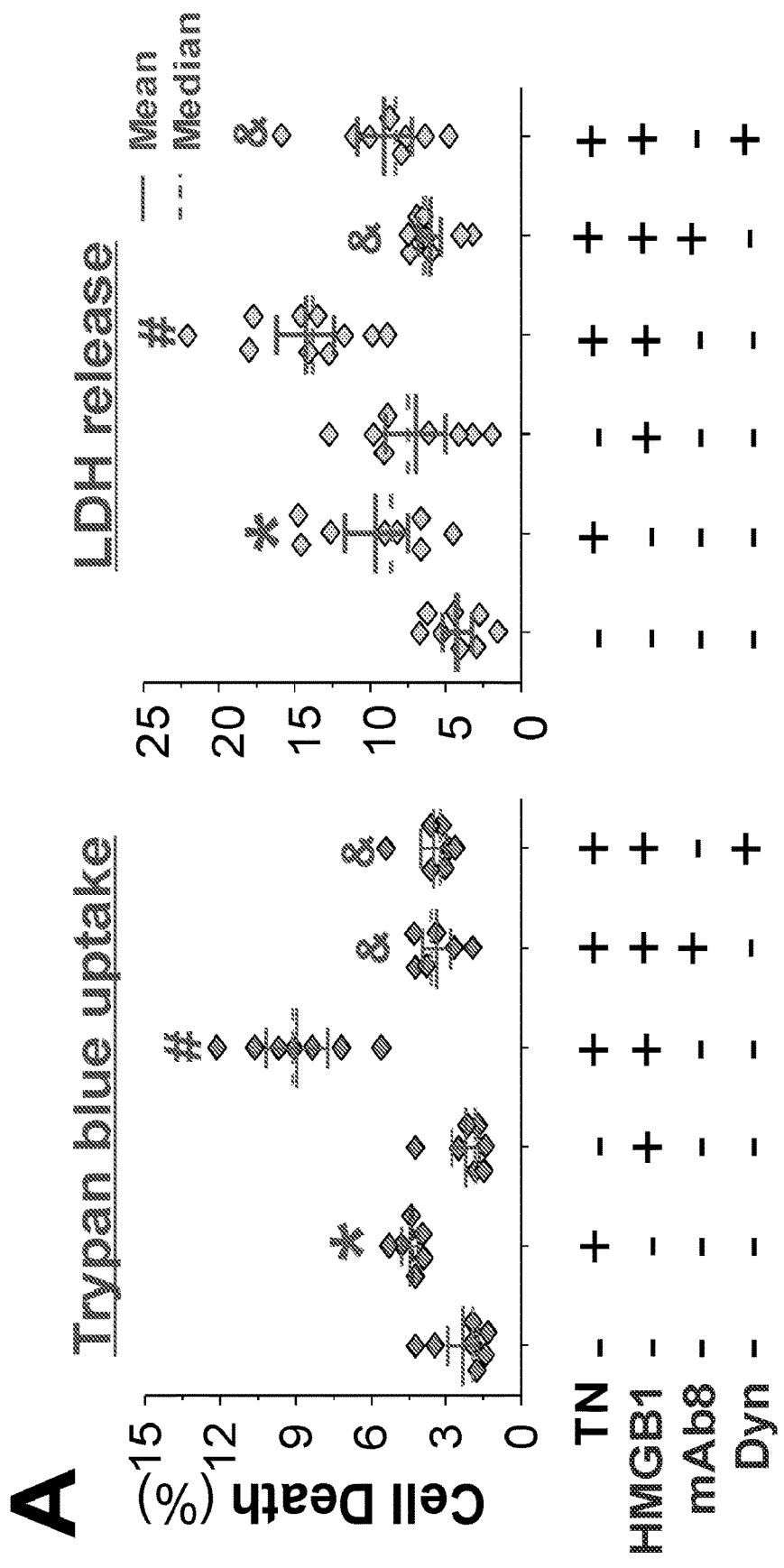
FIG. 12(A)-12(C): TN and HMGB1 cooperate to induce macrophage cell death. 12(A) Thioglycolate-elicited murine peritoneal macrophages were treated with TN (10 µg/ml) in the absence or presence of HMGB1 (0.5 µg/ml), TN-specific mAb8 (65.0 µg/ml), or dynasore (10.0 µM) for 16 h, and cell viability was assessed by trypan blue dye exclusion or LDH release assay. *, $P<0.05$ versus negative control; #, $P<0.05$ versus "+TN" or "+HMGB1" alone; &, $P<0.05$ versus positive control "+TN+HMGB1" group, n=6-10 per group. 12(B) Murine peritoneal macrophages were stimulated with TN (10 µg/ml) in the absence or presence of HMGB1 (1.0 µg/ml) for 16 h, and the cell-conditioned medium was assayed for ASC release by Western blotting analysis. SDS-PAGE gel indicated equivalent sampling loading. Bar graph represented average of three samples (n=3) from two independent experiments (N=2). *, $P<0.05$ versus negative controls ("−HMGB1−TN"); #, $P<0.05$ versus positive control ("+HMGB1" or "+TN" alone). 12(C) Differentiated human macrophages were stimulated with HMGB1 (1.0 µg/ml) and TN (10.0 μg/ml) in the absence or presence of TN-specific mAb (40 μg/ml) or dynasore (20.0 μM) for 16 h. Subsequently, cells were immunostained with Alexa Fluor 594-conjugated anti-ASC IgGs. Scale bars: 10 μm. Narrow arrows point to minute ASC puncta; Wide arrow points to a larger ASC speck.
Figure 12B:
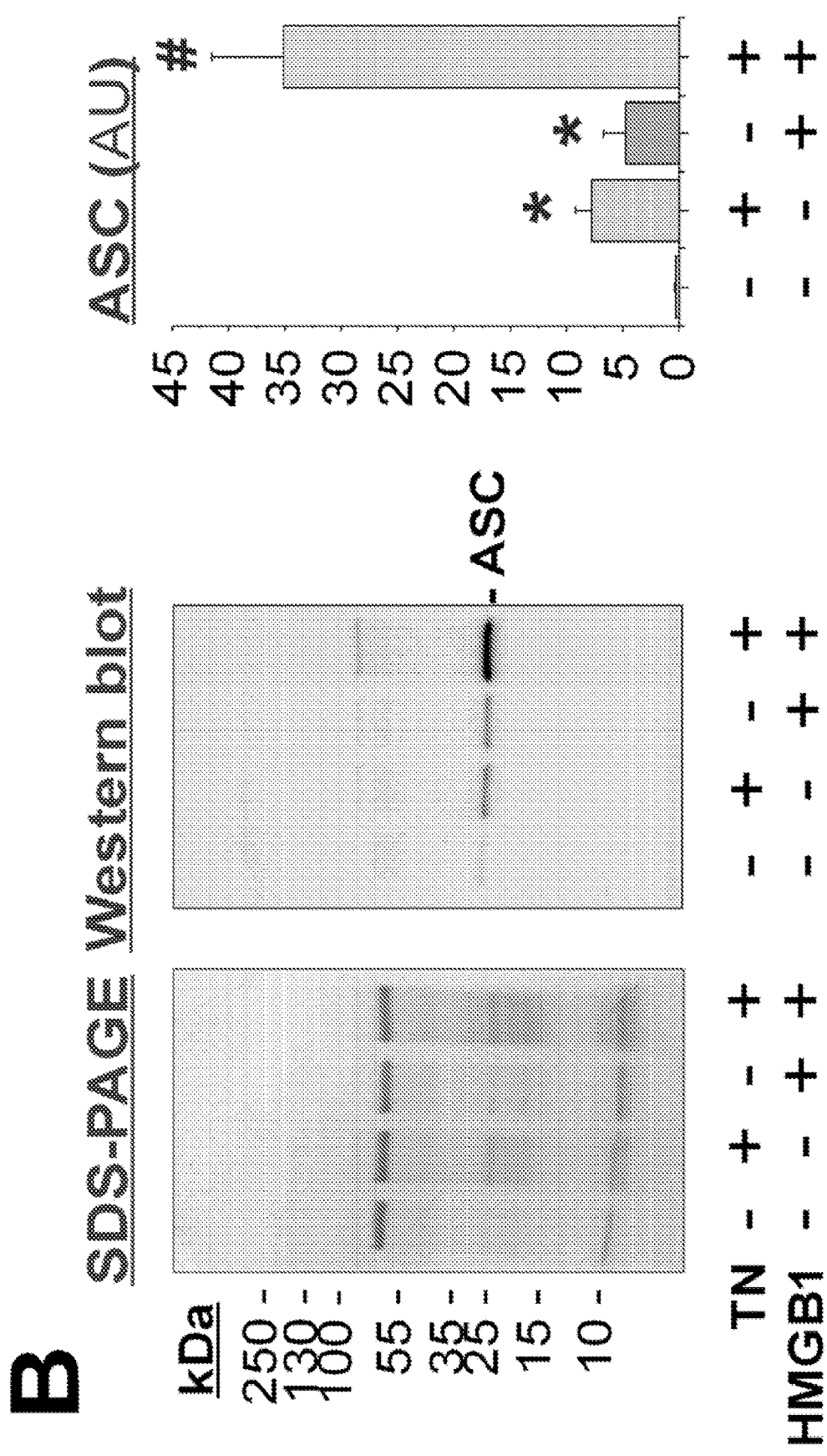
Figure 12C:
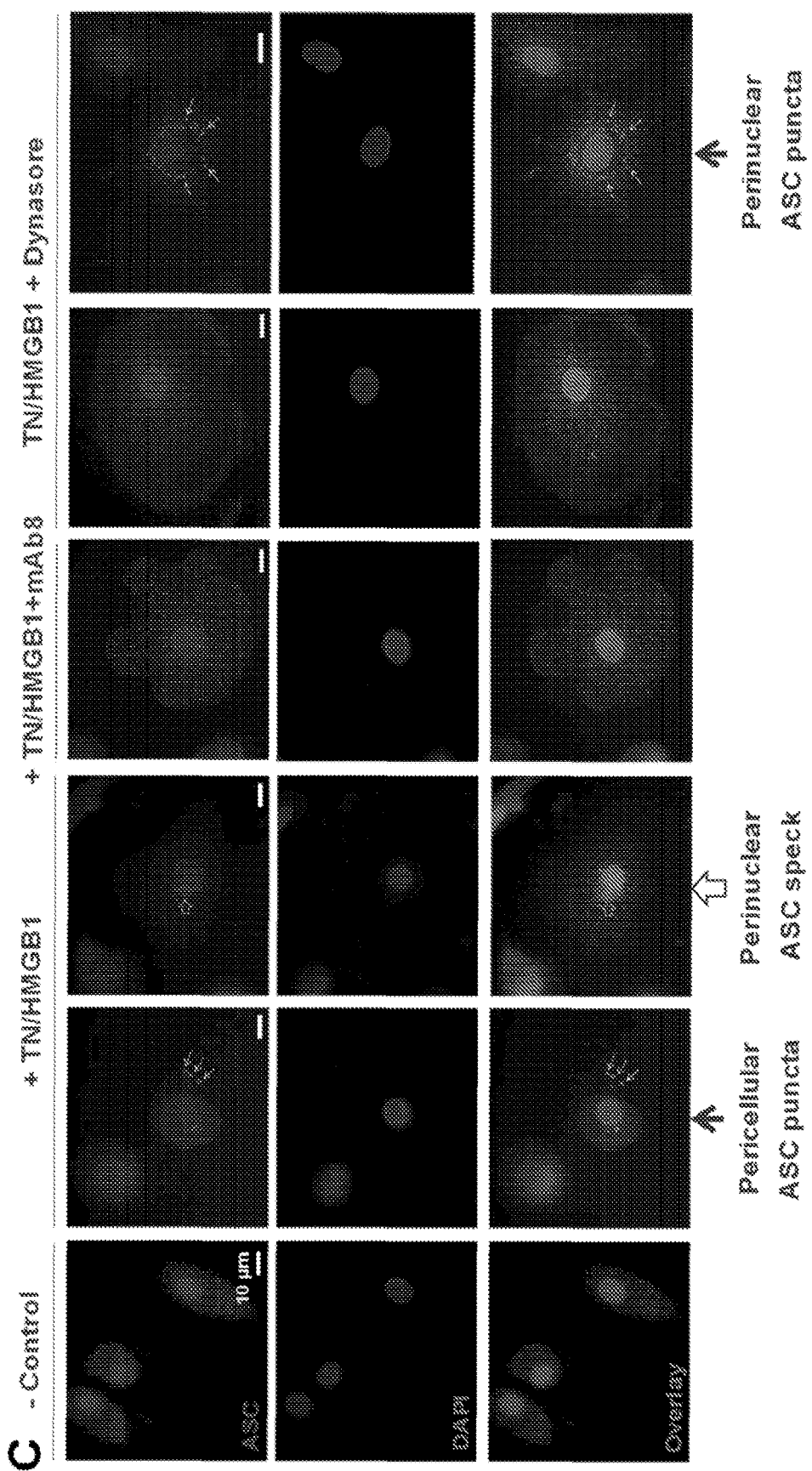

Separately, the functional outcome of disrupted interaction between HMGB1 and TN was confirmed in vitro in association with two markers of pyroptosis: 1) the loss of cytoplasmic membrane barrier function (as judged by trypan blue uptake and LDH release, FIG. 12(A)), and 2) the formation of ASC foci/speck in TN/HMGB1-stimulated macrophage cultures (FIG. 12(C)). A dynamin inhibitor, dynasore, was used to test whether the cellular uptake of TN and HMGB1 was likely dependent on endocytosis, and whether the suppression of TN/HMGB1 endocytosis would affect the TN/HMGB1-induced macrophage cell death (FIG. 12(A)) and formation of ASC speck (FIG. 12(C)), a well-known marker of pyroptosis. Also, beyond ASC release, the effect of dynasore was examined on the TN/HMGB1-induced: 1) formation of ASC foci/speck (FIG. 12(C)); and 2) loss of cytoplasmic membrane barrier functions as judged by the trypan blue dye uptake and LDH release assays (FIG. 12(A)). Collectively, the results confirmed that dynasore could indeed inhibit the TN/HMGB1 induced cell death and ASC aggregation, and that TN/HMGB1 complex might induce macrophage cell death and possible immunosuppression that can compromise effective pathogen elimination in sepsis.

Figures 13A, 13B, 13C, 13D:
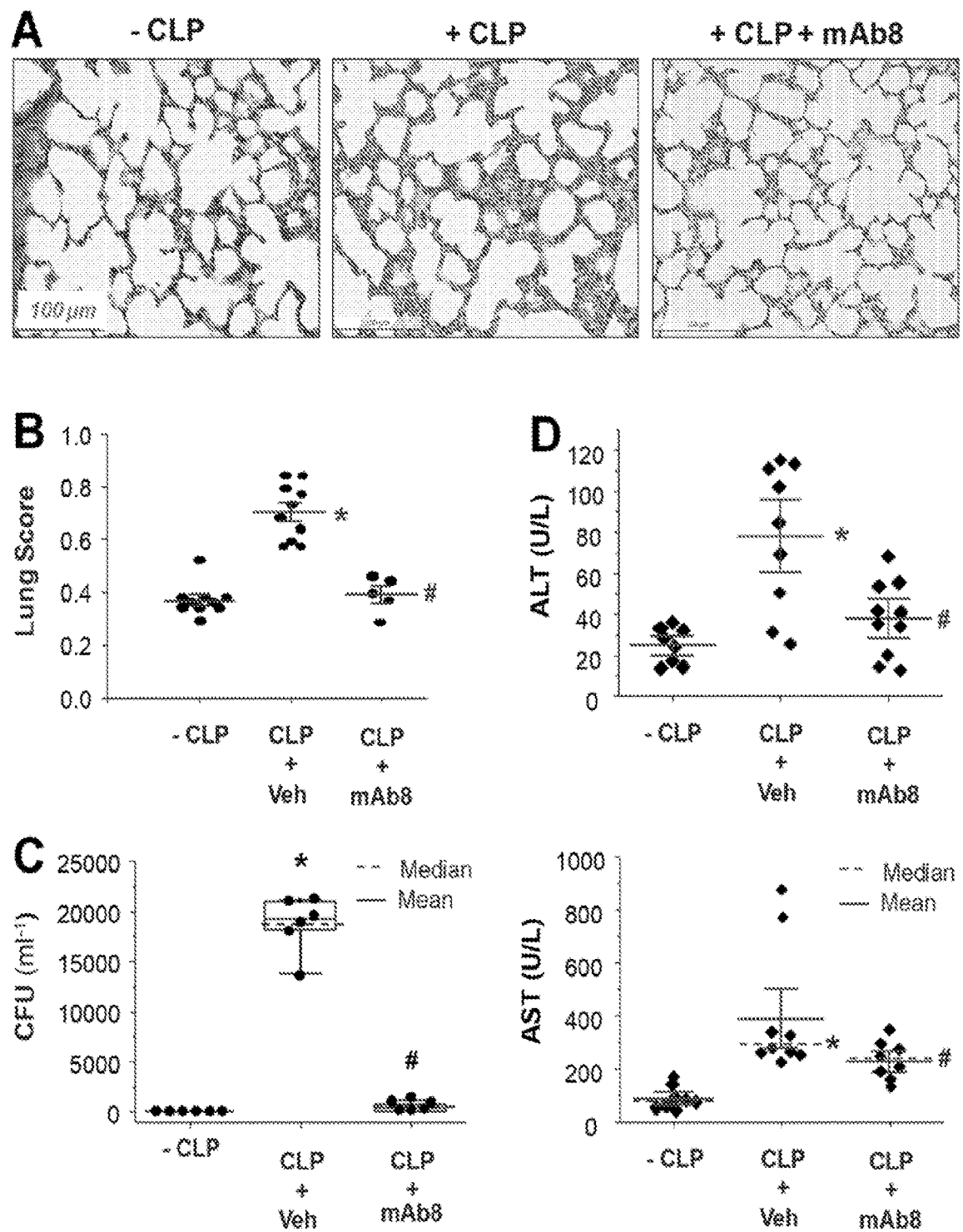
FIG. 13(A)-13(D): TN-specific mAb8 attenuated sepsis-induced bacterial infection, and tissue injury. TN-specific mAb8 (2.0 mg/kg) was given at 2 and 24 h after CLP, and animals were sacrificed at 28 h after CLP to harvest blood and lung tissue for histological analysis (13(A), 13(B), bacterial count (13(C)), and liver enzyme assays (13(D)). *, $P<0.05$ versus sham "−CLP" group; #, $P<0.05$ versus "+CLP" group. n=6-10 animals per group.

The impact of TN-specific mAb8 on sepsis-induced lung and liver injury was determined. The experimental data indicated that TN-specific protective mAb8 similarly inhibited both sepsis-induced lung injury (FIGS. 13(A), 13(C)) and elevation of liver enzymes (FIG. 13(E)).

Finally, the effect of TN-specific mAb on blood bacterial counts was confirmed in animal model of sepsis. It was found that TN-specific protective mAb8 significantly reduced blood bacterial load (FIG. 13(D)), supporting that TN-specific protective mAb confer protection partly by attenuating TN/HMGB1-mediated immunosuppression and impairment of pathogen elimination.

Discussion

Throughout mammalian evolution, multiple mechanisms have been developed to regulate innate immune functions. In the present study, a newly identified role for TN is disclosed in capturing and facilitating the cellular uptake of HMGB1 via possible endocytosis of TN/HMGB1 complexes. This reciprocal enhancement of HMGB1/TN endocytosis might underlie the observed anti-parallel alterations of circulating TN and HMGB1 levels in clinical and experimental sepsis. Moreover, a panel of TN domain-specific monoclonal antibodies have been produced that effectively prevented TN/HMGB1 interaction and their cellular uptake, thereby attenuating the sepsis-induced TN depletion and animal lethality in pre-clinical setting. Because these protective mAbs recognize a unique amino acid sequence with 100% identity between humans and many mammalian species, they can be therapeutic agents for the clinical management of inflammatory diseases in many species. More importantly, the surprising findings revealed an entirely novel antibody strategy to preserve a beneficial protein by preventing its harmful interaction with HMGB1, a well-established mediator of lethal sepsis.

Upon active secretion or passive release, extracellular HMGB1 binds a family of cell surface receptors including the Toll-like Receptor 4 (TLR4) [34] and the Receptor for Advanced Glycation End products (RAGE) [35] to induce the expression and production of various cytokines and chemokines, or to trigger macrophage pyroptosis [7,10]. As a highly charged protein, HMGB1 could bind to negatively charged pathogen-associated molecular pattern molecules [PAMPs, e.g., CpG-DNA or lipopolysaccharide (LPS)] to facilitate their cellular uptake via RAGE-receptor-mediated endocytosis. Upon reaching endosomal/lysosomal compartments with an acidic pH (5.4-6.2) near HMGB1's isoelectric pH (pI=pH 5.6), HMGB1 becomes neutrally charged, and thus set-free its cargos [7] to their cytoplasmic TLR9 [35] and Caspase-11 receptors [7]. Consequently, HMGB1 not only augments the PAMP-induced inflammation [35], but also promotes the PAMP-induced pyroptosis [7], leading to dysregulated inflammatory response as well as macrophage depletion and possible immunosuppression during sepsis.

In addition to exogenous PAMPs, HMGB1 could also bind other endogenous proteins such as haptoglobin and C1q, but instead trigger anti-inflammatory responses via distinct signaling pathways [36,37]. Here, an important role of another protein, TN, has been uncovered in capturing HMGB1 to enhance the endocytosis of TN/HMGB1 complexes without impairing HMGB1's cytokine/chemokine-inducing capacities. Moreover, the reciprocal enhancement of TN/HMGB1 endocytosis was associated with a synergistic release of ASC, a newly identified marker of macrophage pyroptosis [33]. Finally, TN reproducibly stimulated human monocytes to release: 1) GRO/CXCL1/KC, a sepsis surrogate marker [29, 30] released after NLRP1-mediated inflammasome activation and pyroptosis [38]; and 2) ENA-78/CXCL5/LIX, a neutrophilic chemokine possibly beneficial in sepsis [31,32]. Thus, TN is likely empowered with two seemingly conflicting roles in sepsis. On one hand, TN enhanced the secretion of a sepsis surrogate marker (GRO/CXCL1/KC) [29, 30], and promoted ASC release and possible macrophage pyroptosis that likely contributes to immunosuppression in sepsis (Figure S15). On the other hand, TN not only selectively attenuated the release of a pathogenic sepsis mediator (HMGB1), but also induced the expression and secretion of a potentially beneficial chemokine (ENA-78/CXCL5/LIX) [31,32].

At least in part, the mechanism by which TN-specific mAbs rescue animals from lethal sepsis might be attributable to the effective attenuation of sepsis-induced TN depletion, which was likely pathogenic to sepsis for several reasons. First, genetic disruption of TN expression rendered animals more susceptible to lethal sepsis. Second, circulating TN was depleted under pathological conditions during experimental and clinical sepsis. Third, supplementation of septic animal with exogenous TN at sub-physiological doses conferred a significant protection. Finally, a panel of three P5-reacting mAbs capable of rescuing animals from lethal sepsis uniformly attenuated the sepsis-induced TN depletion. These TN-specific protective mAbs prevented sepsis-induced TN depletion possibly through disrupting TN/HMGB1 interaction and inhibiting their endocytotic degradation. Additionally, mAbs capable of rescuing animals from lethal sepsis also effectively inhibited TN-induced GRO (KC) production in vitro (data not shown), and markedly reduced sepsis-induced systemic KC (GRO) accumulation in vivo. Thus, the TN P5-specific mAbs conferred protection against lethal sepsis by preventing sepsis-induced TN depletion and TN-induced KC accumulation.

In addition, the TN-specific mAb conferred significant protection against the chronic constriction injury (CCI)-induced mechanical hypersensitivity, showing their use for treating neuropathic pain.

The findings here reveal an entirely novel antibody approach to preserve a beneficial protein by preventing its undesired interaction with pathogenic mediators that could adversely cause macrophage pyroptosis and immune suppression.

Materials and Methods

Materials

Crude bacterial endotoxin (lipopolysaccharide, LPS, *E. coli* 0111:B4), human serum (H3667), mouse anti-β-actin antibody (A1978) were obtained from Sigma-Aldrich (St. Louis, MO, USA). As previously described [40], recombinant human SAA (also termed Apo-SAA, Cat. #300-13) was purchased from PeproTech (Rocky Hill, NJ). Recombinant human TN expressed in human kidney cell lines was obtained from the ACROBiosystems (Cat. # CLB-H5226). Dulbecco's modified Eagle medium (DMEM, 11995-065) and penicillin/streptomycin (Cat. #15140-122) were from Invitrogen/Life Technologies (Carlsbad, CA, USA). Fetal bovine serum was obtained from Crystalgen (FBS-500, Commack, NY, USA) and heat-inactivated before use. OPTI-MEM® I Reduced-Serum Medium (Cat. #31985062) was obtained from the ThermoFisher Scientific (Springfield Township, NJ, USA). Anti-HMGB1 antibody was antigen-affinity-purified from the serum of rat HMGB1-immunized rabbits as previously described [4]. Rabbit monoclonal antibody (Cat. # ab108999) against the C-terminal region (residue 150 to the C-terminus) of human TN was obtained from Abcam (Cambridge, MA, USA). HRP conjugated donkey anti-rabbit IgG was from GE Healthcare (NA934; Port Washington, NY, USA). Rabbit polyclonal IgGs against murine ASC was obtained from Santa Cruz Biotechnology (Cat. # sc-22514, Dallas, TX, USA). Balb/c male or female mice with age of 7-8 weeks were obtained from Taconic Biosciences (Hudson, NY, USA). Macrophage cell line RAW264.7 was obtained from the American Type Culture Collection (ATCC, Rockville, MD, USA).

Cell Culture

Primary peritoneal macrophages were isolated from young male Balb/c (7-8 wks, 20-25 g) at 3 days after intraperitoneal injection of 2 ml thioglycollate broth (4%) as previously described [41,42]. Briefly, mice were sacrificed by $CO_2$ asphyxiation, and the abdomen region was immediately cleaned with 70% ethanol before making a small excision to expose the abdominal wall, and to insert a catheter into viscera-free pocket to wash out peritoneal macrophages with sucrose solution (11.6%, 7.0 ml). Human blood was purchased from the New York Blood Center (Long Island City, NY, USA), and human peripheral blood mononuclear cells (HuPBMCs) were isolated by density gradient centrifugation through Ficoll (Ficoll-Paque PLUS, Pharmacia, Piscataway, NJ, USA) as previously described [43-45]. Murine macrophages and human monocytes (HuB-PMCs) were cultured in DMEM supplemented with 1% penicillin/streptomycin and 10% FBS or 10% human serum. When reaching 70-80% confluence, adherent cells were gently washed with, and immediately cultured in, OPTI-MEM I before stimulating with crude LPS, purified SAA, HMGB1, in the absence or presence of human TN. The intracellular and extracellular levels of HMGB1, TN, or various other cytokines/chemokines were respectively determined by Western blotting analysis, and Cytokine Antibody Arrays as previous described [40,46-48].

Clinical Characterization of Septic Patients

As per the approval by the Feinstein Institute for Medical Research institutional IRB ethics committee, blood samples (10 ml) were collected at various time points (0, 12, 24, 48, and 72 h) after the diagnosis of patients with sepsis, in the Department of Emergency Medicine, North Shore University Hospital. The American College of Chest Physicians/Society of Critical Care Medicine Consensus Conference definitions of sepsis and septic shock were used for the diagnosis of these patients [49]. As controls, blood samples (10 ml) were collected from healthy individuals and used to compare serum levels of TN and HMGB1 by Western blotting and ELISA, respectively.

MALDI-TOF Mass Spectrometry

To identify the 20-kDa band that was depleted in septic patients, serum samples of healthy controls and septic patients were resolved by SDS-PAGE gel electrophoresis, and the corresponding 20-kDa band was subjected to MALDI-TOF mass spectrometry analysis as previously described [47]. Briefly, the 20-kDa band was excised from the SDS-PAGE gel and subjected to in-gel trypsin digestion. The mass of the tryptic peptides was measured by MALDI-TOF-MS, and then subjected to peptide mass fingerprinting database analysis to identify the 20-kDa protein ("P20").

Western Blotting

The levels of TN in human or murine serum were determined by Western blotting analysis using commercial rabbit mAb against the C-terminus of human TN (Abcam) or our home-made murine mAbs (mAb8) against recombinant human TN. Similarly, the cellular and extracellular levels of TN and HMGB1 in murine macrophage and human monocyte cultures were determined by Western blotting analysis using rabbit polyclonal or monoclonal antibodies. Proteins in equal amount of total cellular protein or equivalent volume of cell-conditioned culture medium were resolved on sodium dodecyl sulfate (SDS)-polyacrylamide gels, and transferred to polyvinylidene difluoride (PVDF) membranes. After blocking with 5% nonfat milk, the membrane was incubated with respective antibodies (anti-TN, 1:1000; anti-ASC, 1:1000; anti-β-actin, 1:5,000; anti-HMGB1, 1:1,000) overnight. Subsequently, the membrane was incubated with the appropriate secondary antibody, and the immune-reactive bands were visualized by chemiluminescence techniques. The relative band intensity was quantified using the UN-SCAN-IT Gel Analysis Software Version 7.1 (Silk Scientific Inc., Orem, UT, USA).

Preparation of Recombinant HMGB1 and TN Proteins

The cDNA encoding for rat HMGB1 was cloned onto a pCAL-n vector, and the recombinant CBP-HMGB1 (rHMGB1) was expressed in *E. coli* BL21 (DE3) pLysS cells as previously described [4]. Recombinant HMGB1 containing a ~3 kDa calmodulin-binding peptide tag (CBP-HMGB1 fusion protein, 33 kDa) was expressed in *E. coli*, and purified to remove contaminating endotoxin by Triton X-114 extraction as previously described [50]. Recombinant human TN corresponding to residue 22-202 amino acid (without the 21-amino acid leader signal sequence) with a C-terminal histidine tag were expressed in *E. coli* BL21 (DE3) pLysS cells and purified by histidine-affinity and Triton X-114 extraction to remove contaminating endotoxins. Recombinant TN and HMGB1 proteins were tested for LPS content by the chromogenic Limulus amebocyte lysate assay (Endochrome; Charles River), and the endotoxin content was less than 0.01 U per microgram of recombinant proteins.

Generation of Anti-TN Polyclonal Antibodies and Monoclonal Antibodies

Female New Zealand White Rabbits were repetitively immunized with recombinant murine TN in combination with the Freund's complete adjuvant, and blood was collected on 3-week cycles of immunizations and bleedings. The antibody titers were determined by direct TN ELISA, and total IgGs were purified from the serum using Protein A affinity column as previously described [4,47]. Briefly, rabbit serum was pre-buffered with PBS, and slowly loaded to Protein A column to allow sufficient binding of IgGs. Following washing with 1×PBS to remove non-bound serum components, the IgGs were eluted with acidic buffer (0.1 M glycine-HCl, pH 2.8), and then immediately dialyzed into 1×PBS buffer at 4° C., overnight.

To generate monoclonal antibodies, Balb/C and C57BL/6 mice were repetitively immunized with highly purified human TN every two weeks, and serum titer was assessed by indirect ELISA and Western blotting analysis. After four immunizations, mouse splenocytes were harvested and fused with mouse Sp2/0 myeloma cell line and screened for antibody-producing hybridomas by in direct ELISA, dot blotting, and Western blotting analysis. Following extensive limited dilution, purified hybridoma clones were generated to produce mAbs following standard procedures. For V-region sequencing, five independent hybridoma preparations for each clone were used to isolate total RNA, and to reversely transcripted into cDNA. The heavy and light chain VR regions were amplified by PCR, and sub-cloned into a selectable bacterial shuttle vector for DNA sequencing analysis of the CDR regions of each mAb.

Open Surface Plasmon Resonance (SPR) Analysis of Protein/Protein Interaction

We employed the Nicoya Lifesciences gold-nanoparticle-based Open Surface Plasmon Resonance (OpenSPR) technology (Kitchener, ON, Canada) to characterize protein-protein interactions following the manufacturer's instructions. For instance, highly purified recombinant HMGB1 or TN protein was respectively immobilized on the amine sensor chip (Cat. # SEN-Au-100-10-AMINE) or NTA sensor chip (Cat. # SEN-Au-100-10-NTA), and TN, mAb, or HMGB1 was applied at different concentrations. To determine the binding affinities of mAbs to human or murine TN, highly purified human or murine TN was immobilized on the NTA sensor chip (Cat. # SEN-Au-100-10-NTA), and various mAbs were applied at various concentrations. The response units were recorded over time, and the binding affinity was estimated as the equilibrium dissociation constant KD using the Trace Drawer Kinetic Data Analysis v.1.6.1. (Nicoya Lifesciences).

Cytokine Antibody Array

Murine Cytokine Antibody Arrays (Cat. No. M0308003, RayBiotech Inc., Norcross, GA, USA), which simultaneously detect 62 cytokines on one membrane, were used to measure relative cytokine levels in macrophage-conditioned culture medium or animal serum as described previously [40]. Human Cytokine Antibody C3 Arrays (Cat. No. AAH-CYT-3-4), which detect 42 cytokines on one membrane, were used to determine cytokine levels in human monocyte-conditioned culture medium as previously described [41, 44]. Briefly, the membranes were incubated with equal volumes of culture medium or serum samples, followed by sequential incubation with primary biotin-conjugated antibodies, and horseradish peroxidase-conjugated streptavidin. After exposing to X-ray film, the relative levels of each cytokine pair were judged by its signal intensity.

Cellular HMGB1 and TN Uptake

Highly purified recombinant HMGB1 and TN protein were labeled with either Alexa Fluor 555 or Alexa Fluor 488 using respective labeling kit (Cat. # A30007 or Cat. # A30006, Thermo Fisher Scientific) according to the manufacturer's instructions. Murine macrophage-like RAW 264.7 cells on cover slips were incubated with unlabeled or Alexa Fluor 555-labeled HMGB1 in the absence or presence of unlabeled or Alexa Fluor 488-labeled TN at 37° C. for 2 h. An endocytosis inhibitor, Dynasore (8.0 μM), or mAb8 (60 μg/ml) were added 30 min before the addition of HMGB1 or TN. Following extensive washings with 1×PBS, cells were fixed with 4% formalin for 20 min at room temperature and mounted on the slide using Vectashield Mounting Medium for Fluorescence with DAPI (Vector Laboratories, Inc., Cat. # H-1200) for nuclei staining (blue). Endocytic uptake of Alexa Fluor 555-labeled HMGB1 (red) or Alexa Fluor 488-labeled TN (green) was visualized via Carl Zeiss fluorescence microscope. To quantitate cellular uptake of HMGB1 and TN, macrophage cultures were incubated with recombinant HMGB1 and TN either individually, or in combination, at 37° C. for 2 h. Following extensive washing, cellular levels of HMGB1 and TN were measured by Western blotting analysis with reference to a house-keeping protein, β-actin.

Animal Model of Lethal Endotoxemia and Sepsis

This study was conducted in accordance with policies of the NIH Guide for the Care and Use of Laboratory Animals and approved by the IACUC of the Feinstein Institute for Medical Research, Manhasset, New York, USA. To evaluate the role of TN in lethal sepsis, Balb/C mice (male, 7-8 weeks, 20-25 g) were subjected to lethal endotoxemia or sepsis induced by cecal ligation and puncture (CLP) as previously described [51,52]. Briefly, the cecum of Balb/C mice was ligated at 5.0 mm from the cecal tip, and then punctured once with a 22-gauge needle. At 30 min post CLP, all animals were given a subcutaneous dosing of imipenem/cilastatin (0.5 mg/mouse) (Primaxin, Merck & Co., Inc., West Point, Pa.), and resuscitation with normal sterile saline solution (20 ml/kg). Recombinant TN or anti-TN polyclonal or monoclonal IgGs were intraperitoneally administered into endotoxemic or septic mice at indicated doses and time points, and animal survival rates were monitored for up to two weeks. To evaluate the role of TN in lethal sepsis, a few breeding pairs of the heterozygous TN (also called "CLCE3B")-KO mice were obtained from the Jackson Laboratory (Stock No. 027554, Bar Harbor, ME, USA), and bred to produce homozygous TN KO as well as wild-type littermates. Age- and sex-matched wild-type (WT) or TN knockout (KO) C57/B6 mice were then used to induce CLP sepsis via identical procedures, and animal survival rates were compared for more than two weeks.

Genotyping

To verify the genotypes of wild-type (WT) and TN KO mice, tail biopsies was digested in Direct-PCR lysis Reagent (Cat. No 102-T, Viagen Biotech, Inc.) containing 0.4 µg/ml proteinase K (Cat. No E00491, Thermofisher scientific), and lysate containing genomic DNA was amplified by PCR reaction using the following primers: forward WT primer CAA AAA CCA CAC ACT CCA TCT G; reverse WT primer CTT AGT ATC TAC CAC TCC TGT CTG AGG; forward KO mutant primer CGG TCG CTA CCA TTA CCA GT; reverse KO mutant primer TGT GTT GTA GTC CAG CAG AGG, under the following conditions: 95° C. 3'; followed by 37 cycles of 95° C. for 15" and 60° C. for 15", 72° C., 15". The PCR products were resolved on a 2% agarose gel and visualized following ethidium bromide staining.

Tissue Histology

Lung tissues were collected at 24 h post the onset of sepsis and stored in 10% formalin before fixation in paraffin. The fixed tissue was then sectioned (5 µm) and stained with hematoxylin and eosin (H&E). Tissue injury was assessed in a blinded fashion using a semi-quantitative scoring system developed by the American Thoracic Society. Briefly, histological lung injury was scored based on the presence of infiltrated inflammatory cells in the alveolar and interstitial space, the presence of hyaline membranes and proteinaceous debris within airspaces, and alveolar septal thickening, according to the following definition: 0, no injury; 1, moderate injury; 2, severe injury. Using a weighted equation with a maximum score of 100 per field, the parameter scores were calculated and then averaged as the final lung injury score in each experimental group.

RNA-seq Analysis

At 24 h after the onset of sepsis, various tissues were harvested to isolate total RNA, and the expression levels of a full catalog of transcripts in wild-type or TN KO mice were assessed by RNA Sequencing (GENEWIZ, South Plainfield, NJ, USA). Gene ontology (GO) analysis and Kyoto Encyclopedia of Genes and Genomes (KEGG) pathway analysis were applied to analyze the differentially expressed genes (DEGs) by using String online tools (https://string-db.org/cgi/input.pl). Differential expression analysis was performed using the Wald test (DESeq2) to generate P-values and log 2 fold changes. A bi-clustering heat map was used to visualize the expression profile of the top 30 differentially expressed genes that were sorted by their adjusted P-value and log 2 fold of changes. Genes with an adjusted P-value <0.05 and absolute log 2 fold change >2 were defined as differentially expressed.

Peptide Dot Blotting

A library of synthetic peptides corresponding to different regions of human TN sequence were synthesized and spotted (1.0 µg in 2.5 µl) onto nitrocellulose membrane (Thermo Scientific, Cat No. 88013). Subsequently, the membrane was probed with IgGs from different rabbits or murine hybridomas following a standard protocol.

CCI Model

CCI surgery was performed according to the method described by Bennett et al. [53]. Briefly, mice were anesthetized with isoflurane, and the right sciatic nerve was gently isolated and loosely ligated with 4 sutures of 5-0 silk thread. Following surgery, the animals were allowed to recover for a week prior to any assessment, and subsequent antibody treatment.

Mechanical allodynia was measured using von Frey filaments and the Dixon up-down method to calculate the threshold response as previously described (Chaplan et al 1994) [54]. Briefly, each animal was placed under a transparent box on a metal mesh floor and allowed to acclimate for 30 min before testing. The cage was elevated so that stimulation was applied to each hind paw from beneath the rodent. Calibrated von Frey filaments (capable of exerting forces of 0.4-7.3 µm) were applied in ascending order on the plantar surface of the hind paw to define the threshold stimulus intensity required to elicit a paw withdrawal response. The duration of each stimulus was approximately 5-7 seconds. The repetitive testing was performed with an interval of at least 5 min for the same paw.

Model of Collagen Antibody-Induced Arthritis (CAIA)

Rheumatoid arthritis (RA) is characterized by synovial inflammation leading to joint pain, functional limitation, and progressive and irreversible damage to the joints. As a major cause of disability, RA affects 1.5 million individuals in the US alone. The development of biologics targeting specific pathogenic molecules such as TNF has revolutionized the clinical treatment of human arthritis. We have developed a panel of mAbs against human TN that can prevent TN-HMGB1 interaction and endocytosis of HMGB1/TN complexes by innate immune cells. It is thus important to test the therapeutic efficacy of these mAbs in animal model of collagen antibody induced arthritis (CAIA). CAIA will be induced in male or female Balb/C mice (7-8 weeks) with intraperitoneal (ip) injection of 400 µl (4 mg) monoclonal anti-collagen antibody cocktail on day 0 (α-CII, Chondrex), followed by ip injection of LPS (100 µl; 50 µg)n on day 3. Mice will then be evaluated daily for changes in body weight, arthritis severity score (up to 4 points per joint, maximum=16 points per mouse), and ankle diameters with a digital caliper. To test the efficacy of TN-specific mAbs, mice will be injected subcutaneously with TN-specific mAbs (0.2-2.0 mg/kg) or 0.9% saline for 3 consecutive days starting at either day −2, 0 or 5 to evaluate Ab's effects to prevent the development of and to attenuate early and established inflammatory arthritis. Mice will then be evaluated daily for changes in body weight, arthritis severity score, and ankle diameters from days 0 to 24. The effect of mAbs on the change of arthritis severity score and ankle diameters (joint circumferences) will be assessed.

Arthritis Severity Score Definition

0=Normal;
1=Mild redness and swelling of the ankle or wrist, or apparent redness and swelling limited to individual digits, regardless of the number of affected digits;
2=Moderate redness and swelling of ankle or wrist;
3=Severe redness and swelling of the entire paw including digits;
4=Maximally inflamed limb involving multiple joints.
Joint circumferences will be determined by measuring two perpendicular diameters, laterolateral and anteroposterior, on all four paws using a digital caliper (Fisher Scientific). The change of the will be recorded.

Model of Hepatic Ischemia Reperfusion Injury

Male C57BL/6 mice (20-25 g) will be subjected to hepatic ischemia/reperfusion by temporal clamping the hepatic artery and portal vein for 60 minutes, which typically produced ischemia in 70% of the liver. At the beginning of the reperfusion, 0.2 ml saline or mAb solution (0.2-2.0.0 mg/kg BW) will be injected via the internal jugular vein. At 24 h after the onset of ischemia, animals will be euthanized to harvest blood to measure serum levels of hepatic injury markers such as alanine aminotransferase (ALT) and aspartate aminotransferase (AST) using commercial kits. The effect of mAbs on the blood level of hepatic injury markers will be assessed.

Statistical Analysis

One-way analyses of variance (ANOVA) followed by the Tukey test for multiple comparisons were used to compare among different groups. Student's t-test was used for comparison between two groups. The Kaplan-Meier method was used to compare the differences in mortality rates between groups with log-rank post hoc test. A P value <0.05 was considered statistically significant.

REFERENCES

1. M. Singer, C. S. Deutschman, C. W. Seymour, M. Shankar-Hari, D. Annane, M. Bauer, R. Bellomo, G. R. Bernard, J. D. Chiche, C. M. Coopersmith, R. S. Hotchkiss, M. M. Levy, J. C. Marshall, G. S. Martin, S. M. Opal, G. D. Rubenfeld, T. van der Poll, J. L. Vincent, and D. C. Angus, "The Third International Consensus Definitions for Sepsis and Septic Shock (Sepsis-3)," JAMA. 315, 801-810 (2016).
2. J. Cohen, J. L. Vincent, N. K. Adhikari, F. R. Machado, D. C. Angus, T. Calandra, K. Jaton, S. Giulieri, J. Delaloye, S. Opal, K. Tracey, T. van der Poll, and E. Pelfrene, "Sepsis: a roadmap for future research," Lancet Infect. Dis. 15, 581-614 (2015).
3. R. S. Hotchkiss and I. E. Karl, "The pathophysiology and treatment of sepsis," N Engl J Med 348, 138-150 (2003).
4. H. Wang, O. Bloom, M. Zhang, J. M. Vishnubhakat, M. Ombrellino, J. Che, A. Frazier, H. Yang, S. Ivanova, L. Borovikova, K. R. Manogue, E. Faist, E. Abraham, J. Andersson, U. Andersson, P. E. Molina, N. N. Abumrad, A. Sama, and K. J. Tracey, "HMG-1 as a late mediator of endotoxin lethality in mice," Science 285, 248-251 (1999).
5. H. Yang, M. Ochani, J. Li, X. Qiang, M. Tanovic, H. E. Harris, S. M. Susarla, L. Ulloa, H. Wang, R. DiRaimo, C. J. Czura, H. Wang, J. Roth, H. S. Warren, M. P. Fink, M. J. Fenton, U. Andersson, and K. J. Tracey, "Reversing established sepsis with antagonists of endogenous high-mobility group box 1," Proc Natl Acad Sci USA 101, 296-301 (2004).
6. S. Qin, H. Wang, R. Yuan, H. Li, M. Ochani, K. Ochani, M. Rosas-Ballina, C. J. Czura, J. M. Huston, E. Miller, X. Lin, B. Sherry, A. Kumar, G. Larosa, W. Newman, K. J. Tracey, and H. Yang, "Role of HMGB1 in apoptosis-mediated sepsis lethality," J Exp. Med 203, 1637-1642 (2006).
7. M. Deng, Y. Tang, W. Li, X. Wang, R. Zhang, X. Zhang, X. Zhao, J. Liu, C. Tang, Z. Liu, Y. Huang, H. Peng, L. Xiao, D. Tang, M. J. Scott, Q. Wang, J. Liu, X. Xiao, S. Watkins, J. Li, H. Yang, H. Wang, F. Chen, K. J. Tracey, T. R. Billiar, and B. Lu, "The Endotoxin Delivery Protein HMGB1 Mediates Caspase-11-Dependent Lethality in Sepsis," Immunity. 49, 740-753 (2018).
8. S. M. Robert, H. Sjodin, M. P. Fink, and R. K. Aneja, "Preconditioning with high mobility group box 1 (HMGB1) induces lipoteichoic acid (LTA) tolerance," J. Immunother. 33, 663-671 (2010).
9. R. K. Aneja, A. Tsung, H. Sjodin, J. V. Gefter, R. L. Delude, T. R. Billiar, and M. P. Fink, "Preconditioning with high mobility group box 1 (HMGB1) induces lipopolysaccharide (LPS) tolerance," J. Leukoc. Biol. 84, 1326-1334 (2008).
10. J. Xu, Y. Jiang, J. Wang, X. Shi, Q. Liu, Z. Liu, Y. Li, M. J. Scott, G. Xiao, S. Li, L. Fan, T. R. Billiar, M. A. Wilson, and J. Fan, "Macrophage endocytosis of high-mobility group box 1 triggers pyroptosis," Cell Death. Differ. 21, 1229-1239 (2014).
11. M. Gregoire, J. M. Tadie, F. Uhel, A. Gacouin, C. Piau, N. Bone, T. Y. Le, E. Abraham, K. Tarte, and J. W. Zmijewski, "Frontline Science: HMGB1 induces neutrophil dysfunction in experimental sepsis and in patients who survive septic shock," J. Leukoc. Biol. 101, 1281-1287 (2017).
12. C. A. Wild, C. Bergmann, G. Fritz, P. Schuler, T. K. Hoffmann, R. Lotfi, A. Westendorf, S. Brandau, and S. Lang, "HMGB1 conveys immunosuppressive characteristics on regulatory and conventional T cells," Int. Immunol. 24, 485-494 (2012).
13. V. S. Patel, R. A. Sitapara, A. Gore, B. Phan, L. Sharma, V. Sampat, J. Li, H. Yang, S. S. Chavan, H. Wang, K. J. Tracey, and L. L. Mantell, "HMGB1 Mediates Hyperoxia-Induced Impairment of Pseudomonas aeruginosa Clearance and Inflammatory Lung Injury in Mice," Am. J. Respir. Cell Mol. Biol. (2012).
14. I. Clemmensen, L. C. Petersen, and C. Kluft, "Purification and characterization of a novel, oligomeric, plasminogen kringle 4 binding protein from human plasma: tetranectin," Eur. J. Biochem. 156, 327-333 (1986).
15. C. B. Sorensen, L. Berglund, and T. E. Petersen, "Cloning of a cDNA encoding murine tetranectin," Gene 152, 243-245 (1995).
16. L. Berglund and T. E. Petersen, "The gene structure of tetranectin, a plasminogen binding protein," FEBS Lett. 309, 15-19 (1992).
17. U. M. Wewer, K. Iba, M. E. Durkin, F. C. Nielsen, F. Loechel, B. J. Gilpin, W. Kuang, E. Engvall, and R. Albrechtsen, "Tetranectin is a novel marker for myogenesis during embryonic development, muscle regeneration, and muscle cell differentiation in vitro," Dev. Biol. 200, 247-259 (1998).
18. B. A. Jensen, P. McNair, L. Hyldstrup, and I. Clemmensen, "Plasma tetranectin in healthy male and female individuals, measured by enzyme-linked immunosorbent assay," J. Lab Clin. Med. 110, 612-617 (1987).
19. R. H. Lorentsen, J. H. Graversen, N. R. Caterer, H. C. Thogersen, and M. Etzerodt, "The heparin-binding site in tetranectin is located in the N-terminal region and binding does not involve the carbohydrate recognition domain," Biochem. J. 347 Pt 1, 83-87 (2000).
20. J. H. Graversen, R. H. Lorentsen, C. Jacobsen, S. K. Moestrup, B. W. Sigurskjold, H. C. Thogersen, and M. Etzerodt, "The plasminogen binding site of the C-type lectin tetranectin is located in the carbohydrate recognition domain, and binding is sensitive to both calcium and lysine," J. Biol. Chem. 273, 29241-29246 (1998).
21. J. H. Graversen, B. W. Sigurskjold, H. C. Thogersen, and M. Etzerodt, "Tetranectin-binding site on plasminogen kringle 4 involves the lysine-binding pocket and at least one additional amino acid residue," *Biochemistry* 39, 7414-7419 (2000).
22. C. Kluft, A. F. Jie, P. Los, W. E. de, and L. Havekes, "Functional analogy between lipoprotein(a) and plasminogen in the binding to the kringle 4 binding protein, tetranectin," *Biochem. Biophys. Res. Commun.* 161, 427-433 (1989).
23. U. B. Westergaard, M. H. Andersen, C. W. Heegaard, S. N. Fedosov, and T. E. Petersen, "Tetranectin binds hepatocyte growth factor and tissue-type plasminogen activator," *Eur. J. Biochem.* 270, 1850-1854 (2003).
24. U. M. Wewer, K. Ibaraki, P. Schjorring, M. E. Durkin, M. F. Young, and R. Albrechtsen, "A potential role for tetranectin in mineralization during osteogenesis," *J. Cell Biol.* 127, 1767-1775 (1994).
25. K. Iba, M. E. Durkin, L. Johnsen, E. Hunziker, K. Damgaard-Pedersen, H. Zhang, E. Engvall, R. Albrechtsen, and U. M. Wewer, "Mice with a targeted deletion of the tetranectin gene exhibit a spinal deformity," *Mol. Cell Biol.* 21, 7817-7825 (2001).
26. E. S. Wang, X. P. Zhang, H. B. Yao, G. Wang, S. W. Chen, W. W. Gao, H. J. Yao, Y. R. Sun, C. H. Xi, and Y. D. Ji, "Tetranectin knockout mice develop features of Parkinson disease," *Cell Physiol Biochem.* 34, 277-287 (2014).
27. K. Iba, N. Hatakeyama, T. Kojima, M. Murata, T. Matsumura, U. M. Wewer, T. Wada, N. Sawada, and T. Yamashita, "Impaired cutaneous wound healing in mice lacking tetranectin," *Wound. Repair Regen.* 17, 108-112 (2009).
28. K. Iba, Y. Abe, T. Chikenji, K. Kanaya, H. Chiba, K. Sasaki, T. Dohke, T. Wada, and T. Yamashita, "Delayed fracture healing in tetranectin-deficient mice," *J. Bone Miner. Metab* 31, 399-408 (2013).
29. M. F. Osuchowski, K. Welch, J. Siddiqui, and D. G. Remick, "Circulating cytokine/inhibitor profiles reshape the understanding of the SIRS/CARS continuum in sepsis and predict mortality," *J. Immunol.* 177, 1967-1974 (2006).
30. J. G. Heuer, G. R. Sharma, B. Gerlitz, T. Zhang, D. L. Bailey, C. Ding, D. T. Berg, D. Perkins, E. J. Stephens, K. C. Holmes, R. L. Grubbs, K. A. Fynboe, Y. F. Chen, B. Grinnell, and J. A. Jakubowski, "Evaluation of protein C and other biomarkers as predictors of mortality in a rat cecal ligation and puncture model of sepsis," *Crit Care Med.* 32, 1570-1578 (2004).
31. J. Mei, Y. Liu, N. Dai, M. Favara, T. Greene, S. Jeyaseelan, M. Poncz, J. S. Lee, and G. S. Worthen, "CXCL5 regulates chemokine scavenging and pulmonary host defense to bacterial infection," *Immunity.* 33, 106-117 (2010).
32. S. Jeyaseelan, R. Manzer, S. K. Young, M. Yamamoto, S. Akira, R. J. Mason, and G. S. Worthen, "Induction of CXCL5 during inflammation in the rodent lung involves activation of alveolar epithelium," *Am. J. Respir. Cell Mol. Biol.* 32, 531-539 (2005).
33. B. S. Franklin, L. Bossaller, N. D. De, J. M. Ratter, A. Stutz, G. Engels, C. Brenker, M. Nordhoff, S. R. Mirandola, A. Al-Amoudi, M. S. Mangan, S. Zimmer, B. G. Monks, M. Fricke, R. E. Schmidt, T. Espevik, B. Jones, A. G. Jarnicki, P. M. Hansbro, P. Busto, A. Marshak-Rothstein, S. Hornemann, A. Aguzzi, W. Kastenmuller, and E. Latz, "The adaptor ASC has extracellular and 'prionoid' activities that propagate inflammation," *Nat. Immunol.* 15, 727-737 (2014).
34. M. Yu, H. Wang, A. Ding, D. T. Golenbock, E. Latz, C. J. Czura, M. J. Fenton, K. J. Tracey, and H. Yang, "HMGB1 SIGNALS THROUGH TOLL-LIKE RECEPTOR (TLR) 4 AND TLR2," *Shock* 26, 174-179 (2006).
35. J. Tian, A. M. Avalos, S. Y. Mao, B. Chen, K. Senthil, H. Wu, P. Parroche, S. Drabic, D. Golenbock, C. Sirois, J. Hua, L. L. An, L. Audoly, G. La Rosa, A. Bierhaus, P. Naworth, A. Marshak-Rothstein, M. K. Crow, K. A. Fitzgerald, E. Latz, P. A. Kiener, and A. J. Coyle, "Toll-like receptor 9-dependent activation by DNA-containing immune complexes is mediated by HMGB1 and RAGE," *Nat. Immunol.* 8, 487-496 (2007).
36. H. Yang, H. Wang, Y. A. Levine, M. K. Gunasekaran, Y. Wang, M. Addorisio, S. Zhu, W. Li, J. Li, D. P. de Kleijn, P. S. Olofsson, H. S. Warren, M. He, Y. Al-Abed, J. Roth, D. J. Antoine, S. S. Chavan, U. Andersson, and K. J. Tracey, "Identification of CD163 as an antiinflammatory receptor for HMGB1-haptoglobin complexes," *JCI. Insight.* 1, (2016).
37. M. Son, A. Porat, M. He, J. Suurmond, F. Santiago-Schwarz, U. Andersson, T. R. Coleman, B. T. Volpe, K. J. Tracey, Y. Al-Abed, and B. Diamond, "C1q and HMGB1 reciprocally regulate human macrophage polarization," *Blood.* 128, 2218-2228 (2016).
38. M. Kovarova, P. R. Hesker, L. Jania, M. Nguyen, J. N. Snouwaert, Z. Xiang, S. E. Lommatzsch, M. T. Huang, J. P. Ting, and B. H. Koller, "NLRP1-dependent pyroptosis leads to acute lung injury and morbidity in mice," *J. Immunol.* 189, 2006-2016 (2012).
39. H. Yang, H. Liu, Q. Zeng, G. H. Imperato, M. E. Addorisio, J. Li, M. He, K. F. Cheng, Y. Al-Abed, H. E. Harris, S. S. Chavan, U. Andersson, and K. J. Tracey, "Inhibition of HMGB1/RAGE-mediated endocytosis by HMGB1 antagonist box A, anti-HMGB1 antibodies, and cholinergic agonists suppresses inflammation," *Mol. Med.* 25, 13-0081 (2019).
40. W. Li, G. Bao, W. Chen, X. Qiang, S. Zhu, S. Wang, M. He, G. Ma, M. Ochani, Y. Al-Abed, H. Yang, K. J. Tracey, P. Wang, J. D'Angelo, and H. Wang, "Connexin 43 Hemichannel as a Novel Mediator of Sterile and Infectious Inflammatory Diseases," *Sci. Rep.* 8, 166-18452 (2018).
41. W. Li, M. Ashok, J. Li, H. Yang, A. E. Sama, and H. Wang, "A Major Ingredient of Green Tea Rescues Mice from Lethal Sepsis Partly by Inhibiting HMGB1," *PLoS ONE* 2, e1153 (2007).
42. Y. Zhang, W. Li, S. Zhu, A. Jundoria, J. Li, H. Yang, S. Fan, P. Wang, K. J. Tracey, A. E. Sama, and H. Wang, "Tanshinone IIA sodium sulfonate facilitates endocytic HMGB1 uptake," *Biochem. Pharmacol.* 84, 1492-1500 (2012).
43. G. Chen, J. Li, M. Ochani, B. Rendon-Mitchell, X. Qiang, S. Susarla, L. Ulloa, H. Yang, S. Fan, S. M. Goyert, P. Wang, K. J. Tracey, A. E. Sama, and H. Wang, "Bacterial endotoxin stimulates macrophages to release HMGB1 partly through CD14- and TNF-dependent mechanisms.," *J Leukoc. Biol* 76, 994-1001 (2004).
44. W. Li, J. Li, M. Ashok, R. Wu, D. Chen, L. Yang, H. Yang, K. J. Tracey, P. Wang, A. E. Sama, and H. Wang, "A cardiovascular drug rescues mice from lethal sepsis by selectively attenuating a late-acting proinflammatory mediator, high mobility group box 1," *J. Immunol.* 178, 3856-3864 (2007).
45. B. Rendon-Mitchell, M. Ochani, J. Li, J. Han, H. Wang, H. Yang, S. Susarla, C. Czura, R. A. Mitchell, G.

Chen, A. E. Sama, K. J. Tracey, and H. Wang, "IFN-gamma Induces High Mobility Group Box 1 Protein Release Partly Through a TNF-Dependent Mechanism," *J Immunol* 170, 3890-3897 (2003).
46. S. Zhu, Y. Wang, W. Chen, W. Li, A. Wang, S. Wong, G. Bao, J. Li, H. Yang, K. J. Tracey, J. D'Angelo, and H. Wang, "High-Density Lipoprotein (HDL) Counter-Regulates Serum Amyloid A (SAA)-Induced sPLA2-IIE and sPLA2-V Expression in Macrophages," *PLoS. One.* 11, e0167468 (2016).
47. W. Li, S. Zhu, J. Li, J. D'Amore, J. D'Angelo, H. Yang, P. Wang, K. J. Tracey, and H. Wang, "Serum Amyloid A Stimulates PKR Expression and HMGB1 Release Possibly through TLR4/RAGE Receptors," *Mol. Med.* 21, 515-525 (2015).
48. W. Chen, S. Zhu, Y. Wang, J. Li, X. Qiang, X. Zhao, H. Yang, J. D'Angelo, L. Becker, P. Wang, K. J. Tracey, and H. Wang, "Enhanced Macrophage Pannexin 1 Expression and Hemichannel Activation Exacerbates Lethal Experimental Sepsis," *Sci. Rep.* 9, 160-37232 (2019).
49. M. M. Levy, M. P. Fink, J. C. Marshall, E. Abraham, D. Angus, D. Cook, J. Cohen, S. M. Opal, J. L. Vincent, and G. Ramsay, "2001 SCCM/ESICM/ACCP/ATS/SIS International Sepsis Definitions Conference," *Crit Care Med.* 31, 1250-1256 (2003).
50. S. Zhu, M. Ashok, J. Li, W. Li, H. Yang, P. Wang, K. J. Tracey, A. E. Sama, and H. Wang, "Spermine protects mice against lethal sepsis partly by attenuating surrogate inflammatory markers," *Mol. Med* 15, 275-282 (2009).
51. W. Li, S. Zhu, J. Li, A. Assa, A. Jundoria, J. Xu, S. Fan, N. T. Eissa, K. J. Tracey, A. E. Sama, and H. Wang, "EGCG stimulates autophagy and reduces cytoplasmic HMGB1 levels in endotoxin-stimulated macrophages," *Biochem. Pharmacol.* 81, 1152-1163 (2011).
52. W. Li, S. Zhu, J. Li, Y. Huang, R. Zhou, X. Fan, H. Yang, X. Gong, N. T. Eissa, W. Jahnen-Dechent, P. Wang, Tracey K. J., A. E. Sama, and H. Wang, "A hepatic protein, fetuin-A, occupies a protective role in lethal systemic inflammation.," *PLoS ONE* 6, e16945 (2011).
53. Bennett G J, Xie Y K: A peripheral mononeuropathy in rat that produces disorders of pain sensation like those seen in man. *Pain* 1988; 33:87-107.
54. Chaplan S R, Bach F W, Pogrel J W, Chung J M, Yaksh T L: Quantitative assessment of tactile allodynia in the rat paw. *J Neurosci Methods* 1994; 53:55-63.

---

What is claimed is:

1. An antibody or antigen-binding fragment thereof comprising a) a heavy chain variable region comprising:

TDYMS, (SEQ ID NO: 21)

AINSNGGTTYYPDTVKG, and (SEQ ID NO: 22)

QVKNGLDY; (SEQ ID NO: 23)

and a light chain variable region comprising:

RASQDISNYLN, (SEQ ID NO: 24)

KTSRLHS, and (SEQ ID NO: 25)

QQGNTLPPT; (SEQ ID NO: 26)

or b) a heavy chain variable region comprising:

SYYMS, (SEQ ID NO: 27)

AINSNGGRTYYPDTVKG, and (SEQ ID NO: 28)

QGKNGLDY; (SEQ ID NO: 29)

and a light chain variable region comprising:

RASQDISNHLN, (SEQ ID NO: 30)

YTSRLHS, and (SEQ ID NO: 31)

QQGKTLPPT; (SEQ ID NO: 32)

or c) a heavy chain variable region comprising:

SSYMS, (SEQ ID NO: 33)

AINNNGGTTYYPDTVKG, and (SEQ ID NO: 34)

QGKNGLDY; (SEQ ID NO: 35)

and a light chain variable region comprising:

RASQDIGNLLN, (SEQ ID NO: 36)

YTSRLHS, and (SEQ ID NO: 37)

QQANTLPPT; (SEQ ID NO: 38)

or d) a heavy chain variable region comprising:

SDYMS, (SEQ ID NO: 39)

-continued

AINSNGGTTYYPDTVKG, and (SEQ ID NO: 40)

QGKNGMDY; (SEQ ID NO: 41)

and a light chain variable region comprising:

RASQDISNHLN, (SEQ ID NO: 42)

YTSRLHS, and (SEQ ID NO: 43)

QQGKTLPPT, (SEQ ID NO: 44)

wherein the antibody or antigen-binding fragment thereof binds tetranectin.

2. The antibody or fragment thereof of claim 1, wherein framework regions of the light chain and/or the heavy chain are human framework regions.

3. The antibody or fragment thereof of claim 2, wherein framework regions of the light chain and the heavy chain are human framework regions.

4. The antibody or antigen-binding fragment thereof of claim 1, which has a human sequence Fc region.

5. The antibody or antigen-binding fragment thereof of claim 1, wherein the antibody or fragment thereof is chimeric or humanized.

6. The antibody or antigen-binding fragment thereof of claim 1, wherein the antibody or fragment thereof is selected from the group consisting of a monoclonal antibody, an scFv, an Fab fragment, an Fab' fragment, an F(ab)' fragment and a bispecific antibody.

7. The antibody or antigen-binding fragment thereof according to claim 1, wherein the antibody is a humanized antibody and is an IgG1(λ) or an IgG2(λ).

8. The antibody or antigen-binding fragment thereof of claim 1, which inhibits interaction between a tetranectin that the antibody or antigen-binding fragmentit binds and an HMGB1.

9. The antibody or antigen-binding fragment thereof of claim 1, which inhibits cellular tetranectin uptake and/or tetranectin depletion in a subject when administered to the subject.

10. An antibody or fragment thereof according to claim 1, linked or conjugated to a therapeutic agent, an imaging agent or a detectable marker.

11. The antibody or fragment thereof according to claim 10, wherein the therapeutic agent is a cytotoxic drug, a radioactive isotope, an immunomodulator, or a second antibody.

12. A method of treating sepsis or endotoxemia in a subject comprising administering an amount of an antibody of claim 1, or a human tetranectin-binding fragment thereof, effective to treat sepsis or endotoxemia in a subject.

13. A method of treating neuropathic pain in a subject comprising administering an amount of an antibody of claim 1, or a human tetranectin-binding fragment thereof, effective to effective to treat neuropathic pain in a subject.

* * * * *